US011652945B2

(12) United States Patent
Iki et al.

(10) Patent No.: US 11,652,945 B2
(45) Date of Patent: *May 16, 2023

(54) CONTROL METHOD, CONTROL DEVICE, AND PROGRAM

(71) Applicant: Sony Group Corporation, Tokyo (JP)

(72) Inventors: Masaru Iki, Kanagawa (JP); Hidenori Karasawa, Kanagawa (JP); Motoki Kobayashi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,580

(22) Filed: Dec. 28, 2021

(65) Prior Publication Data
US 2022/0124216 A1   Apr. 21, 2022

Related U.S. Application Data

(63) Continuation of application No. 16/952,785, filed on Nov. 19, 2020, now Pat. No. 11,277,538, which is a
(Continued)

(30) Foreign Application Priority Data

Dec. 24, 2014 (JP) ................. 2014-261005

(51) Int. Cl.
H04N 5/232 (2006.01)
H04N 1/00 (2006.01)
(Continued)

(52) U.S. Cl.
CPC ..... *H04N 1/00973* (2013.01); *H04N 5/23206* (2013.01); *H04N 5/23245* (2013.01);
(Continued)

(58) Field of Classification Search
CPC ............... H04N 1/00973; H04N 5/247; H04N 5/23293; H04N 5/23206; H04N 7/181; H04N 5/23245; H04W 4/80
See application file for complete search history.

(56) References Cited

U.S. PATENT DOCUMENTS 6,909,457 B1   6/2005   Fukasawa
9,503,626 B2*  11/2016  Chang ................ H04N 5/23203
(Continued)

FOREIGN PATENT DOCUMENTS

CN   101415054 A   4/2009
CN   101751906 A   6/2010
(Continued)

OTHER PUBLICATIONS

"User manual for digiCamControl," Aug. 6, 2013, BNSDOCID, No. Xp_5524426A_1, pp. 1-24.
(Continued)

*Primary Examiner* — Mekonnen D Dagnew
(74) *Attorney, Agent, or Firm* — Michael Best & Friedrich LLP

(57) ABSTRACT

A method of controlling multiple imaging devices includes wirelessly communicating with the imaging devices, and displaying identifiers corresponding to each of the plurality of imaging devices, on the basis of the communication.

20 Claims, 49 Drawing Sheets

Related U.S. Application Data continuation of application No. 15/532,351, filed as application No. PCT/JP2015/005537 on Nov. 4, 2015, now Pat. No. 10,958,804.

(51) Int. Cl.
*H04N 5/247* (2006.01)
*H04N 7/18* (2006.01)
*H04W 4/80* (2018.01)

(52) U.S. Cl.
CPC ....... *H04N 5/232939* (2018.08); *H04N 5/247* (2013.01); *H04N 7/181* (2013.01); *H04W 4/80* (2018.02)

(56) References Cited

U.S. PATENT DOCUMENTS

| | | | |
|---|---|---|---|
| 2003/0048356 A1 | 3/2003 | Kohno et al. | |
| 2004/0228639 A1 | 11/2004 | Badovinac et al. | |
| 2007/0089060 A1* | 4/2007 | Shirasaka | G11B 27/02 |
| | | | 715/723 |
| 2008/0297608 A1 | 12/2008 | Border et al. | |
| 2009/0096877 A1 | 4/2009 | Kunishige | |
| 2010/0149356 A1 | 6/2010 | Kim et al. | |
| 2013/0107100 A1 | 5/2013 | Okada et al. | |
| 2014/0049498 A1 | 2/2014 | Ma et al. | |
| 2014/0055623 A1 | 2/2014 | Okada | |
| 2014/0098188 A1 | 4/2014 | Kwak et al. | |
| 2014/0204224 A1 | 7/2014 | Fujita | |
| 2014/0247392 A1 | 9/2014 | Mooneyham | |
| 2015/0029350 A1* | 1/2015 | Matsuda | H04N 5/23203 |
| | | | 348/211.2 |
| 2017/0163871 A1* | 6/2017 | Irie | H04N 5/23206 |

FOREIGN PATENT DOCUMENTS

| | | |
|---|---|---|
| CN | 103634522 A | 3/2014 |
| CN | 104010126 A | 8/2014 |
| CN | 104093008 A | 10/2014 |
| JP | 2000-101994 A | 4/2000 |
| JP | 2001-326845 A | 11/2001 |
| JP | 2006-217357 A | 8/2006 |
| JP | 2007-142867 A | 6/2007 |
| JP | 2008-226045 A | 9/2008 |
| JP | 2010-056814 A | 3/2010 |
| JP | 2010-074239 A | 4/2010 |
| JP | 2012-119846 A | 6/2012 |
| JP | 2013-098648 A | 5/2013 |
| JP | 2014-042172 A | 3/2014 |

OTHER PUBLICATIONS

Japanese Office Action dated Oct. 31, 2017 for corresponding Japanese Application No. 2014-261005.
Chinese Office Action dated Jul. 24, 2019 for corresponding Chinese Application No. 201580069014.1.
Chinese Office Action dated Mar. 3, 2020 for corresponding Chinese Application No. 201580069014.1.
Chinese Office Action dated Jul. 16, 2020 for corresponding Chinese Application No. 201580069014.1.
European Patent Office Communication Pursuant to Article 94(3) EPC dated Aug. 13, 2021 for corresponding European Application No. 15800988.6.

* cited by examiner

[Fig. 1]
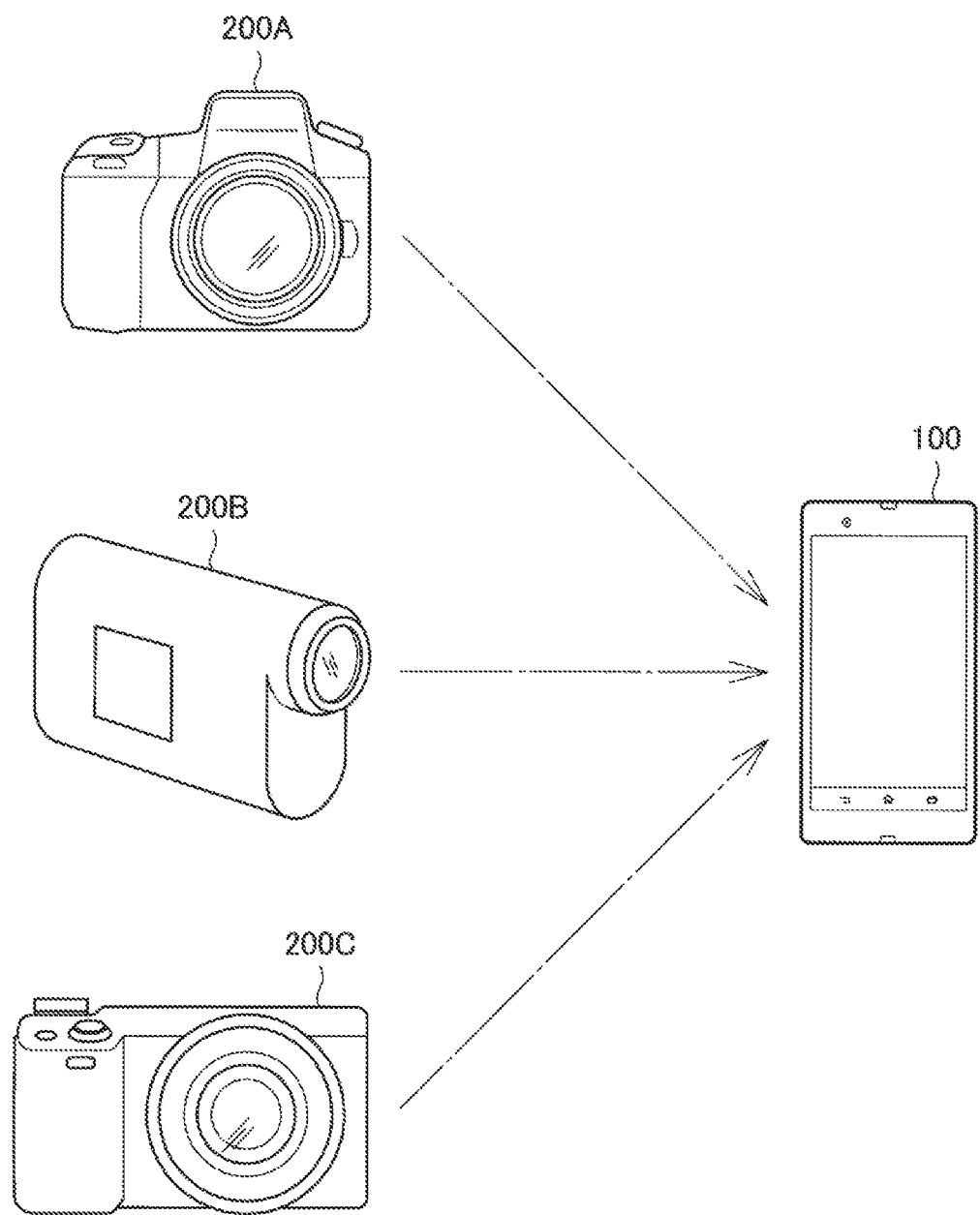

[Fig. 2]
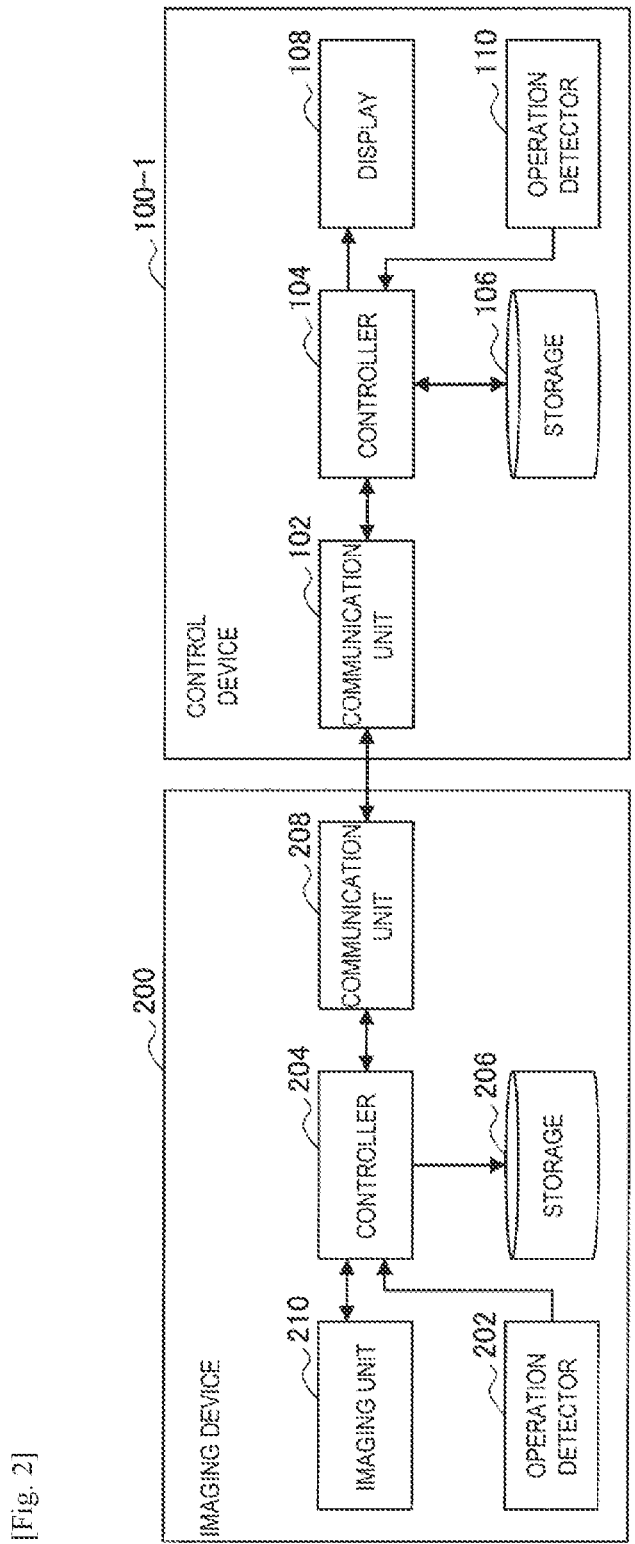

[Fig. 3]
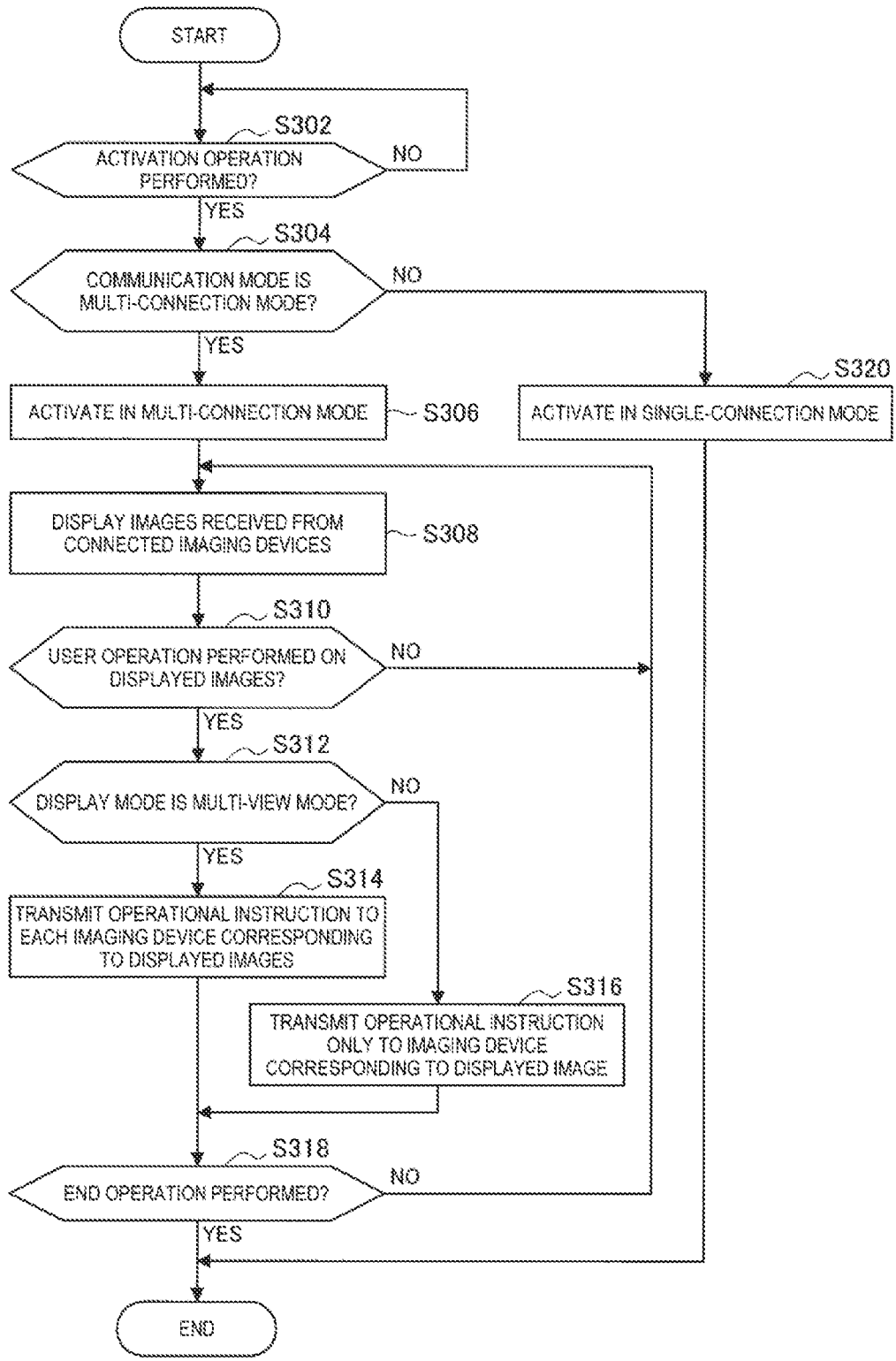

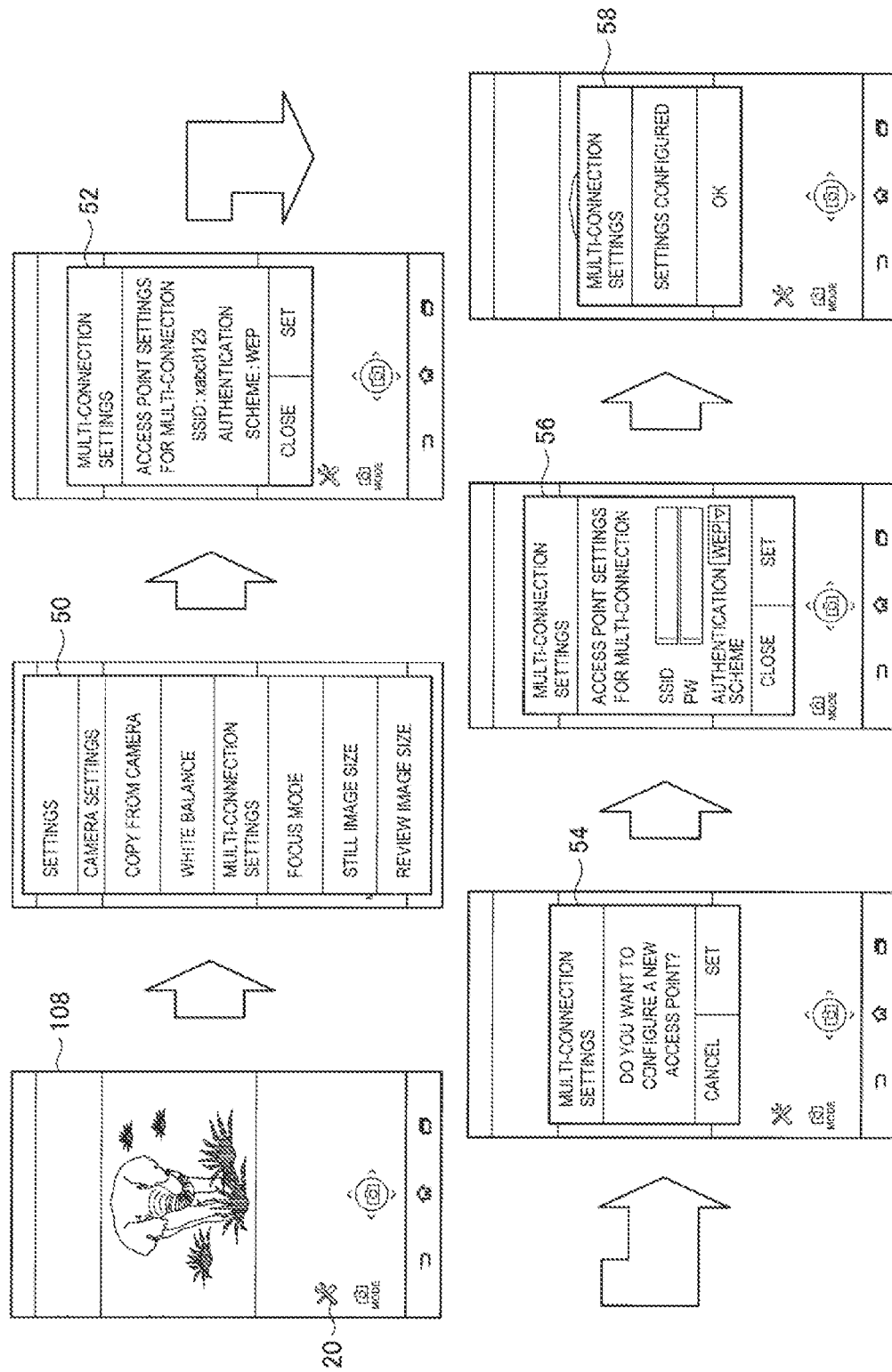

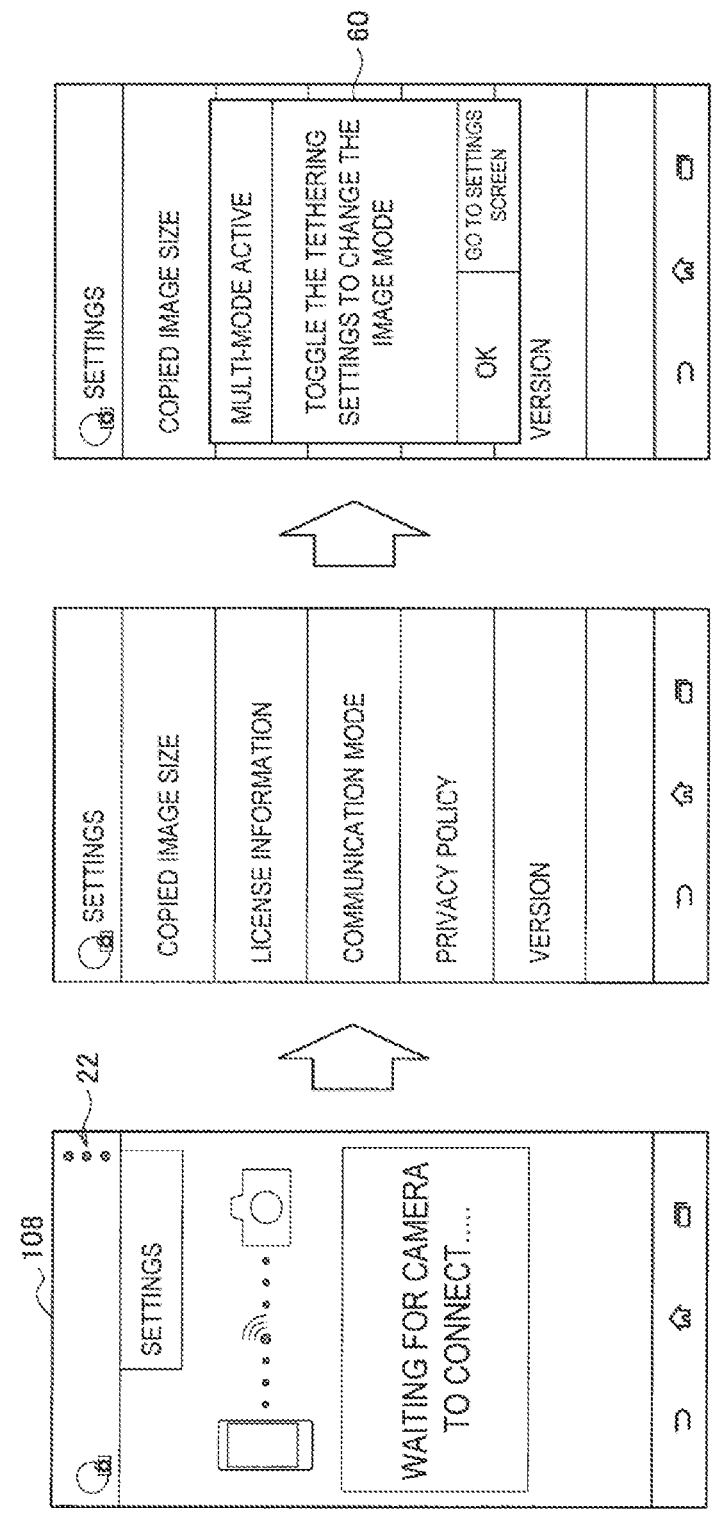

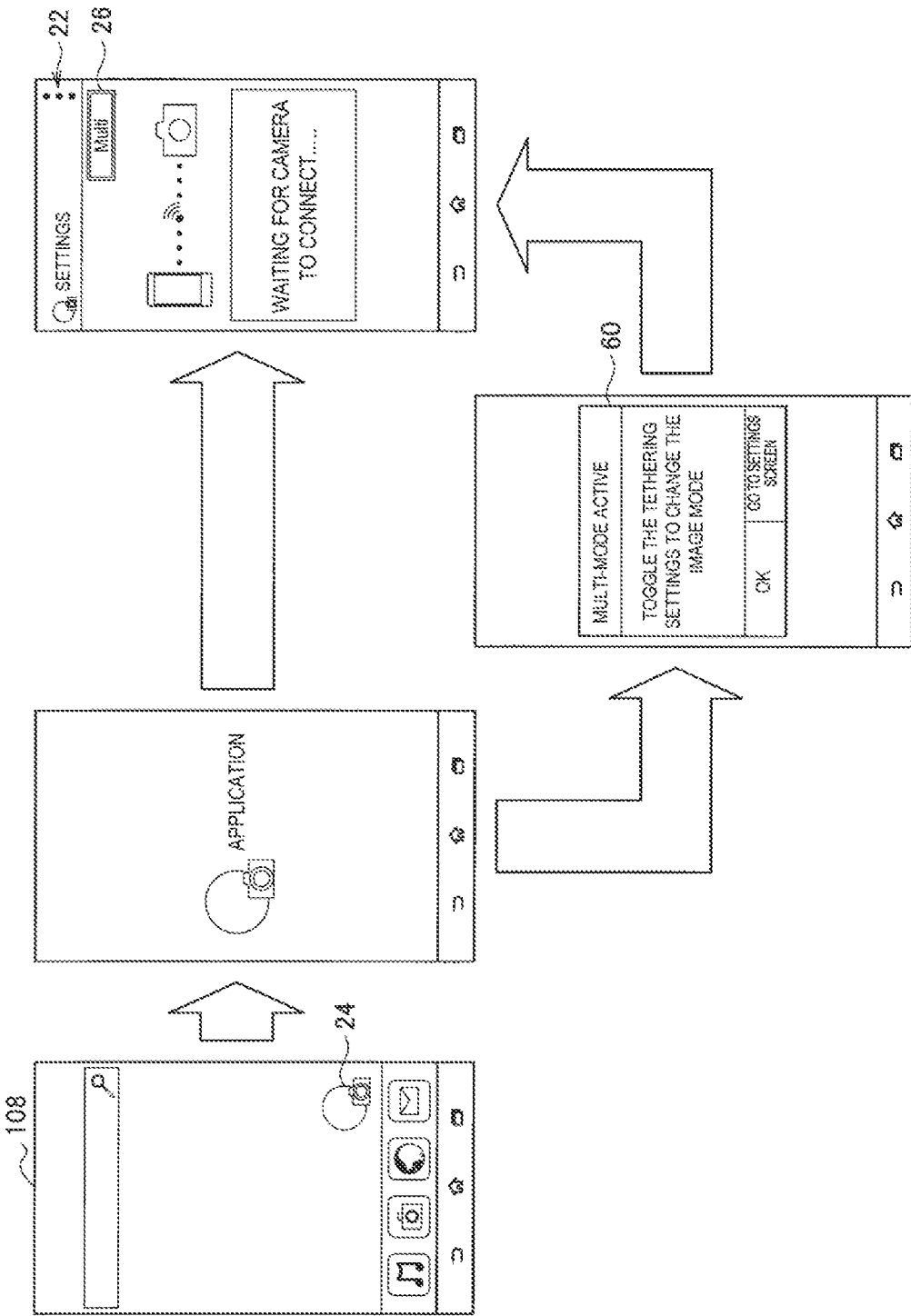
[Fig. 6]

[Fig. 7]
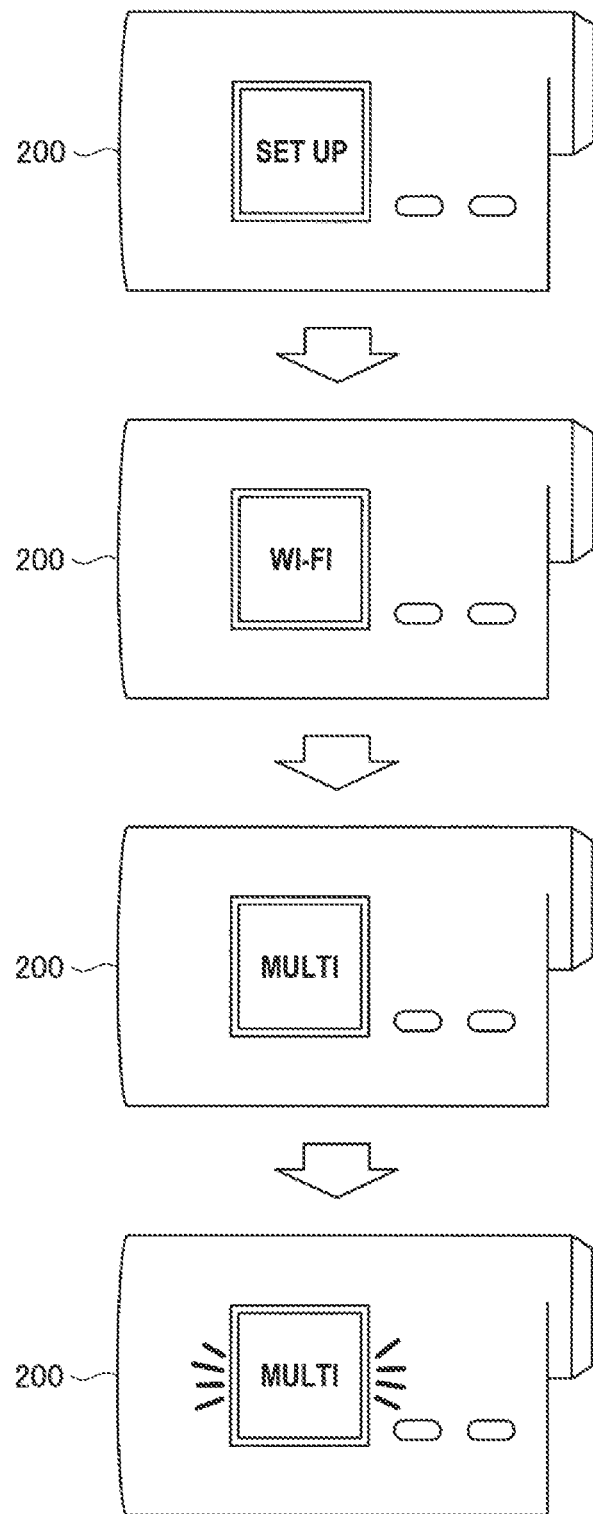

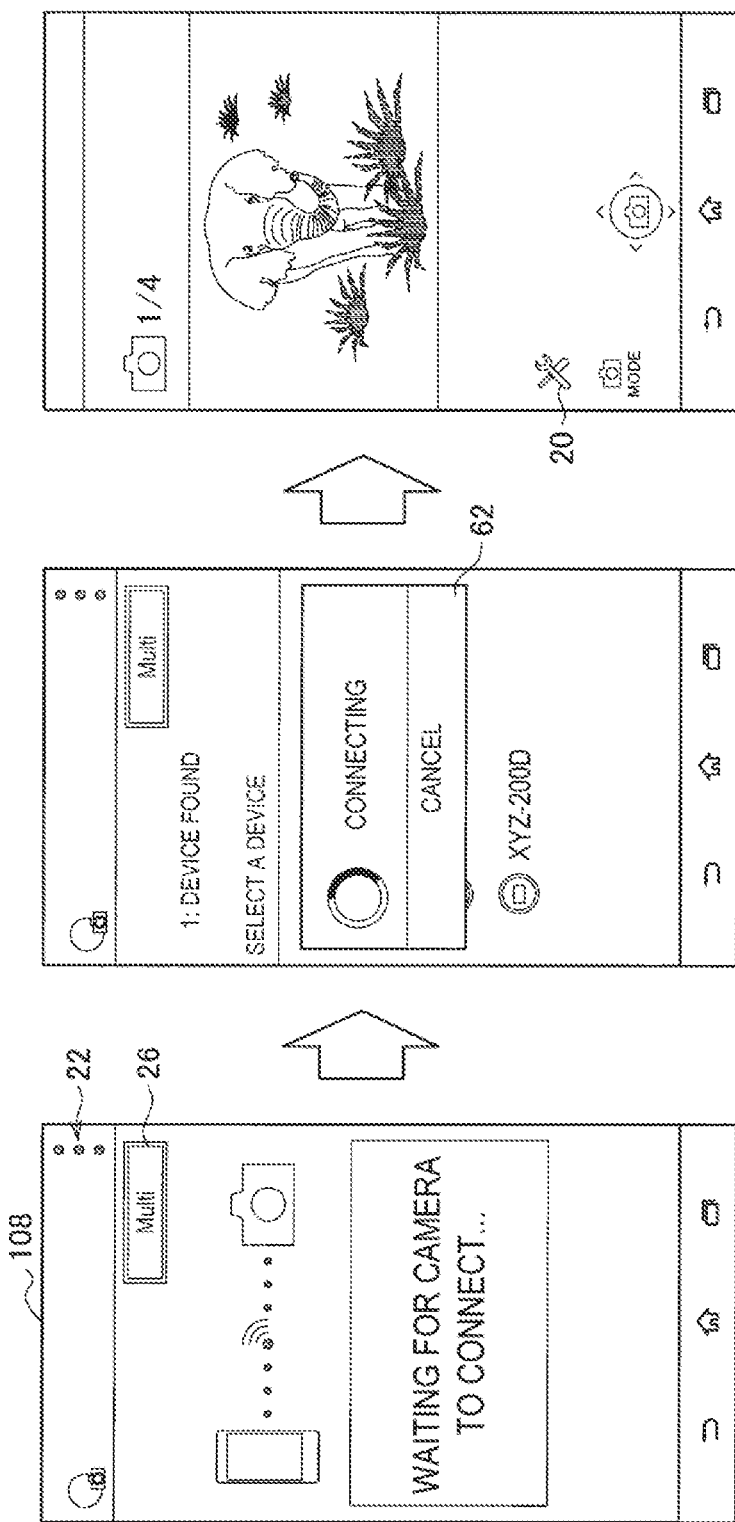

[Fig. 9]
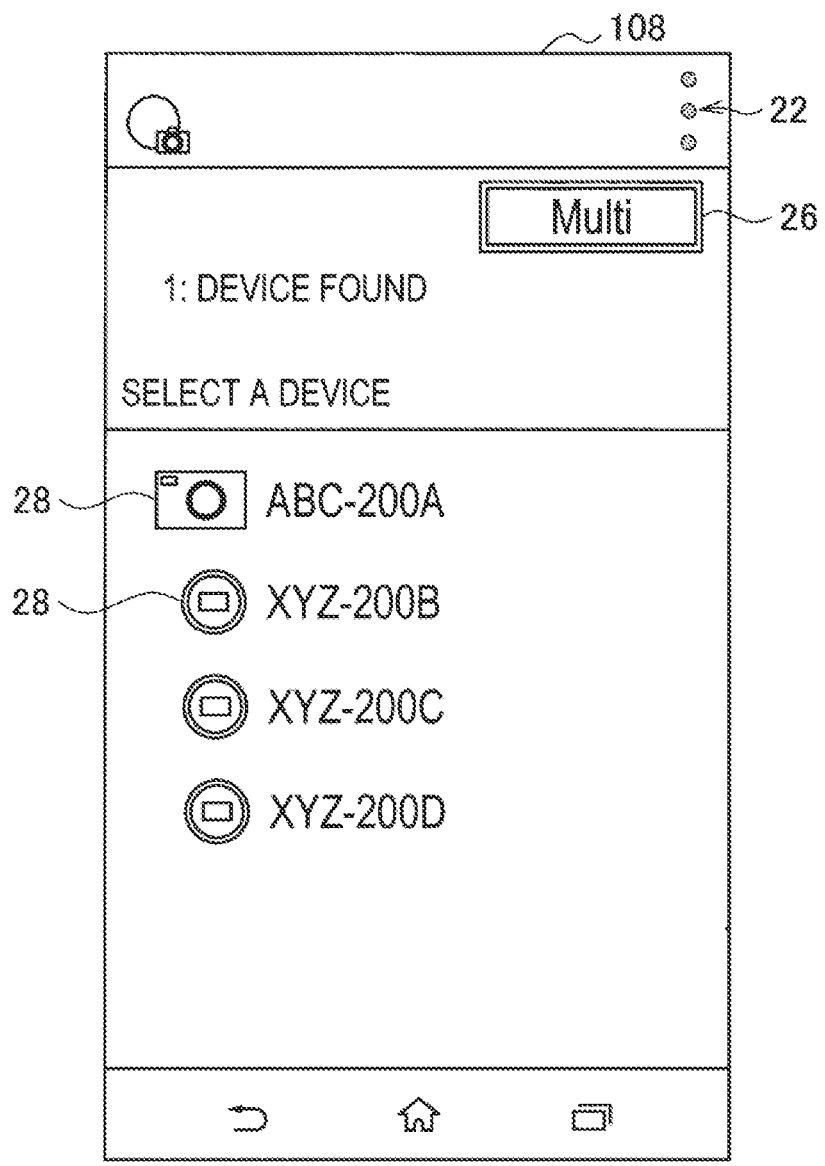

[Fig. 10]
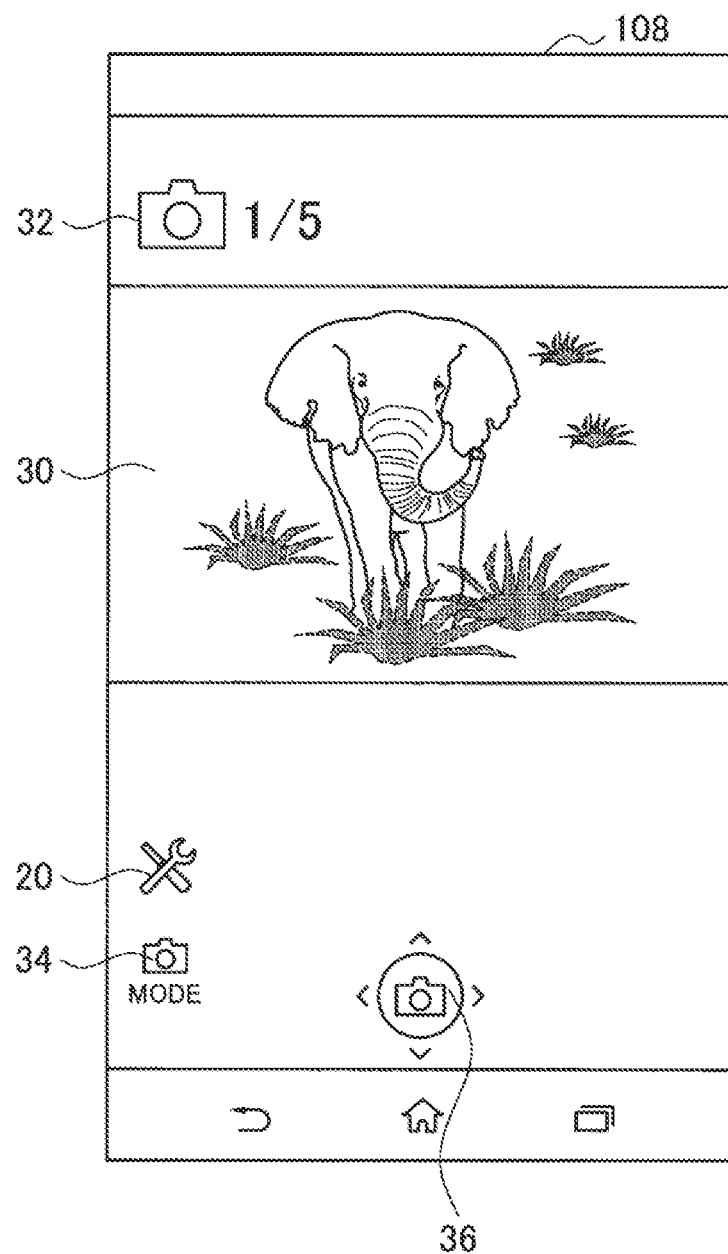

[Fig. 11]
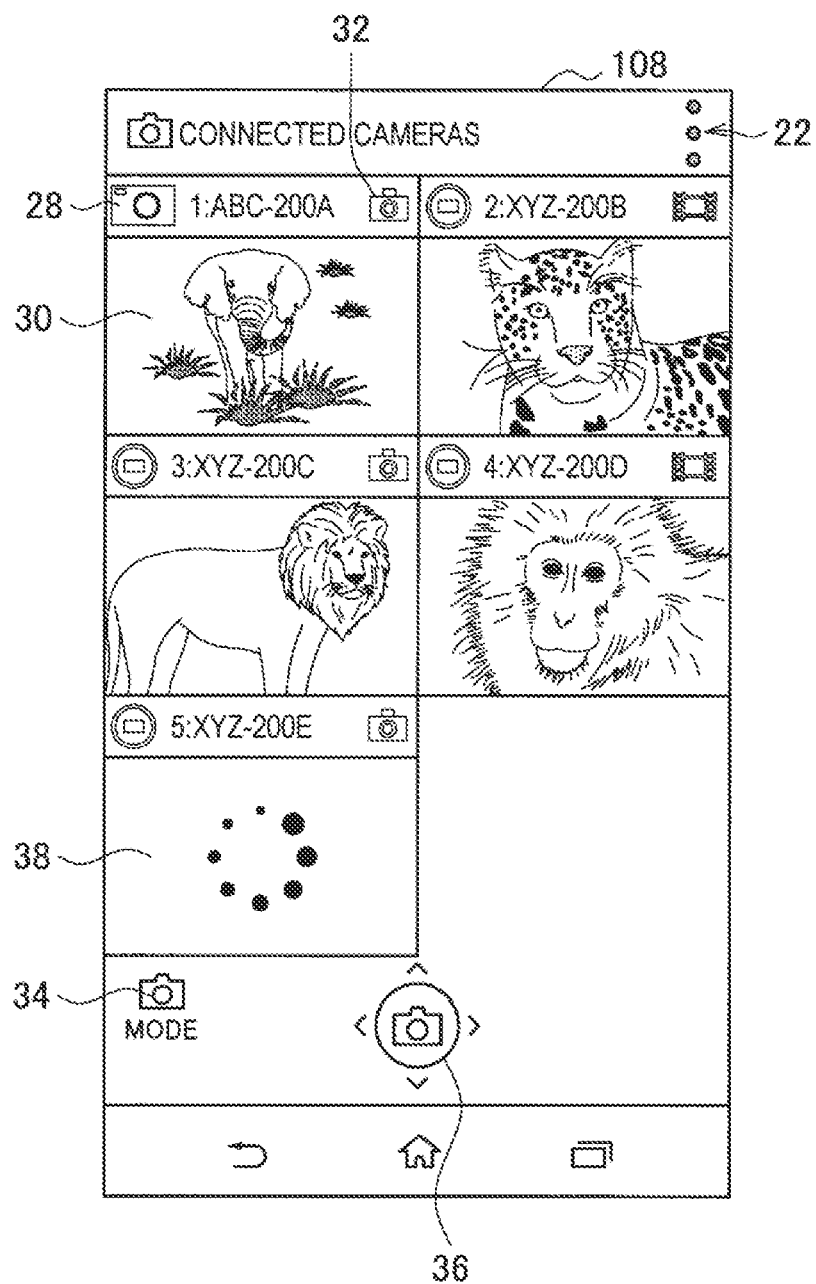

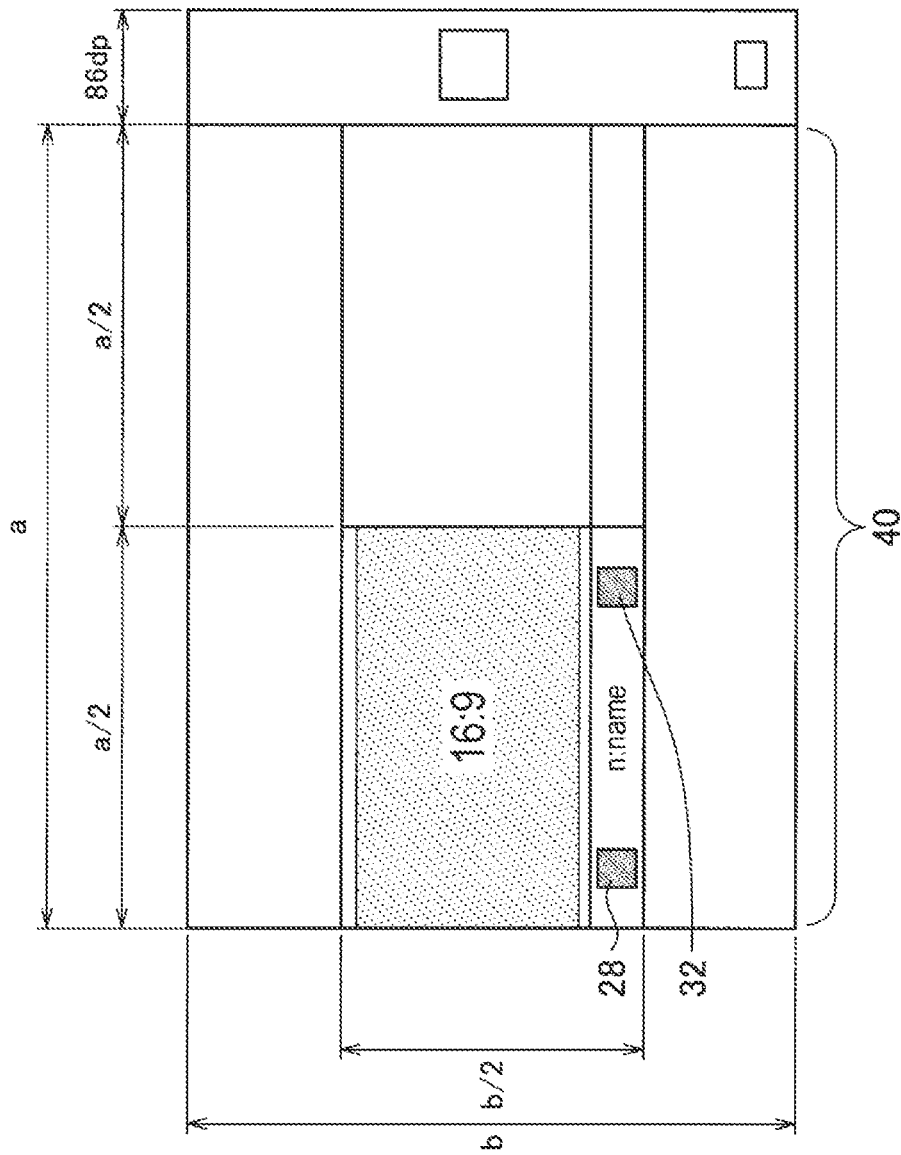

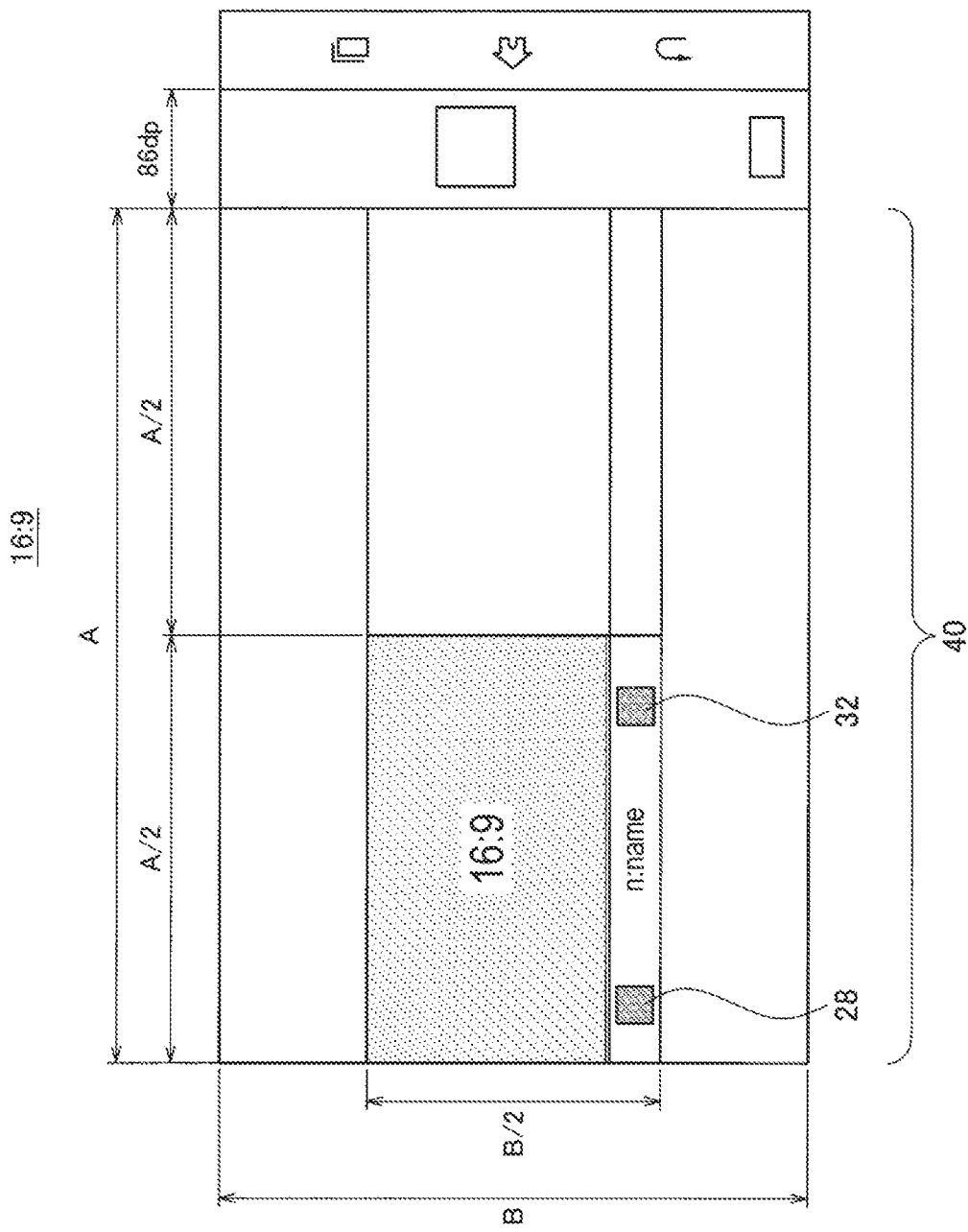
[Fig. 12B]

[Fig. 12C]
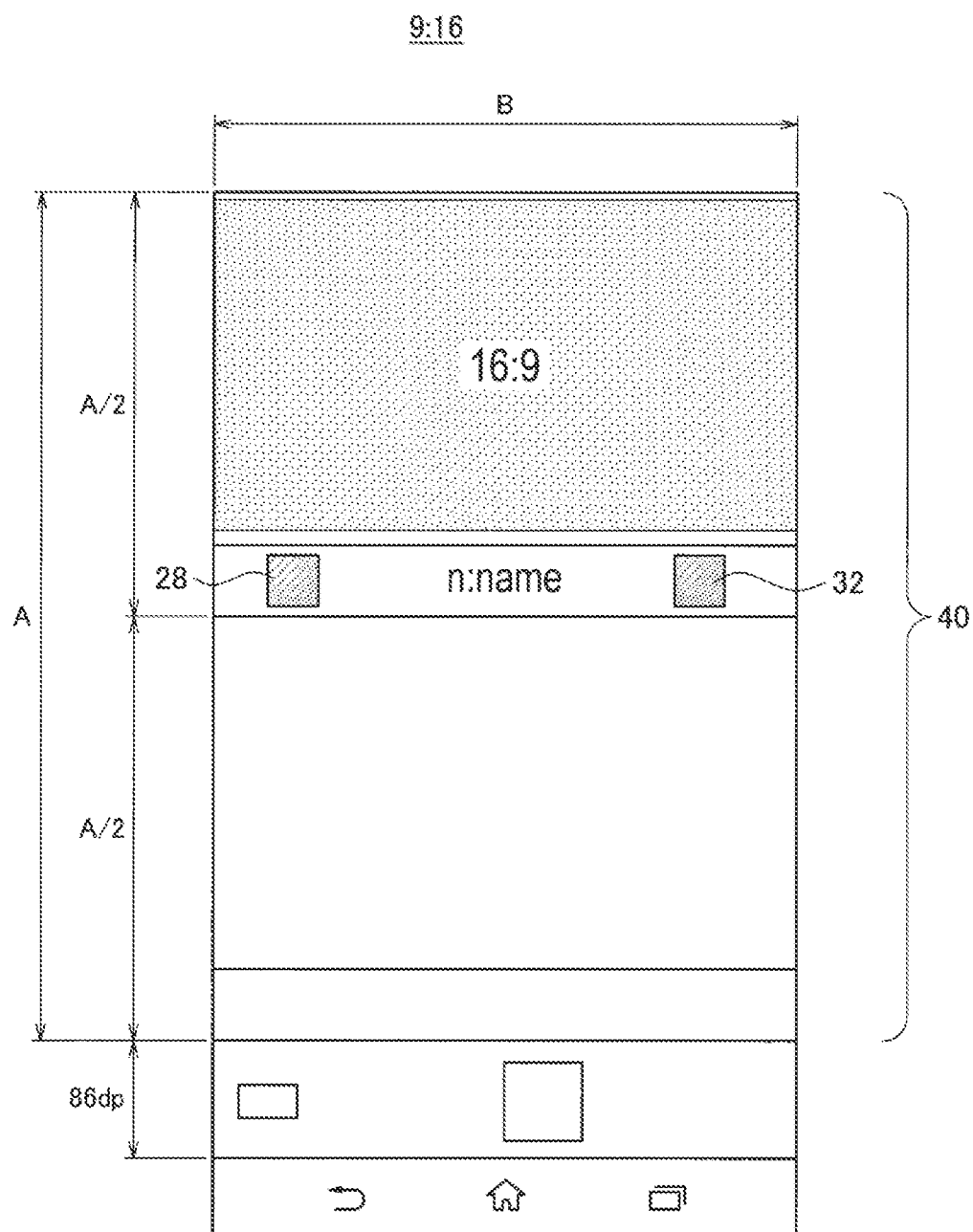

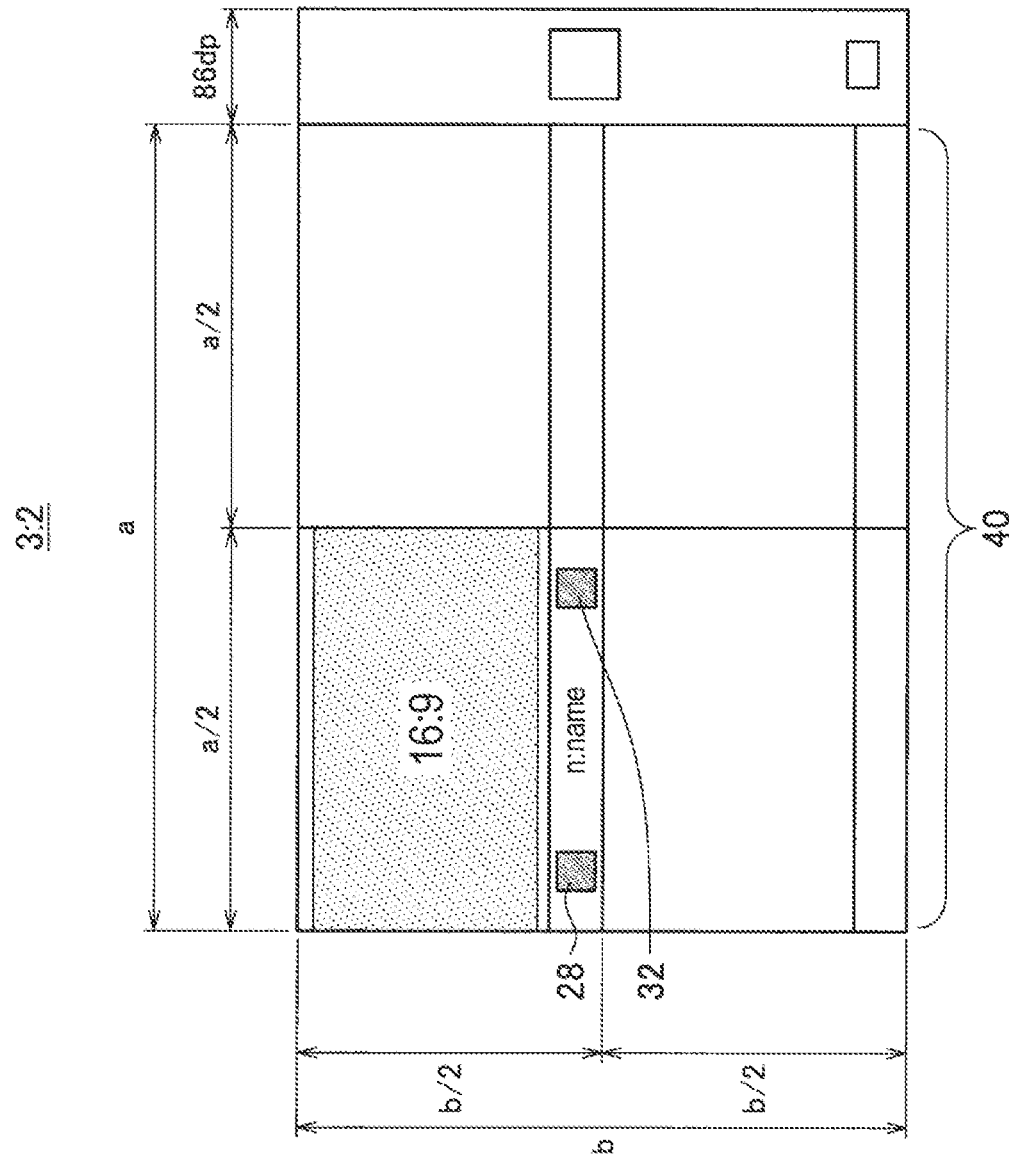

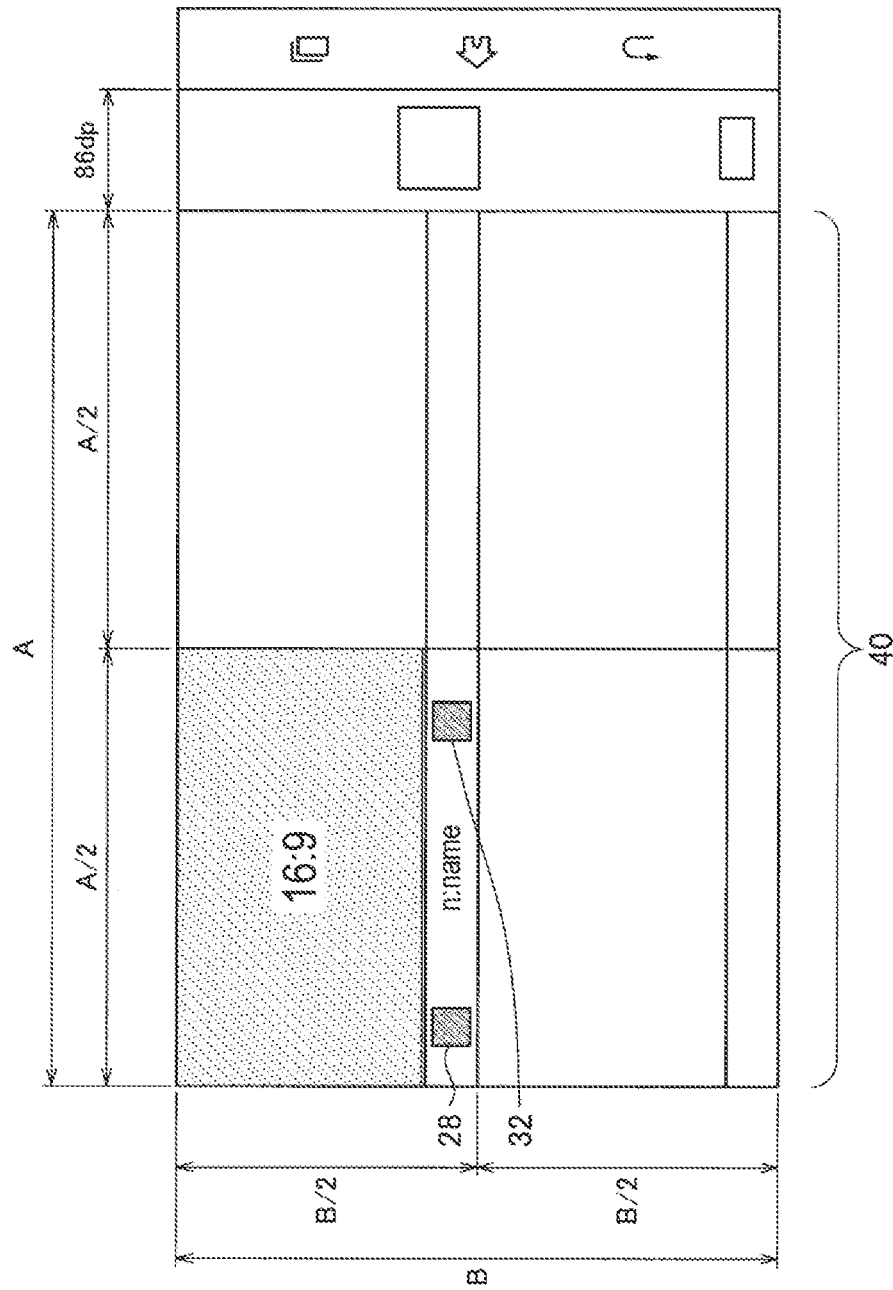

[Fig. 13C]
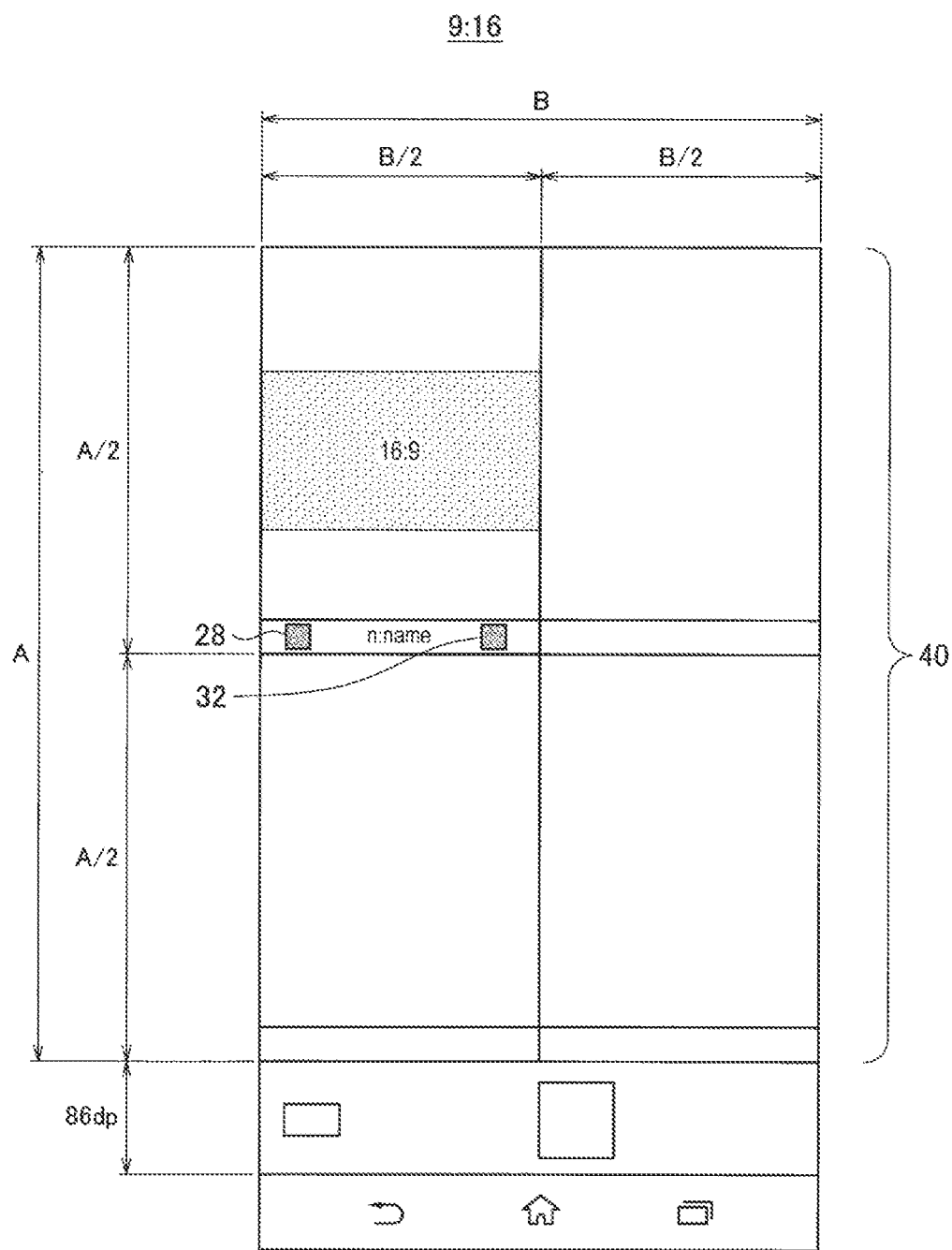

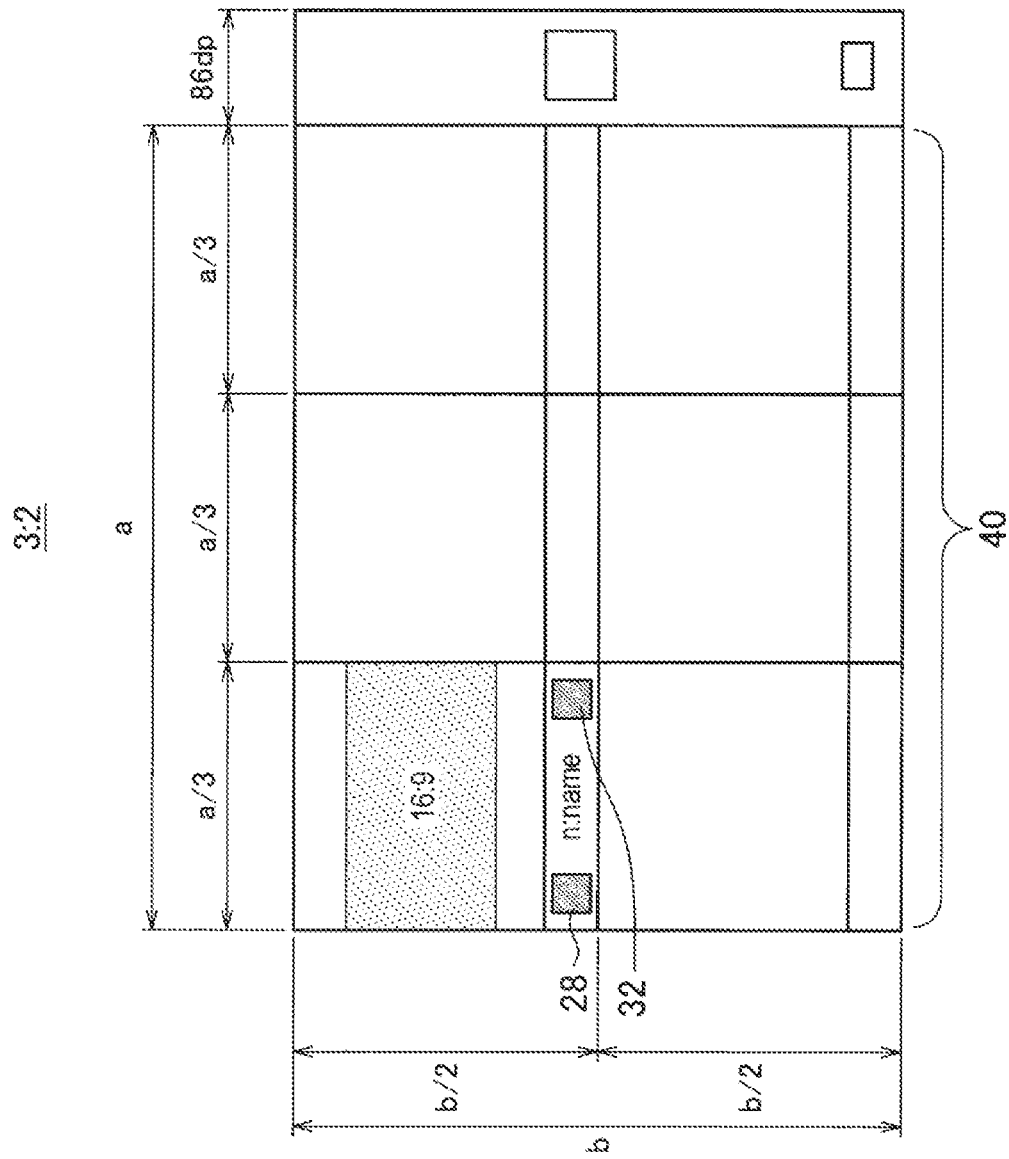
[Fig. 14A]

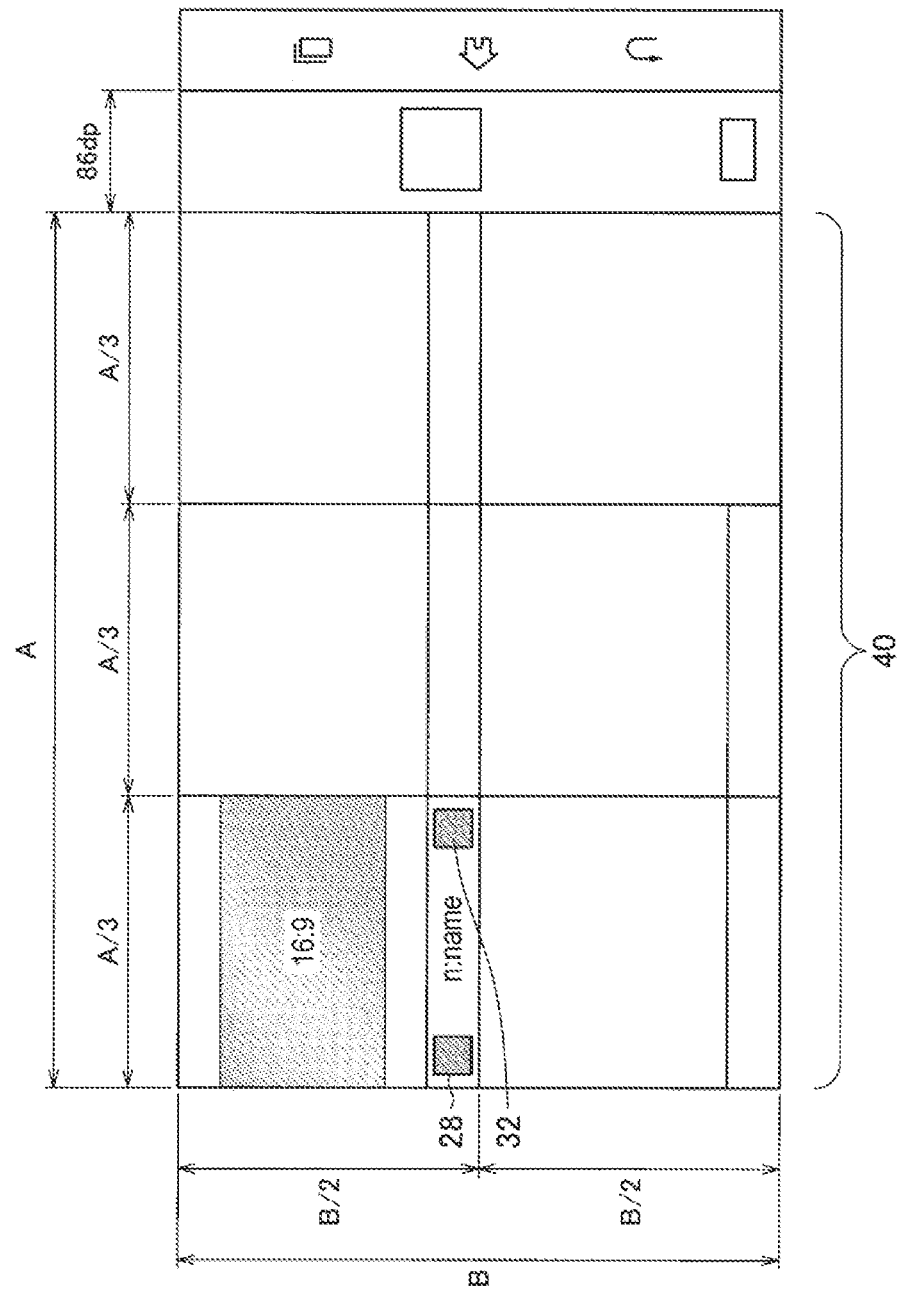
[Fig. 14B]

[Fig. 14C]
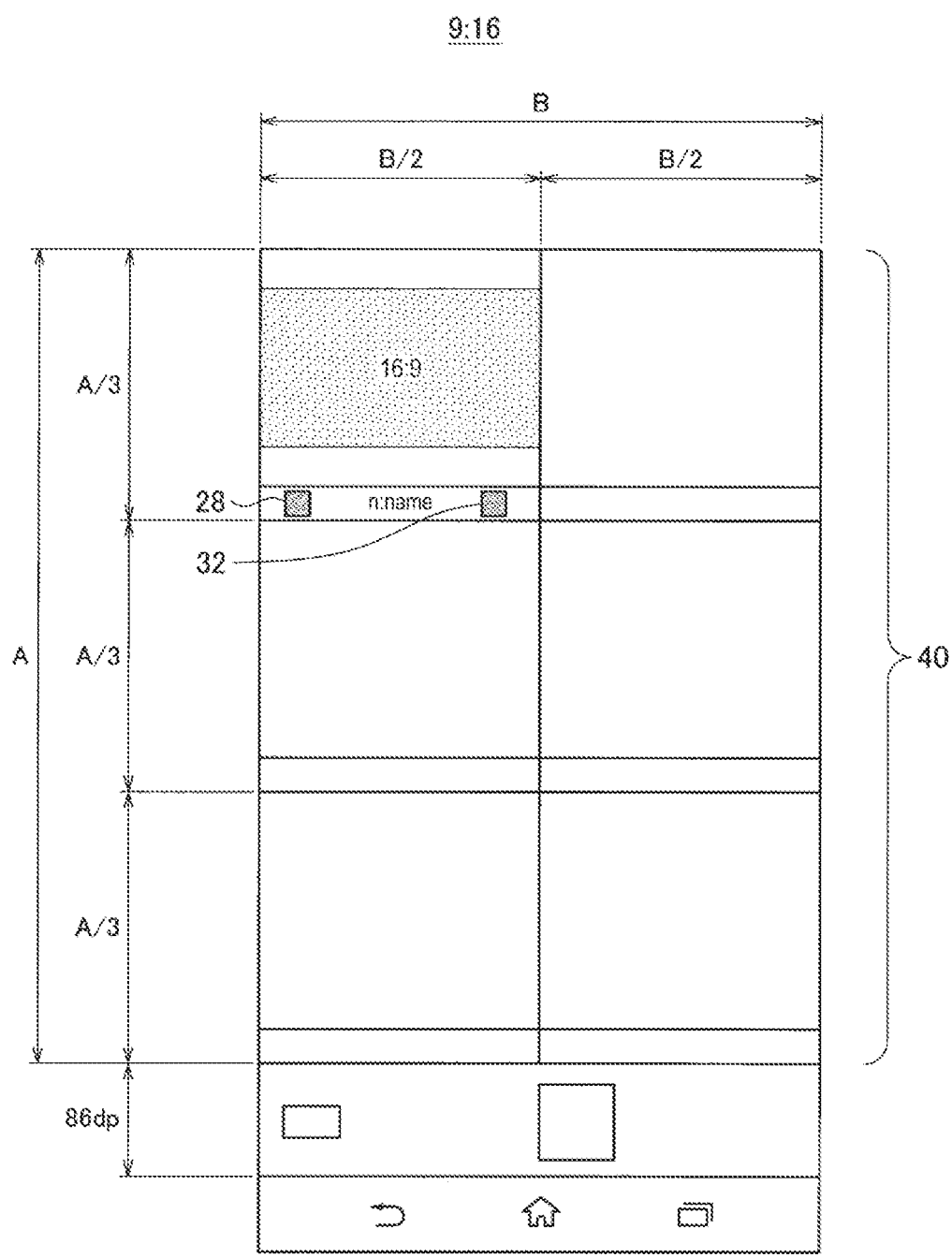

[Fig. 15A]
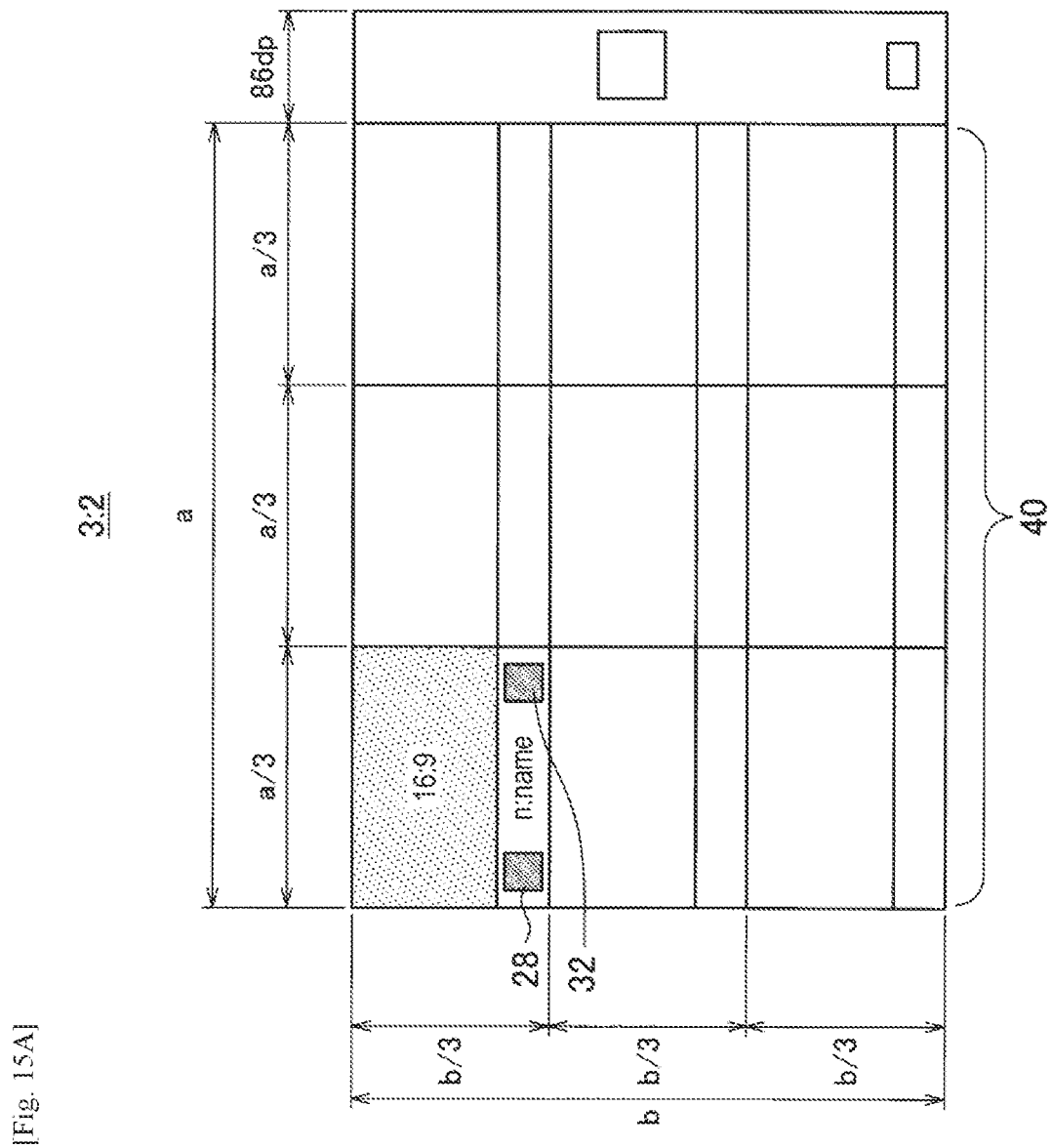

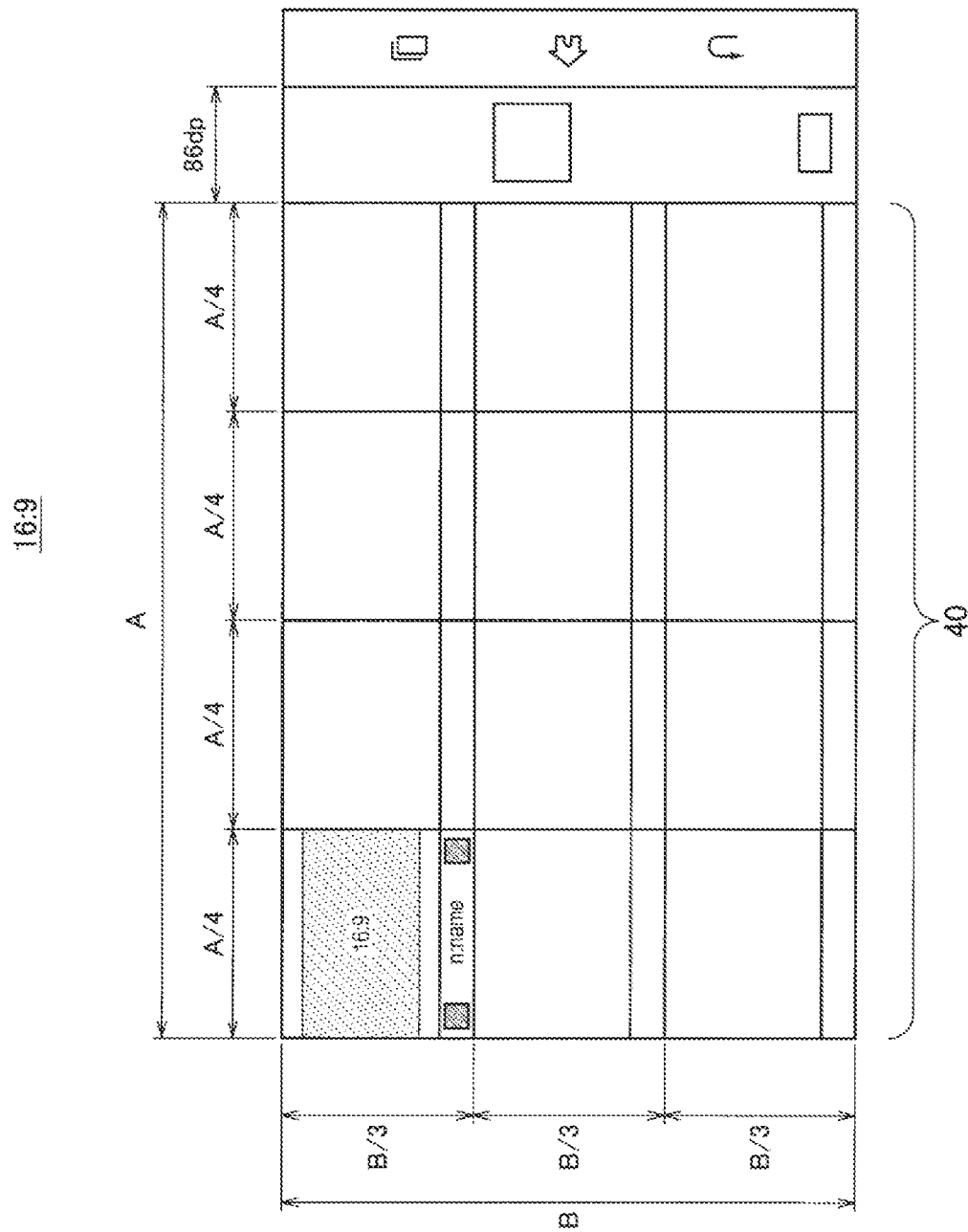

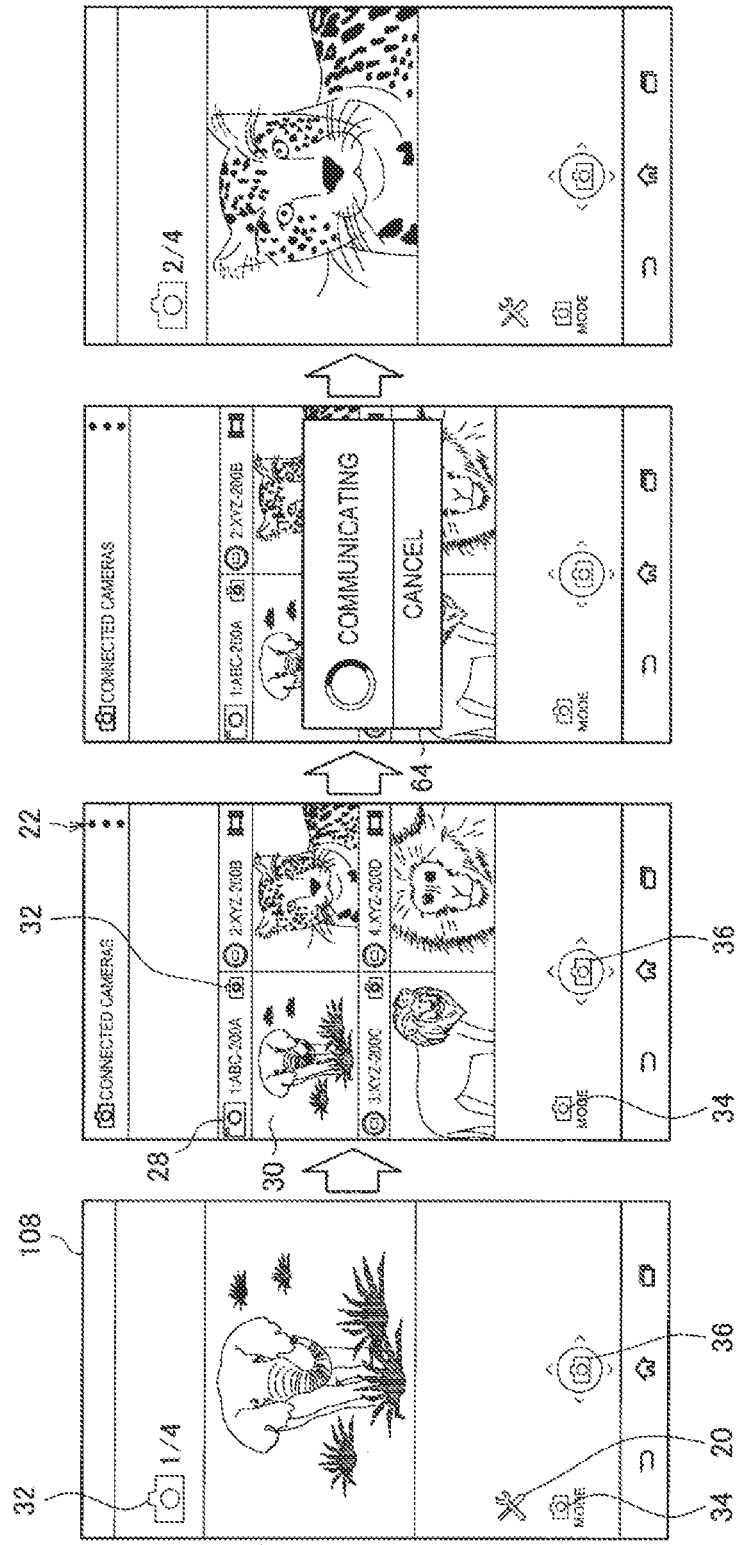
[Fig. 16]

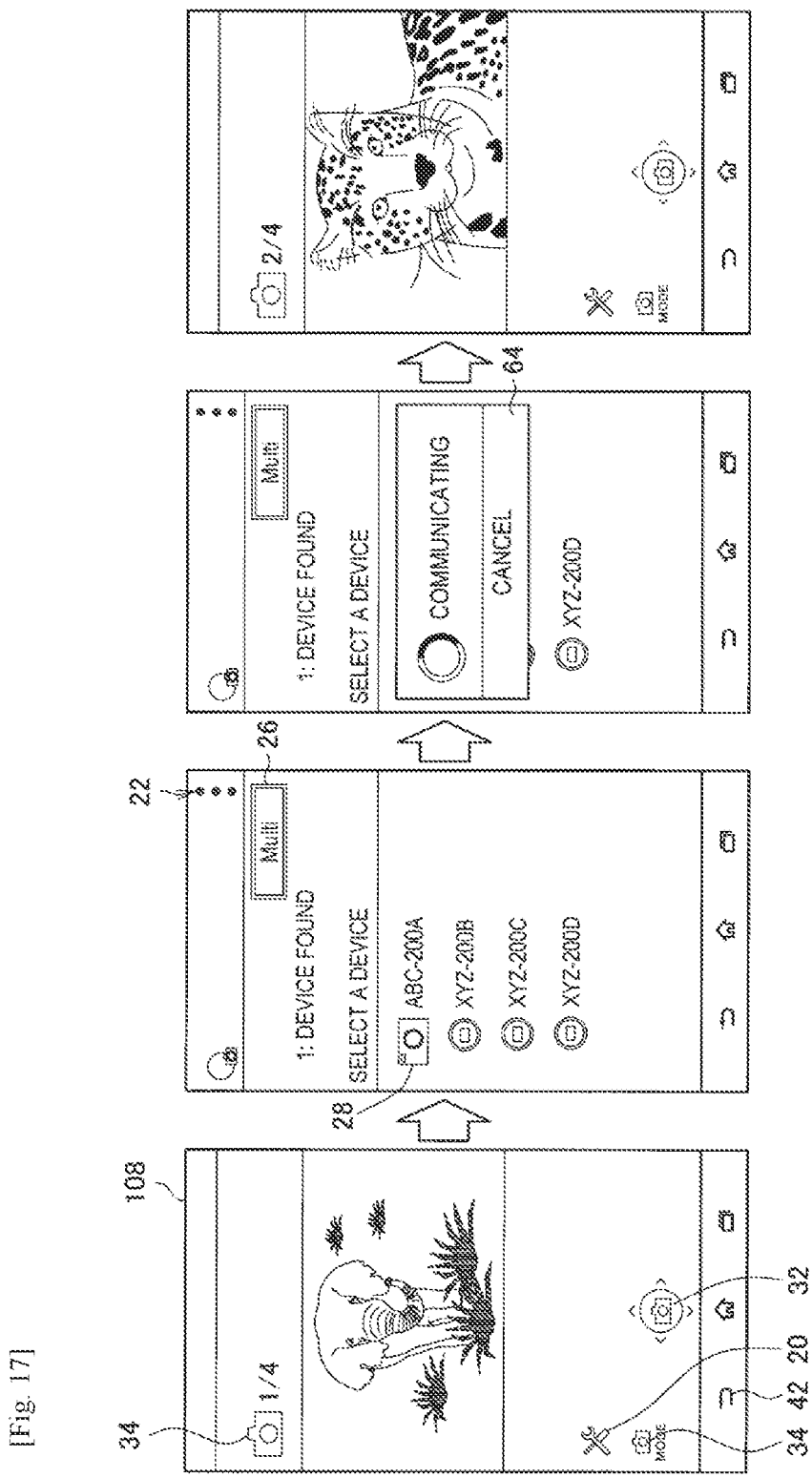
[Fig. 17]

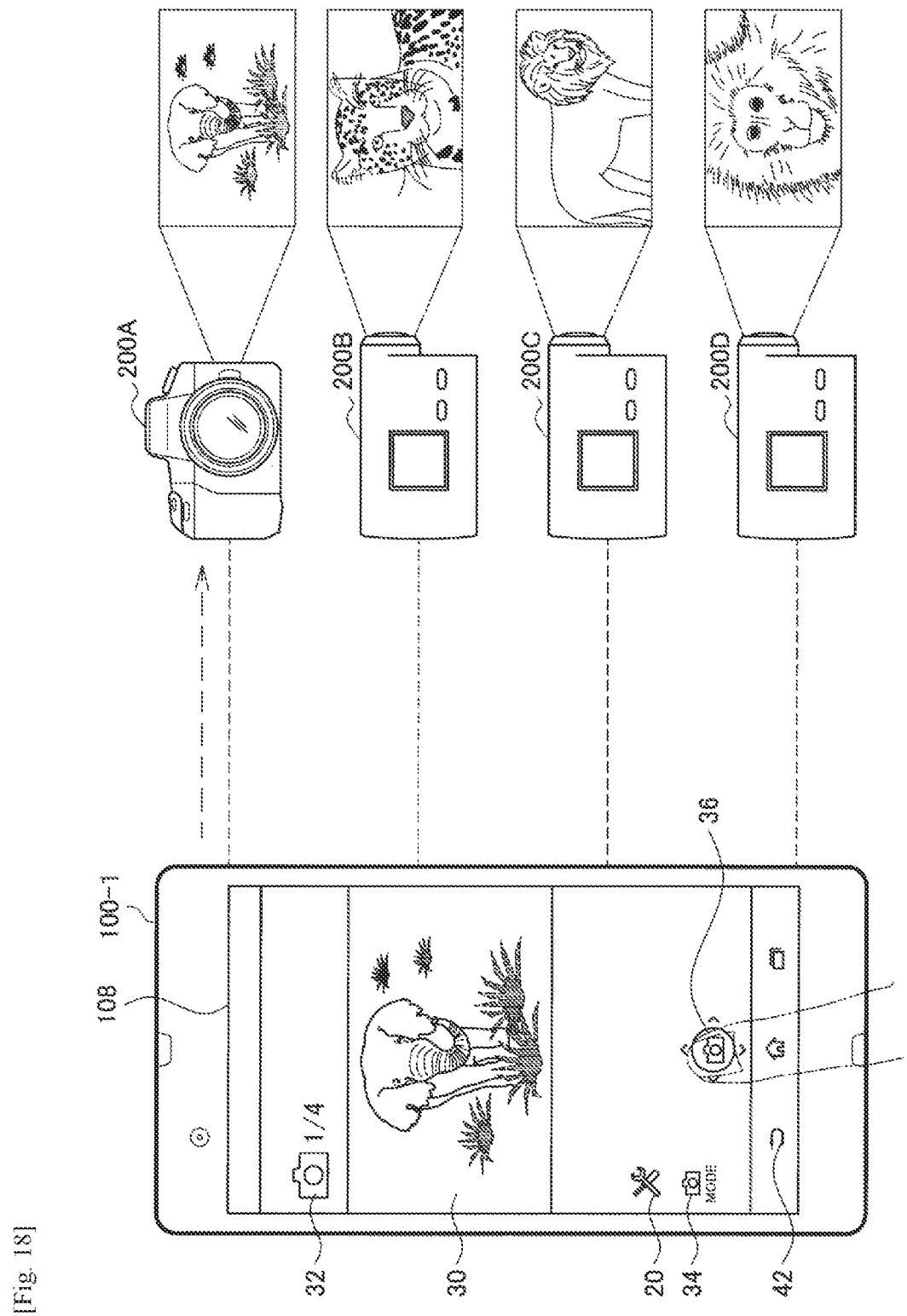
[Fig. 18]

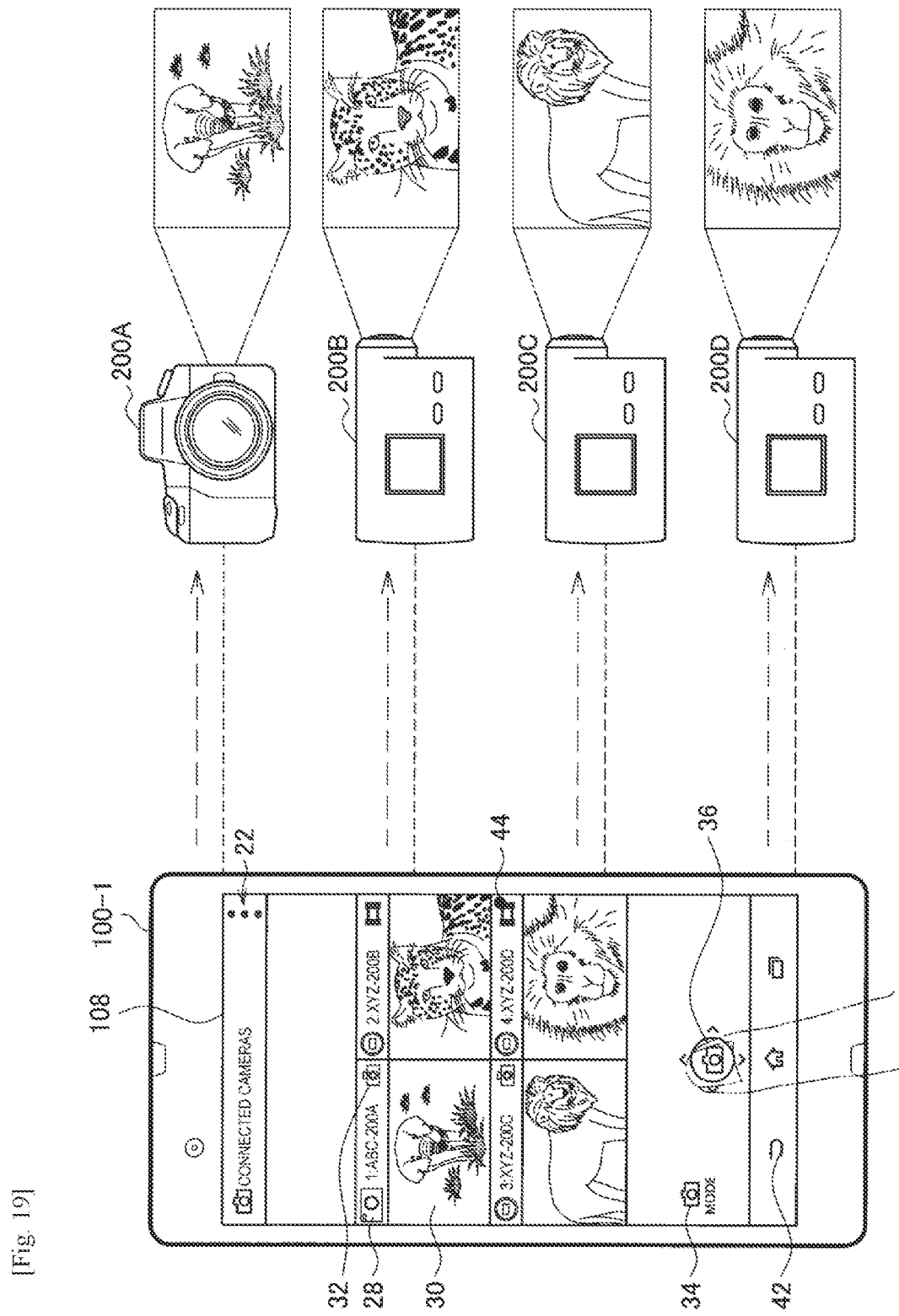

[Fig. 20]

| IMAGING DEVICE STATUS | VIDEO-TYPE SHOOTING MODE | STILL IMAGE-TYPE SHOOTING MODE |
|---|---|---|
| ALL IMAGING DEVICES STOPPED RECORDING | START RECORDING | TAKE STILL IMAGE |
| MULTIPLE IMAGING DEVICES RECORDING | STOP RECORDING | TAKE STILL IMAGE |
| ALL IMAGING DEVICES RECORDING | STOP RECORDING | TAKE STILL IMAGE |

| SETTINGS | SINGLE-VIEW SCREEN | | MULTI-VIEW SCREEN |
|---|---|---|---|
| | STILL IMAGE (NORMAL) | STILL IMAGE (CONTINUOUS) | STILL IMAGE (ALL) |
| DISPLAY: ON<br>SAVE: ON | DISPLAY: ON | DISPLAY: ON | DISPLAY: OFF |
| DISPLAY: OFF<br>SAVE: ON | DISPLAY: OFF | DISPLAY: ON | DISPLAY: OFF |
| DISPLAY: ON<br>SAVE: OFF | DISPLAY: ON | DISPLAY: ON | DISPLAY: OFF |
| DISPLAY: OFF<br>SAVE: OFF | DISPLAY: OFF | DISPLAY: OFF | DISPLAY: OFF |

T2

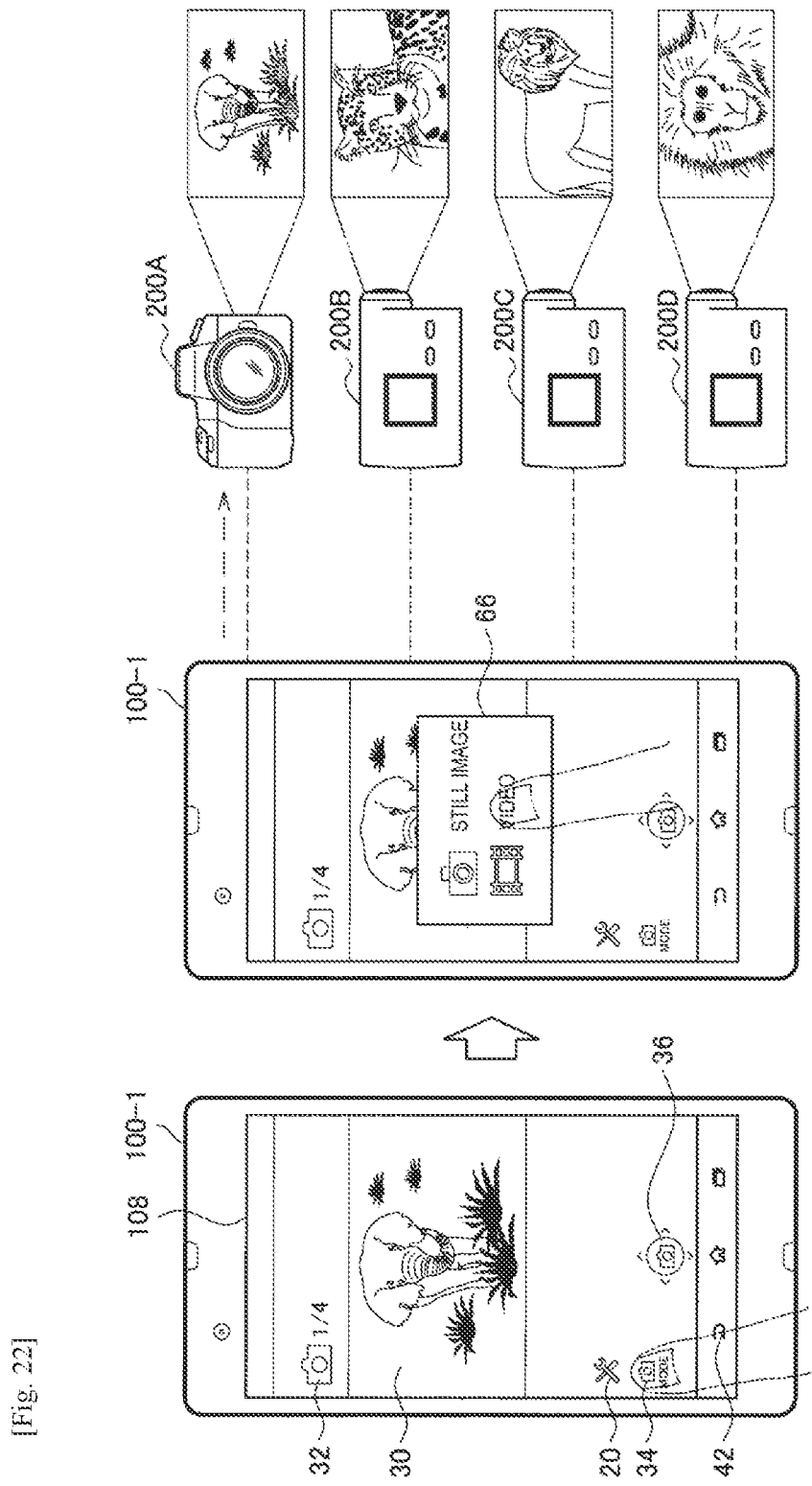
[Fig. 22]

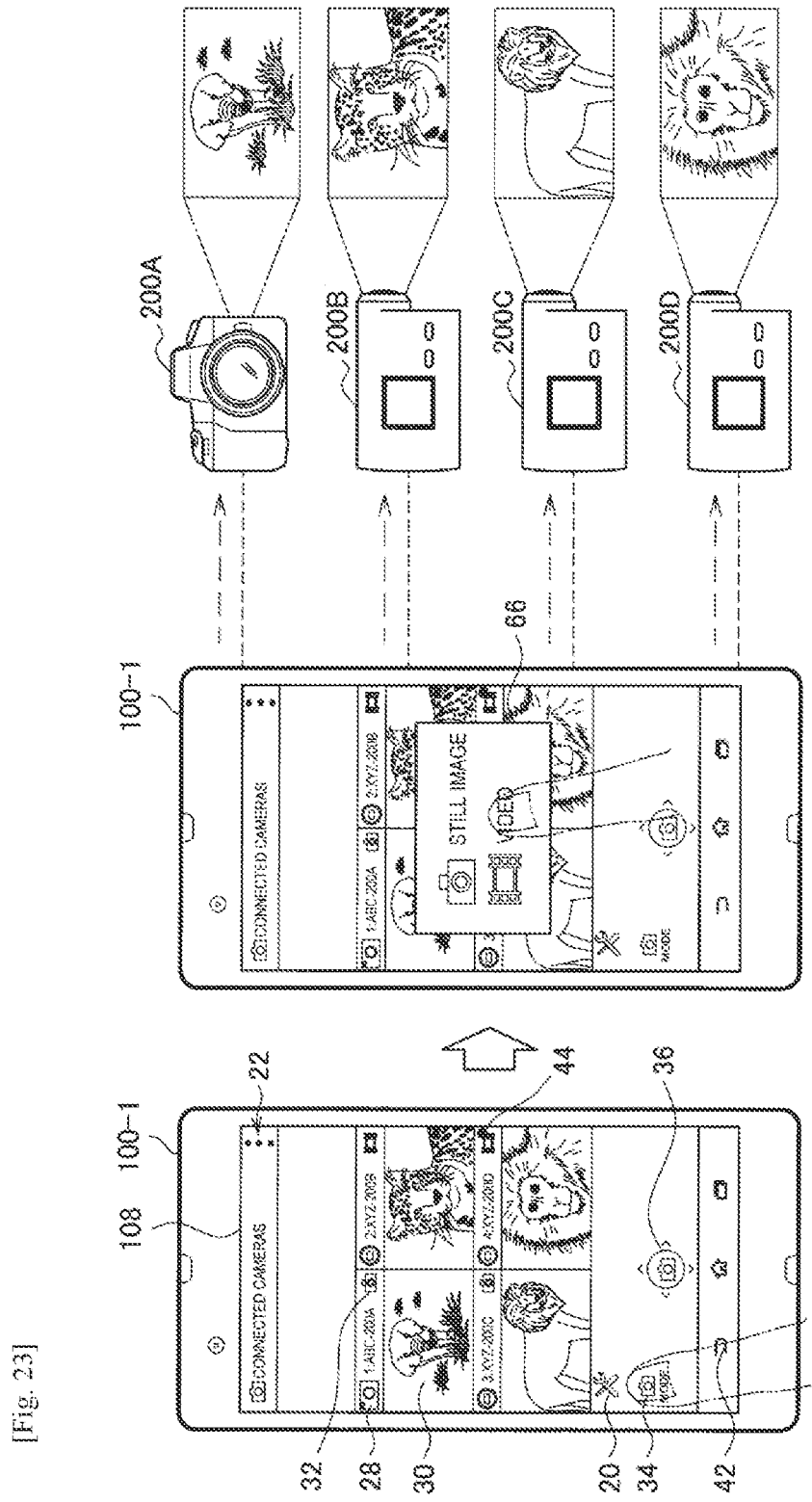
[Fig. 23]

[Fig. 24A]
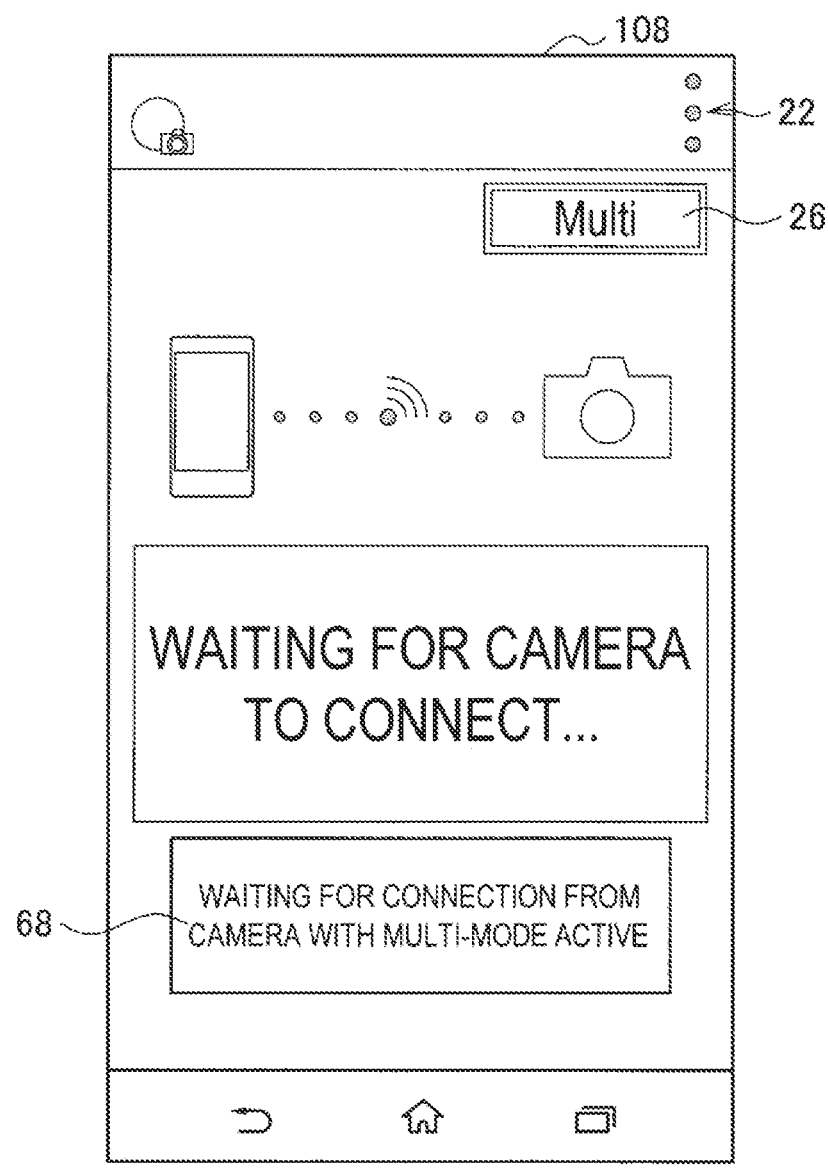

[Fig. 24B]
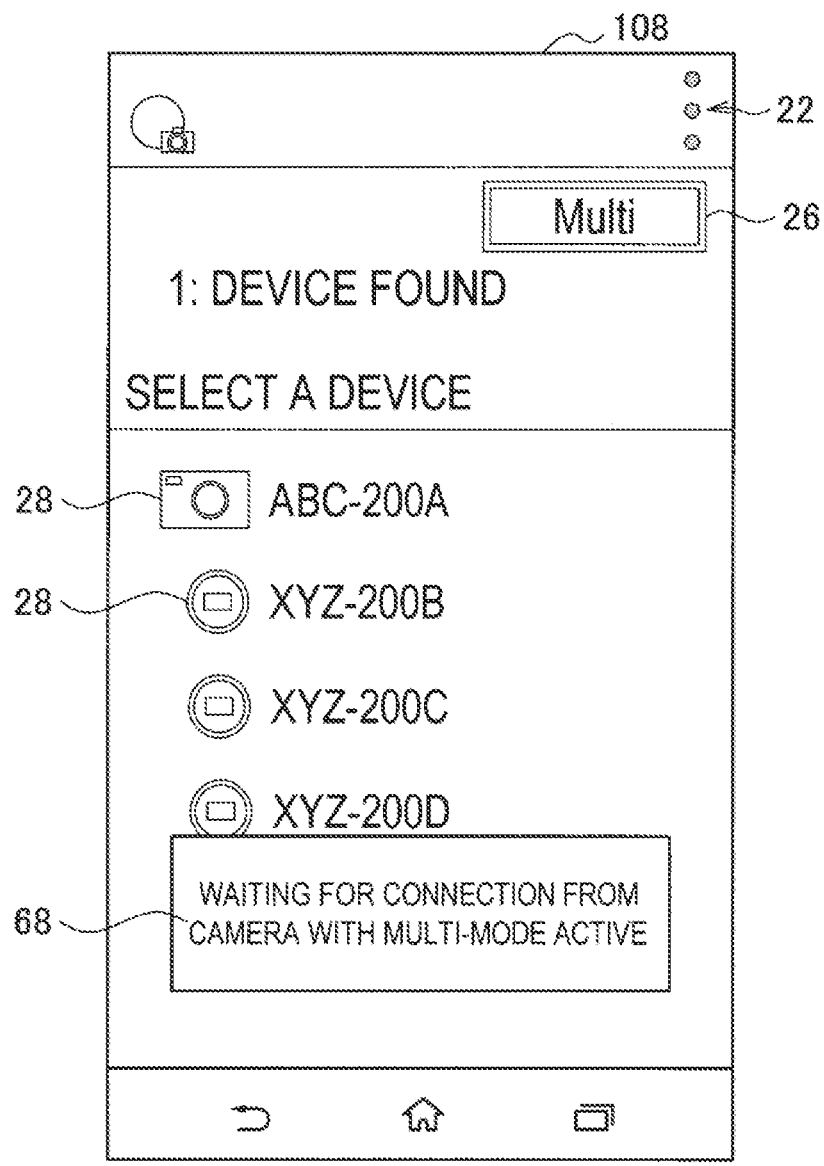

[Fig. 24C]
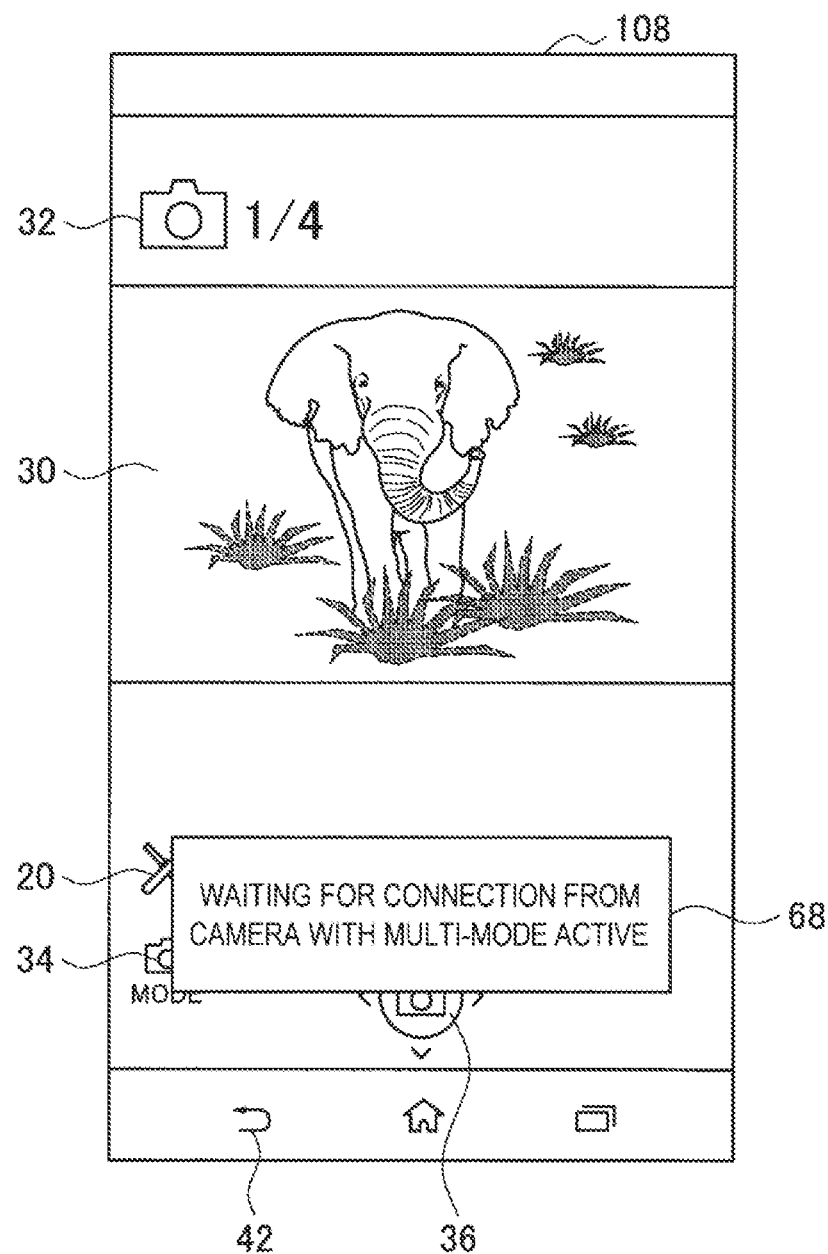

[Fig. 24D]
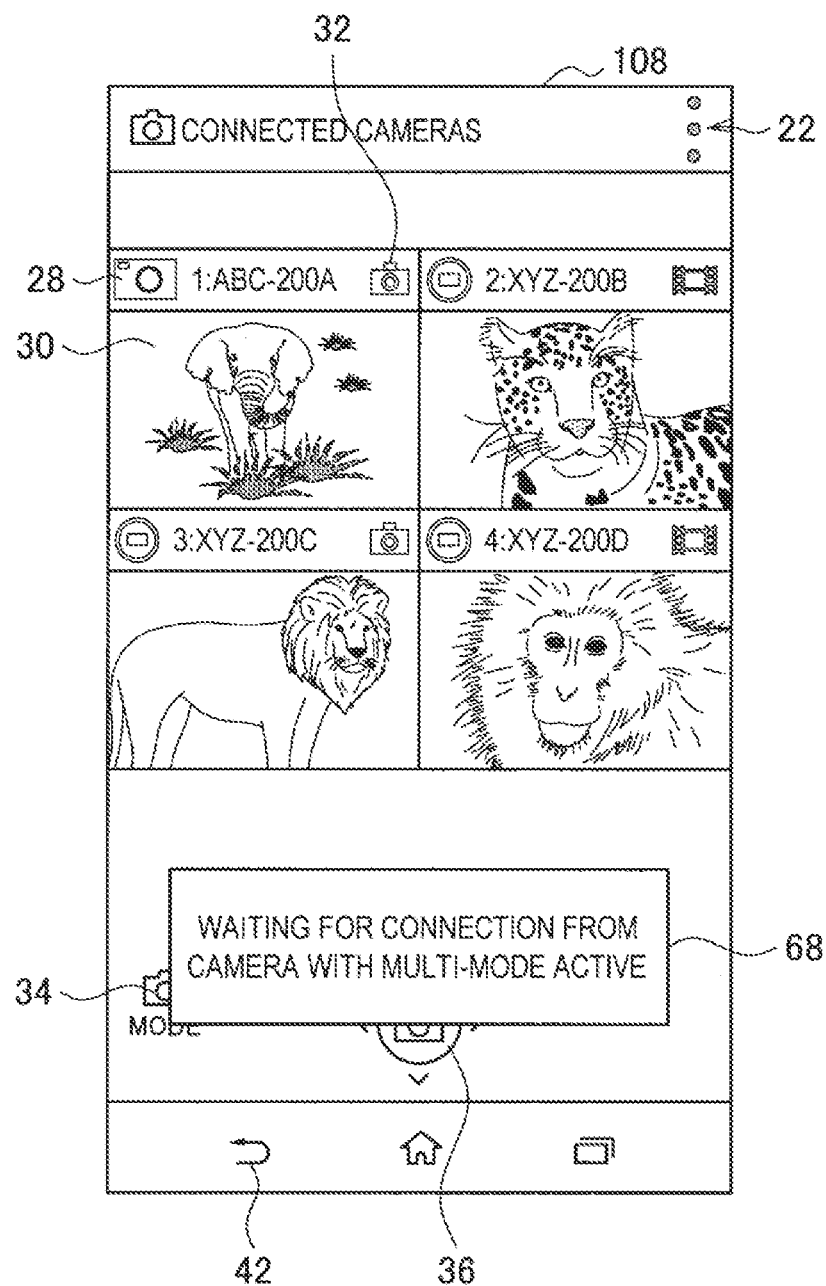

[Fig. 25]
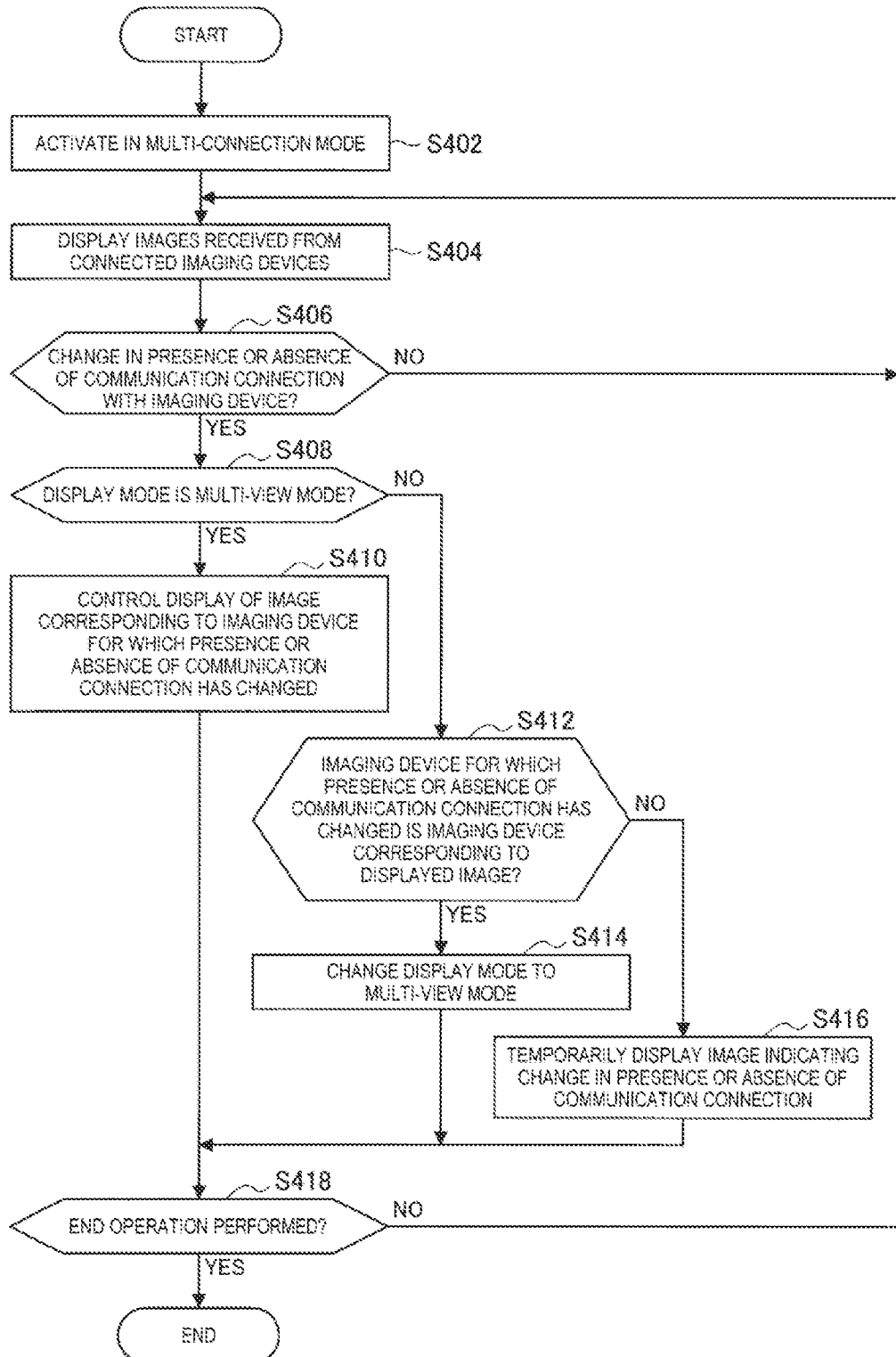

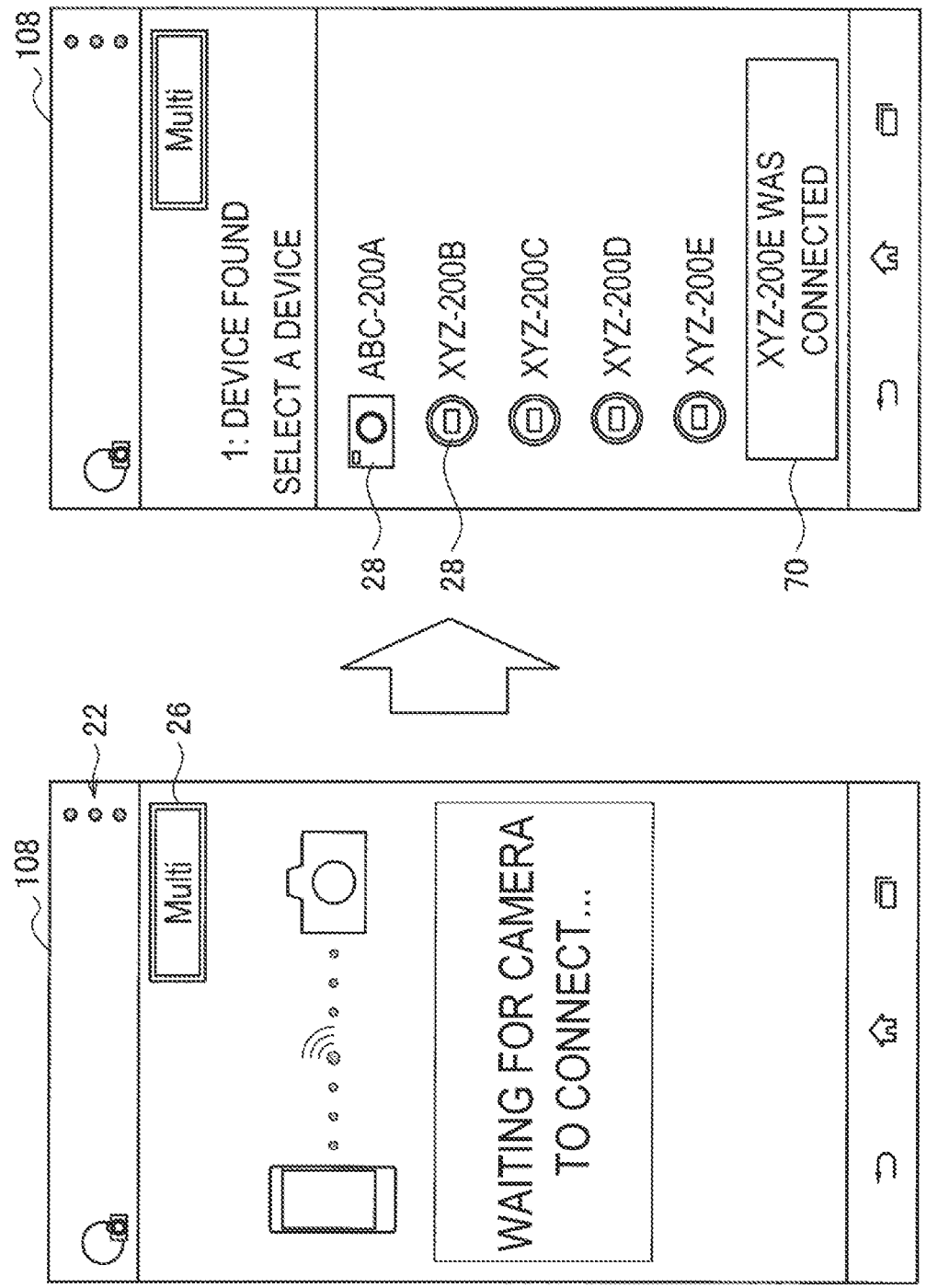

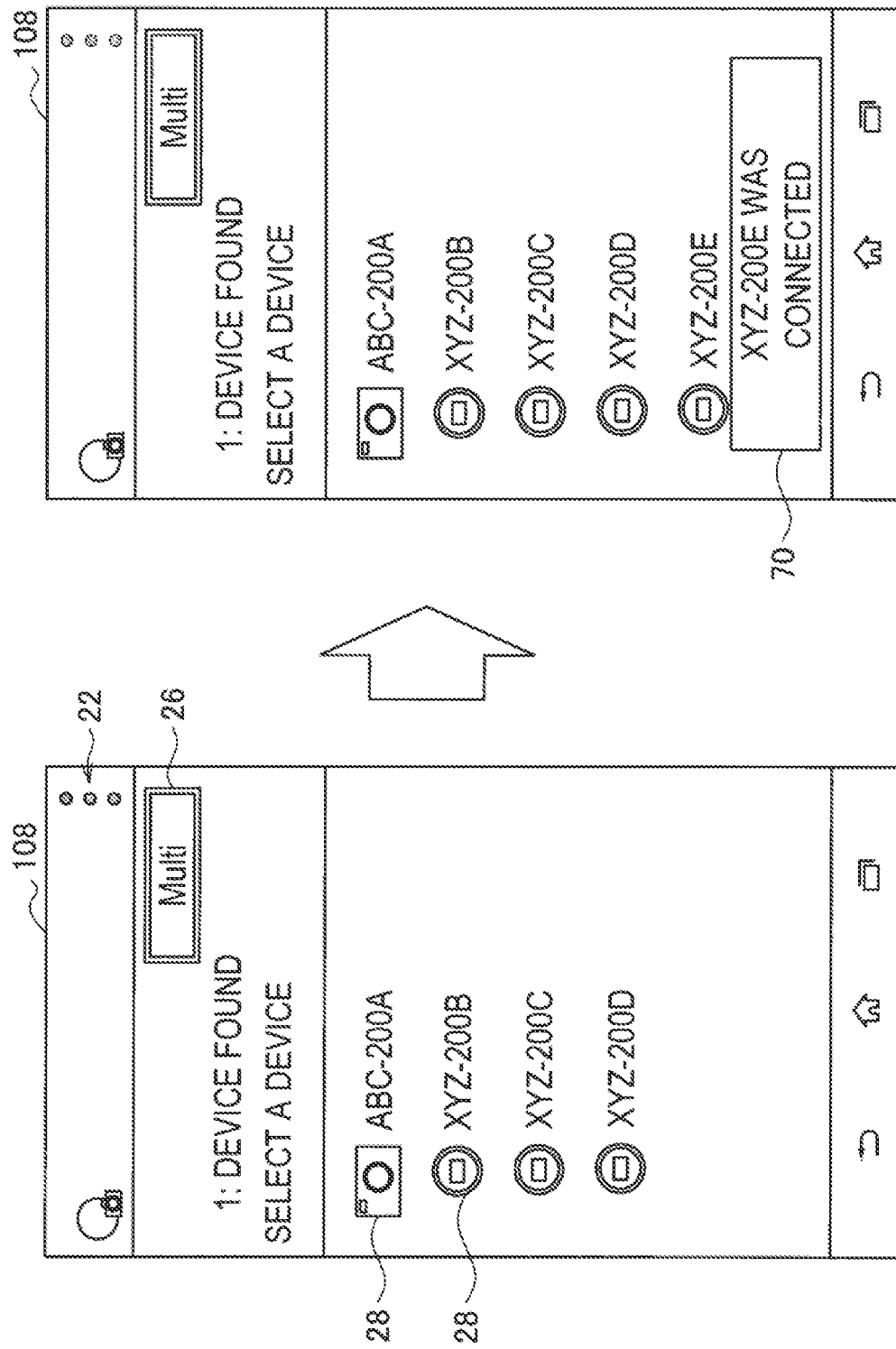

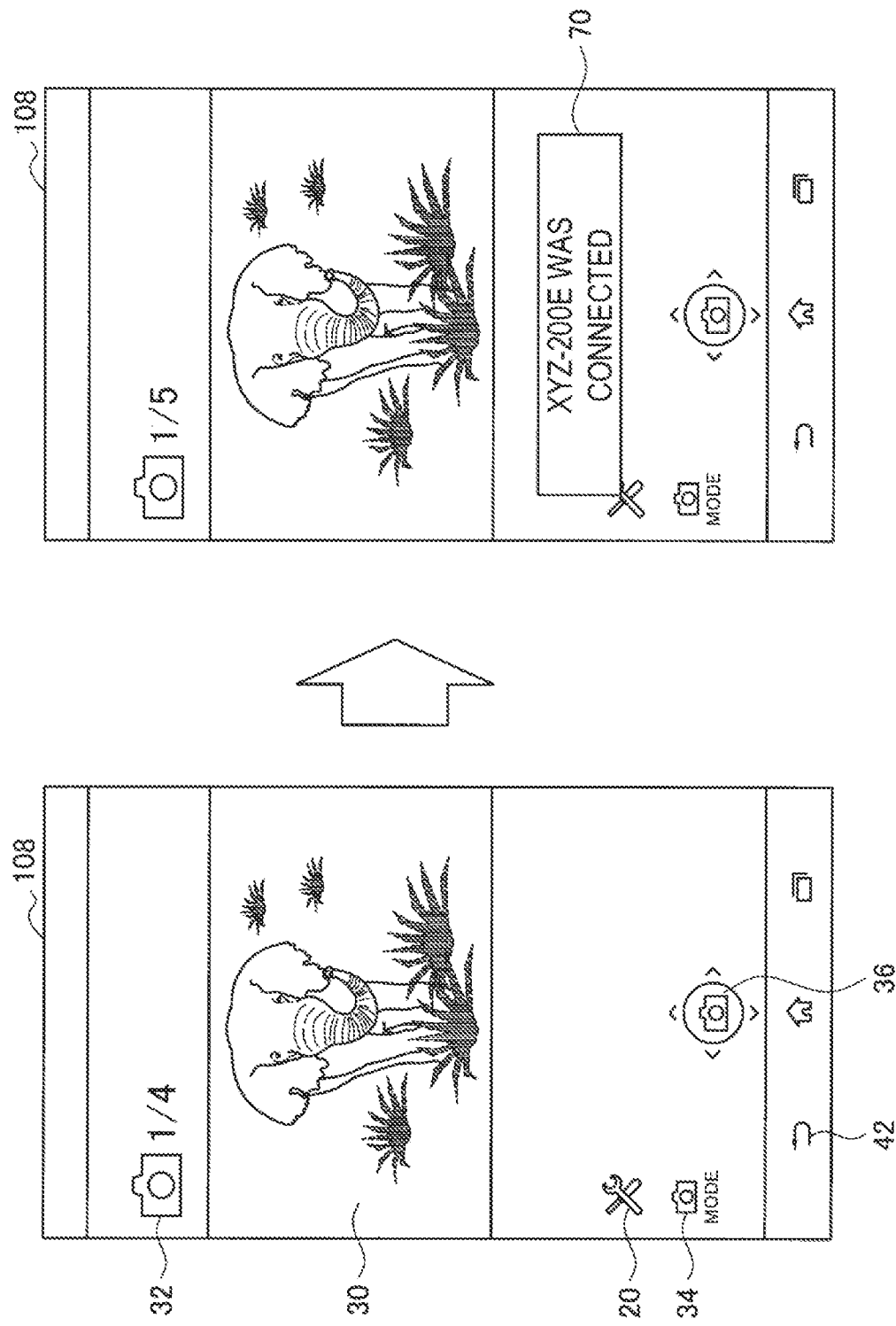

[Fig. 26D]
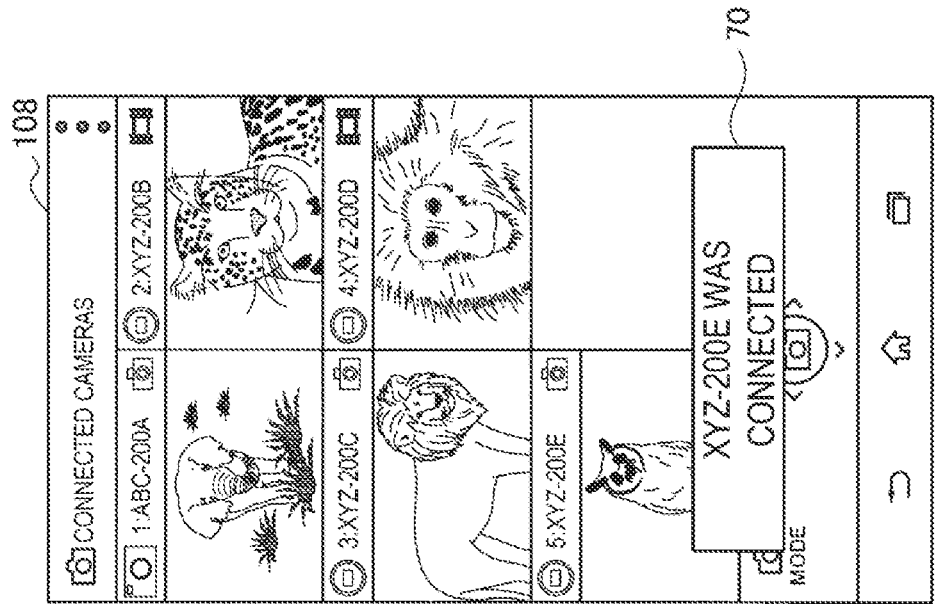
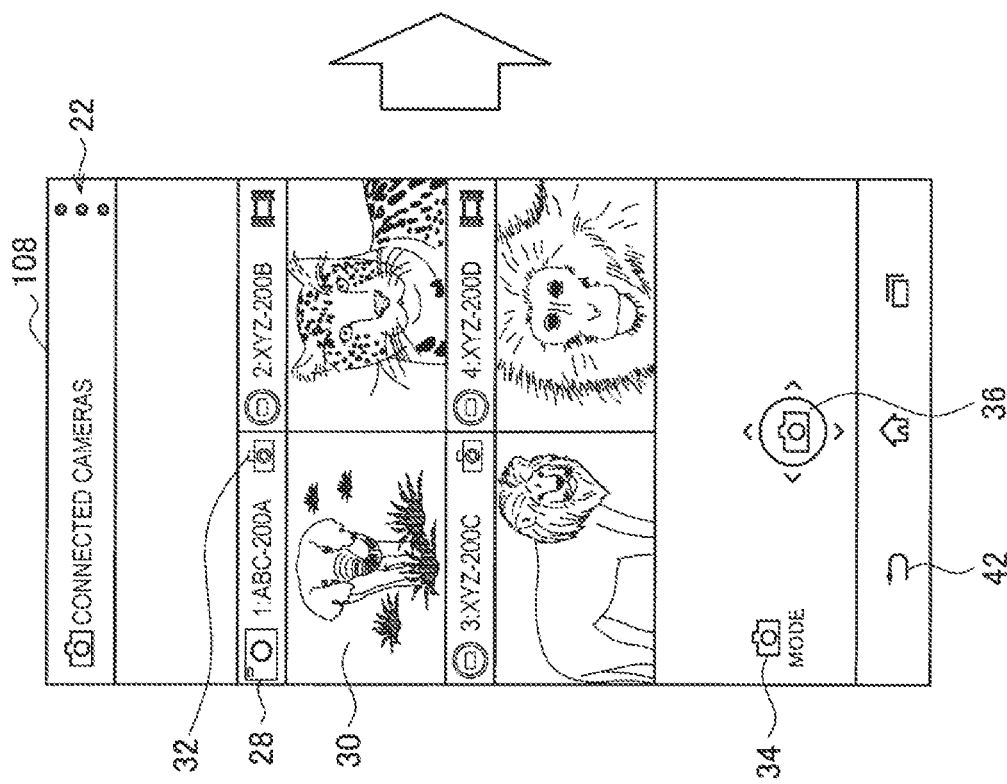

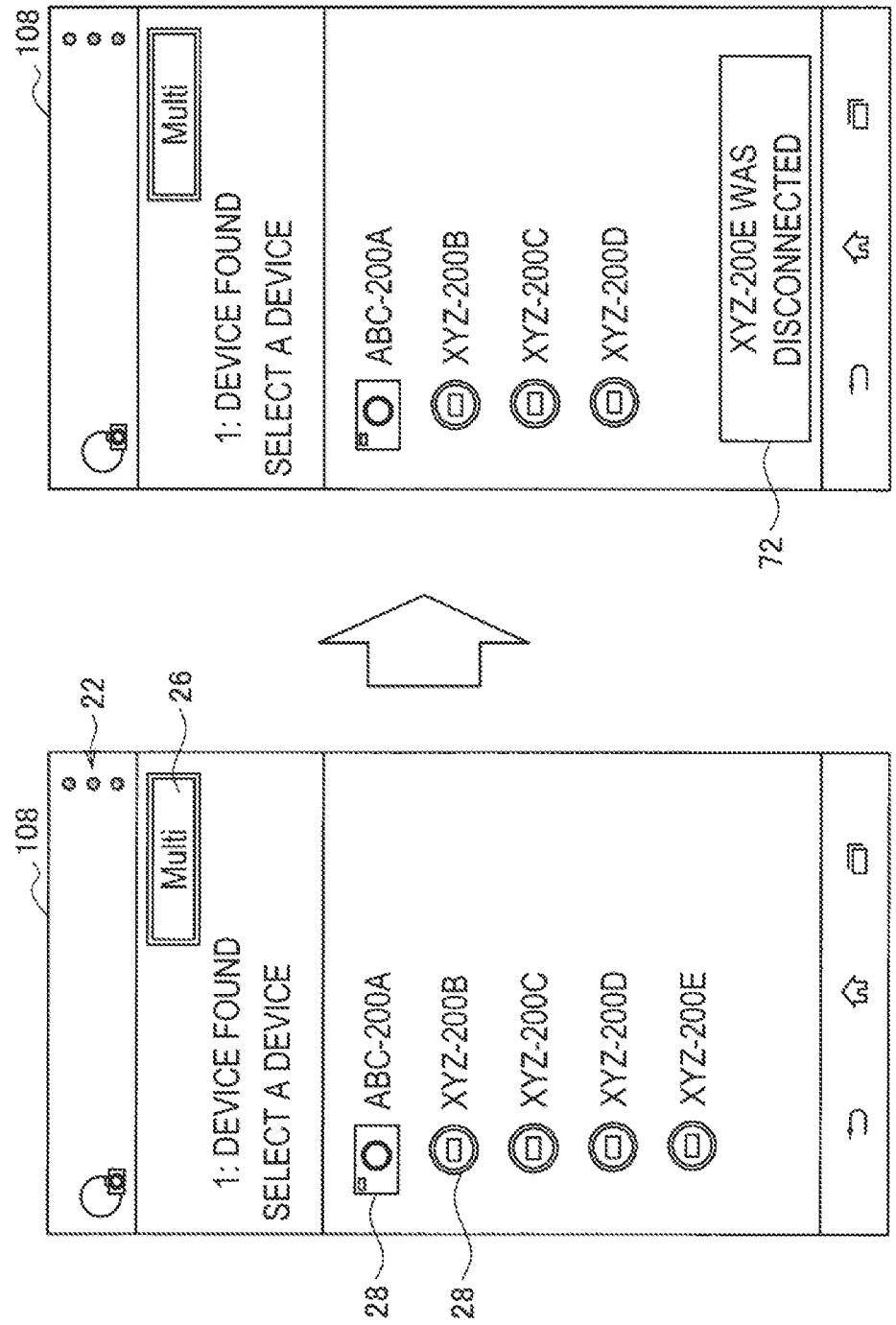

[Fig. 27B]
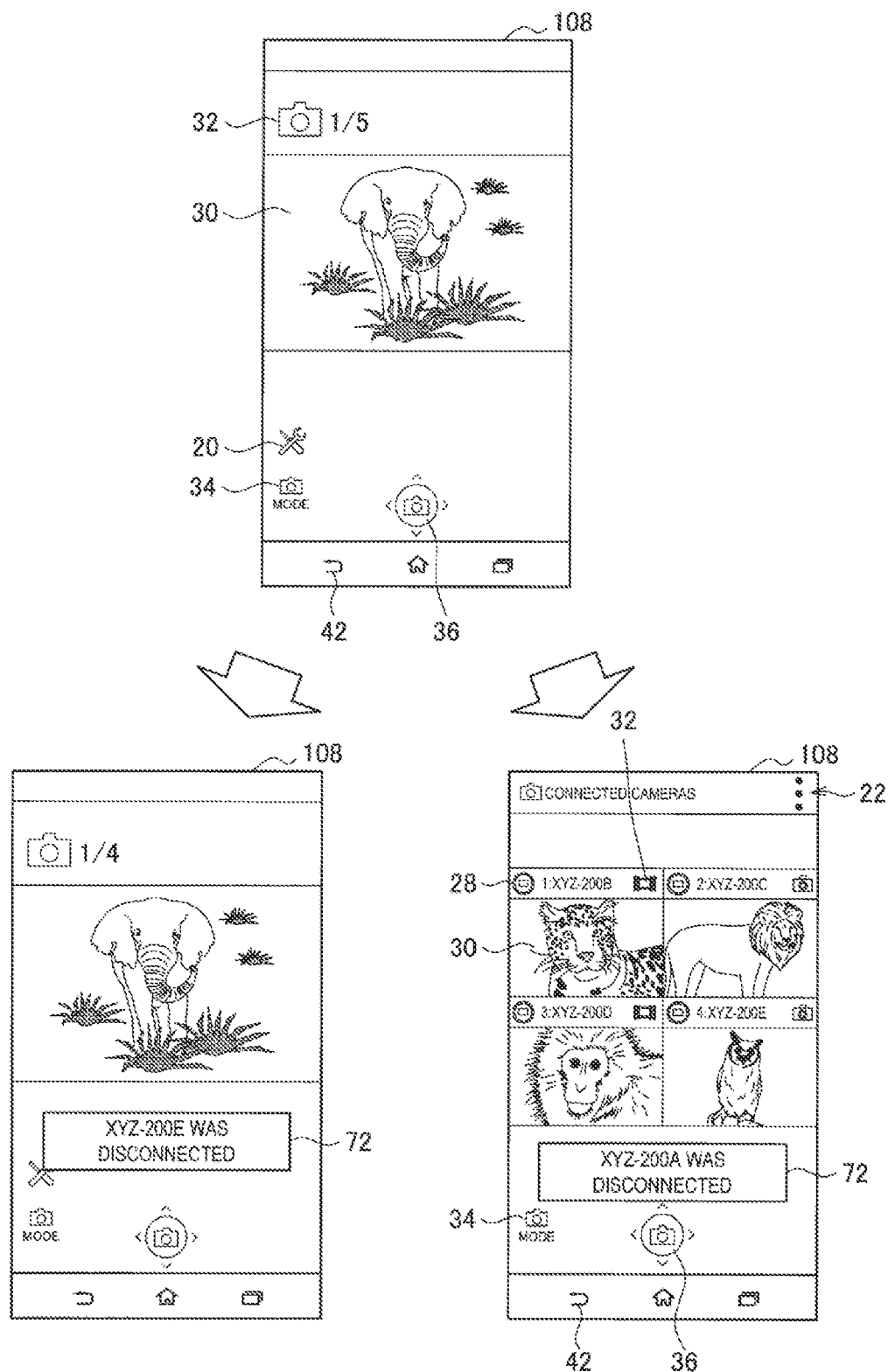

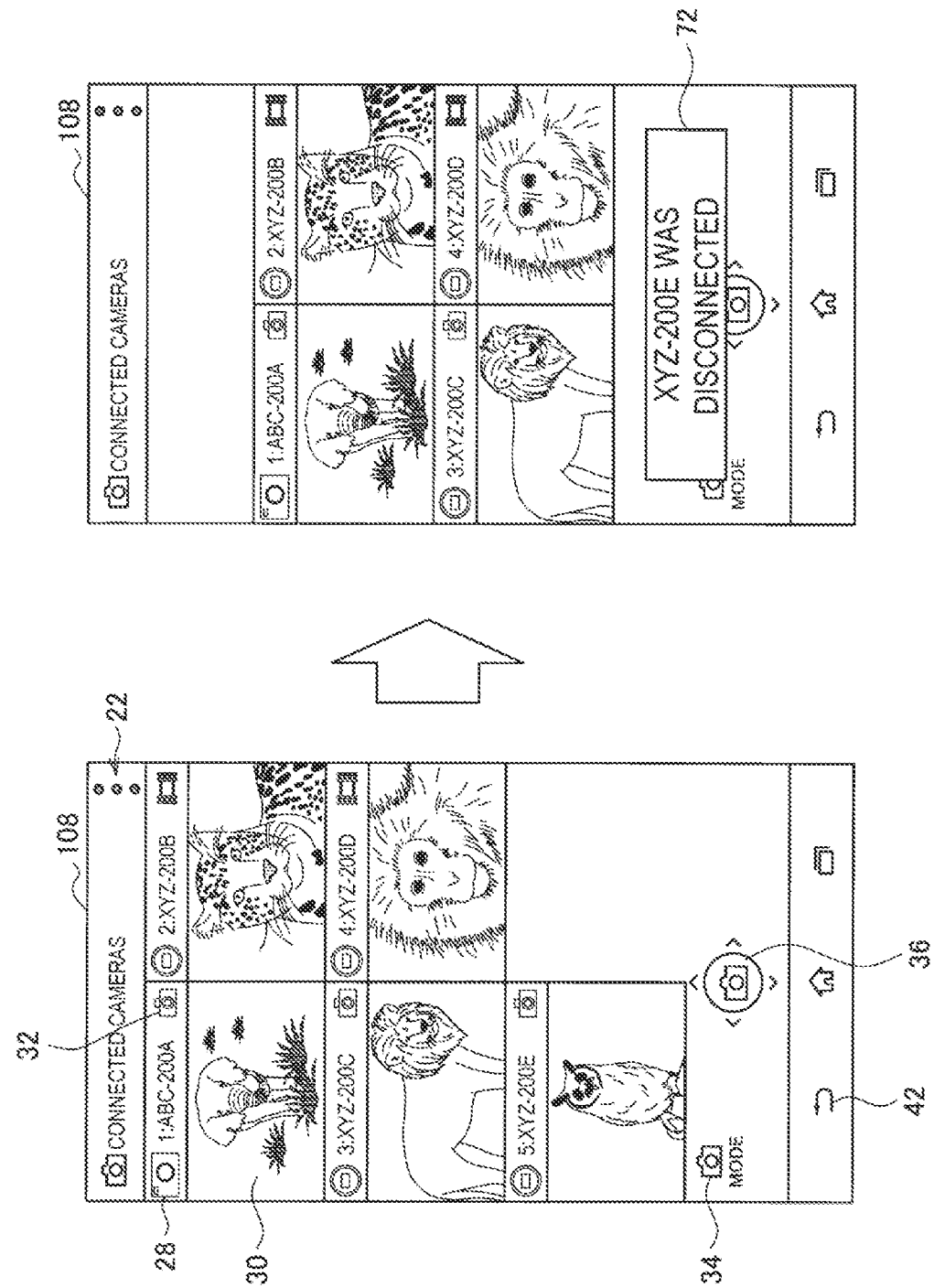

[Fig. 28]
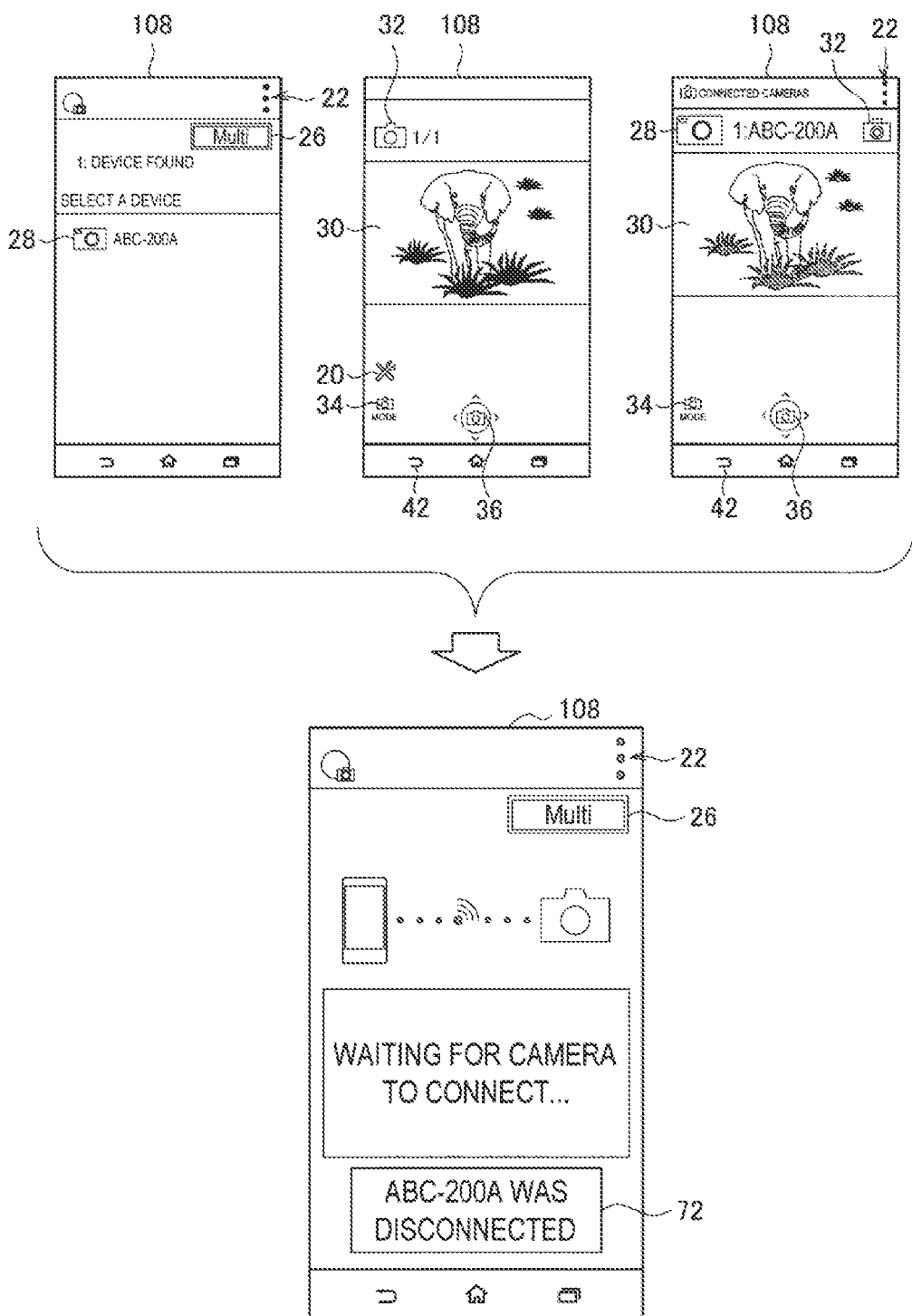

[Fig. 29]
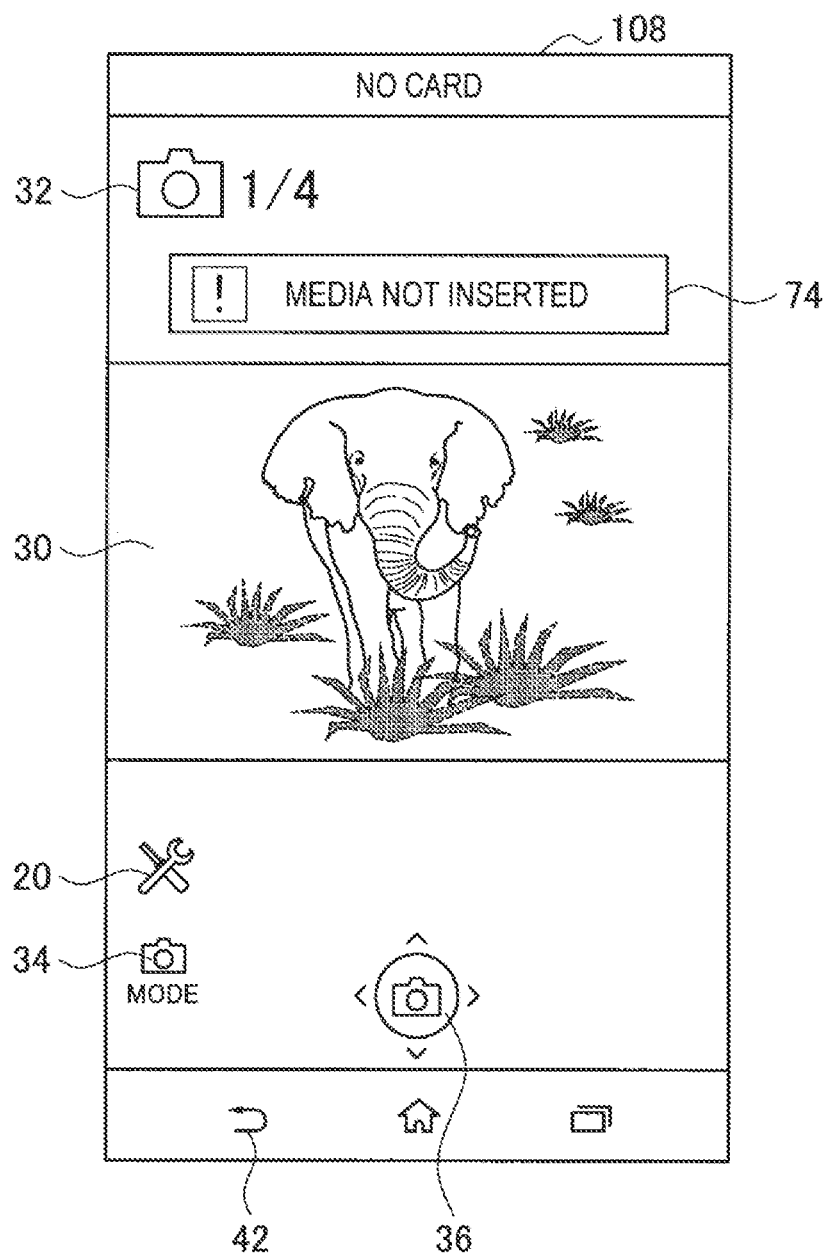

[Fig. 30]
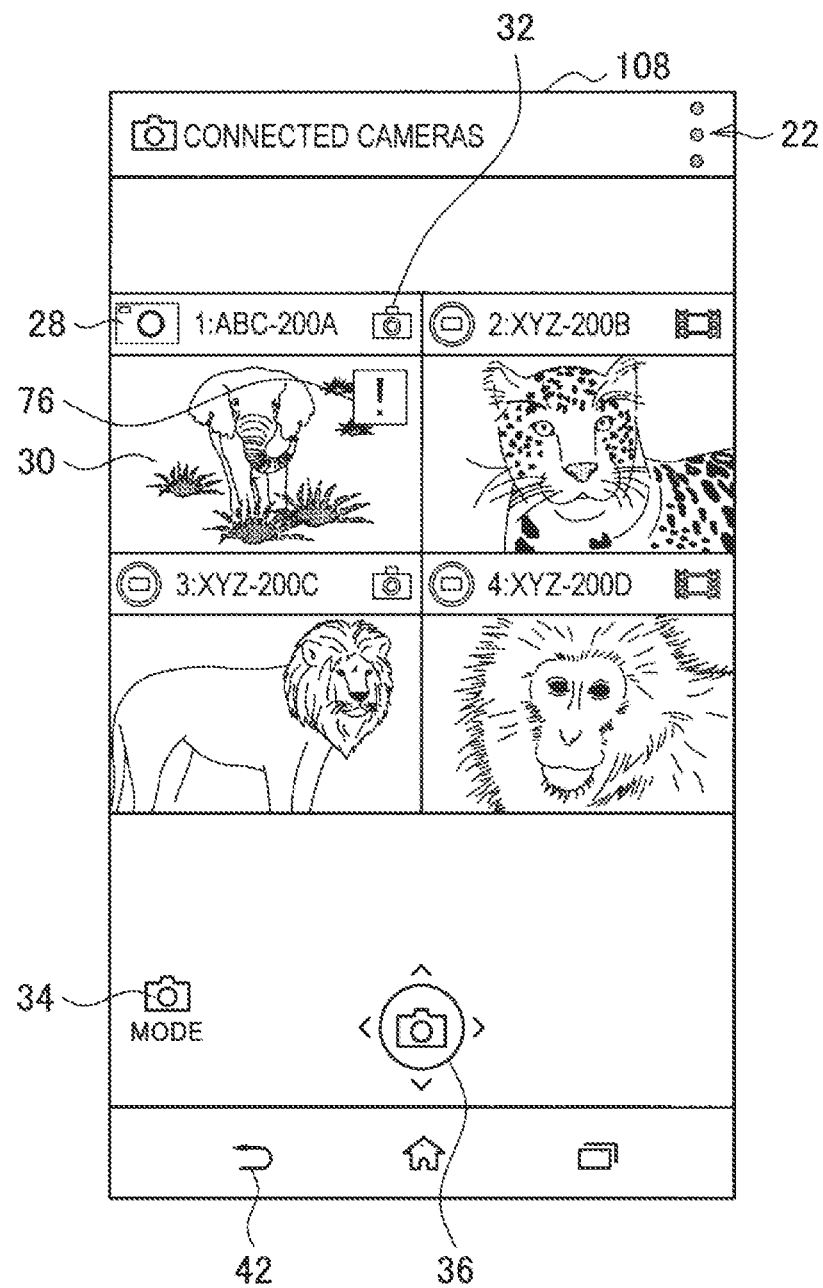

[Fig. 31A]
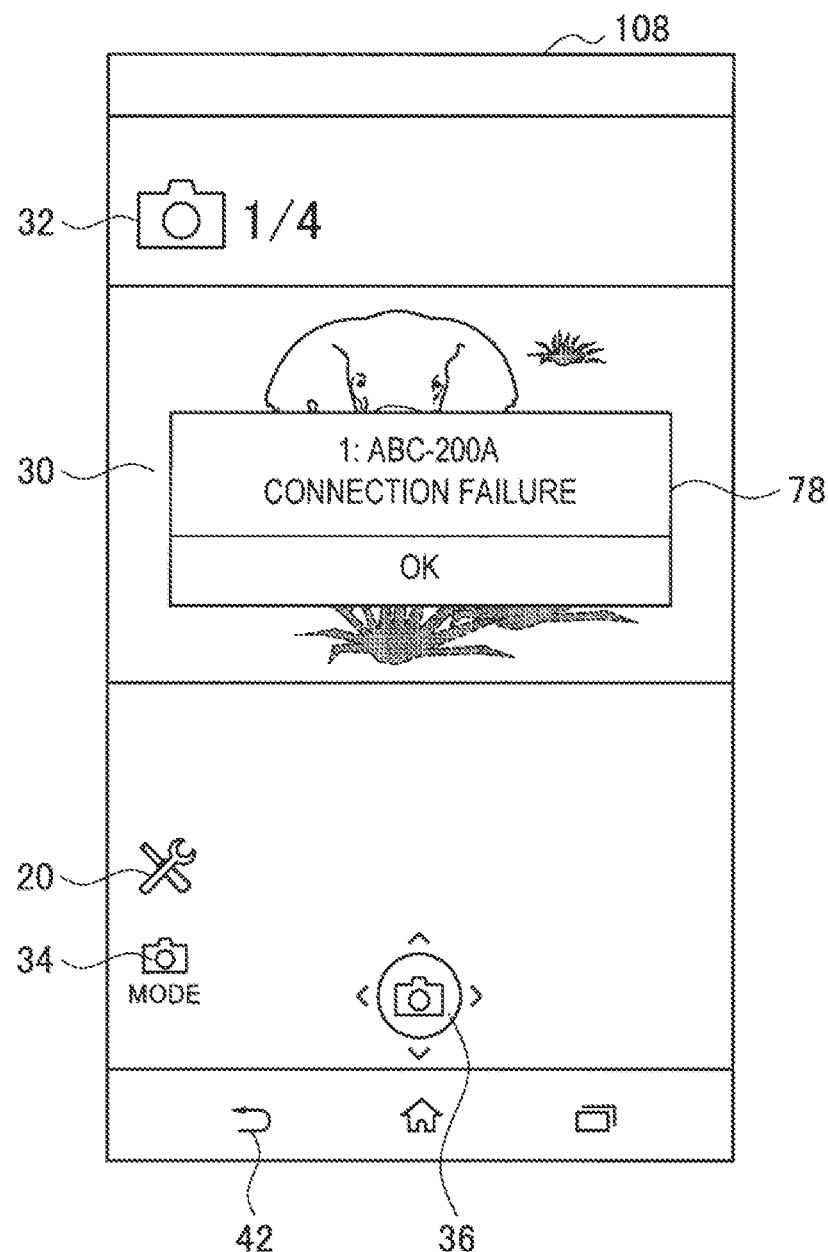

[Fig. 31B]
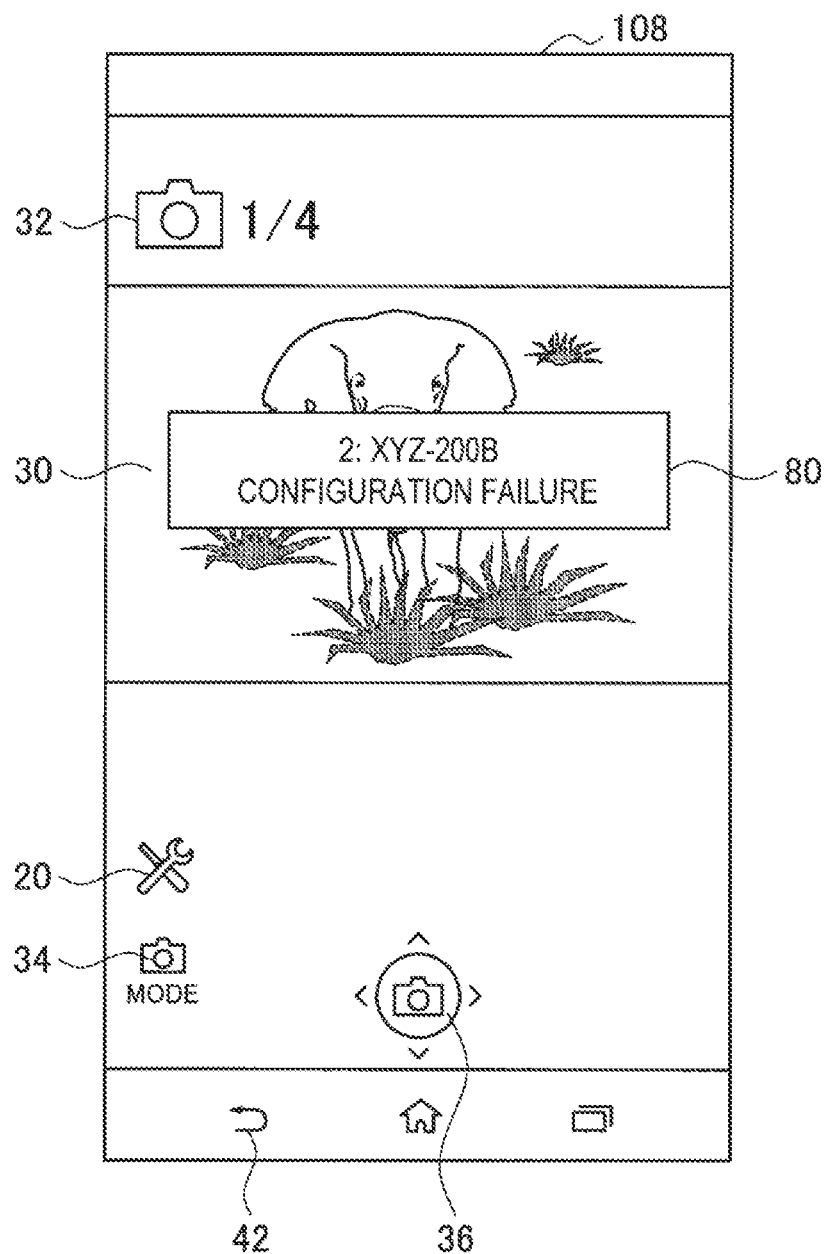

[Fig. 32]
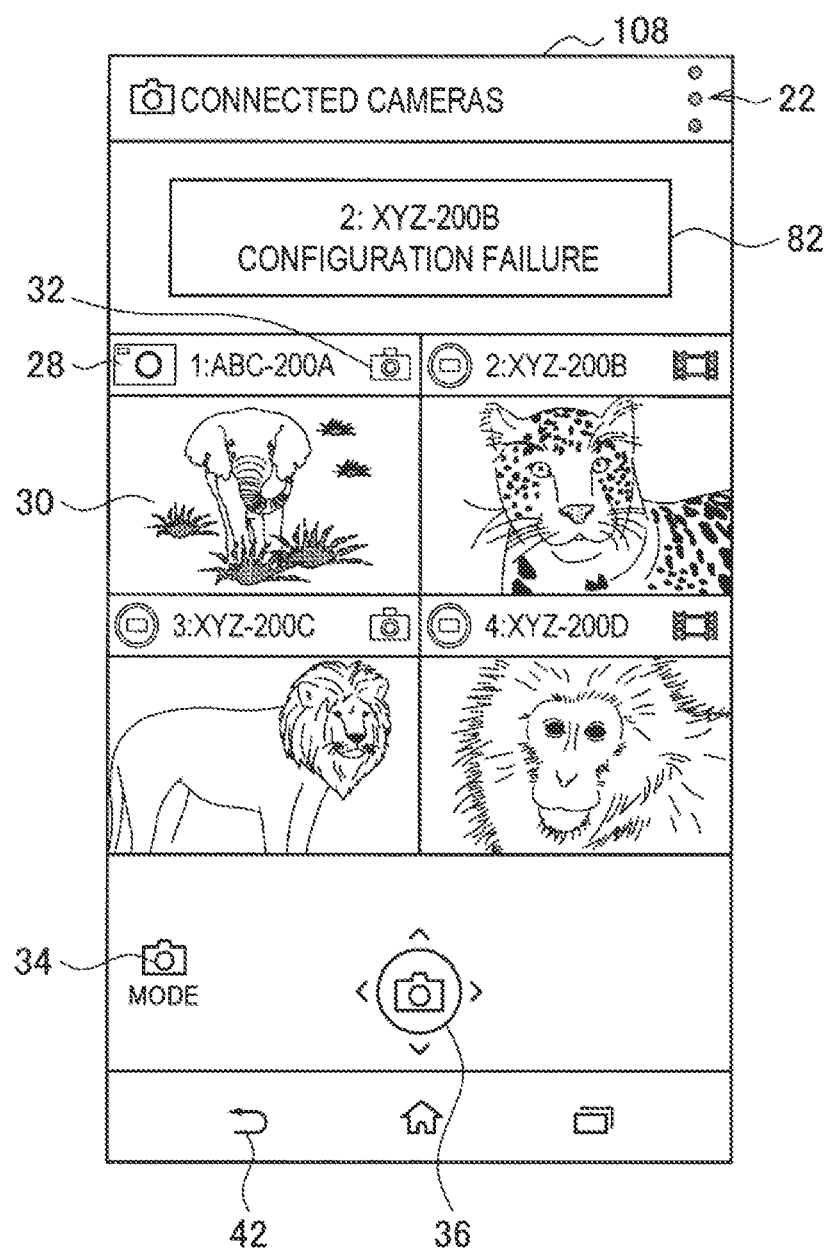

[Fig. 33]
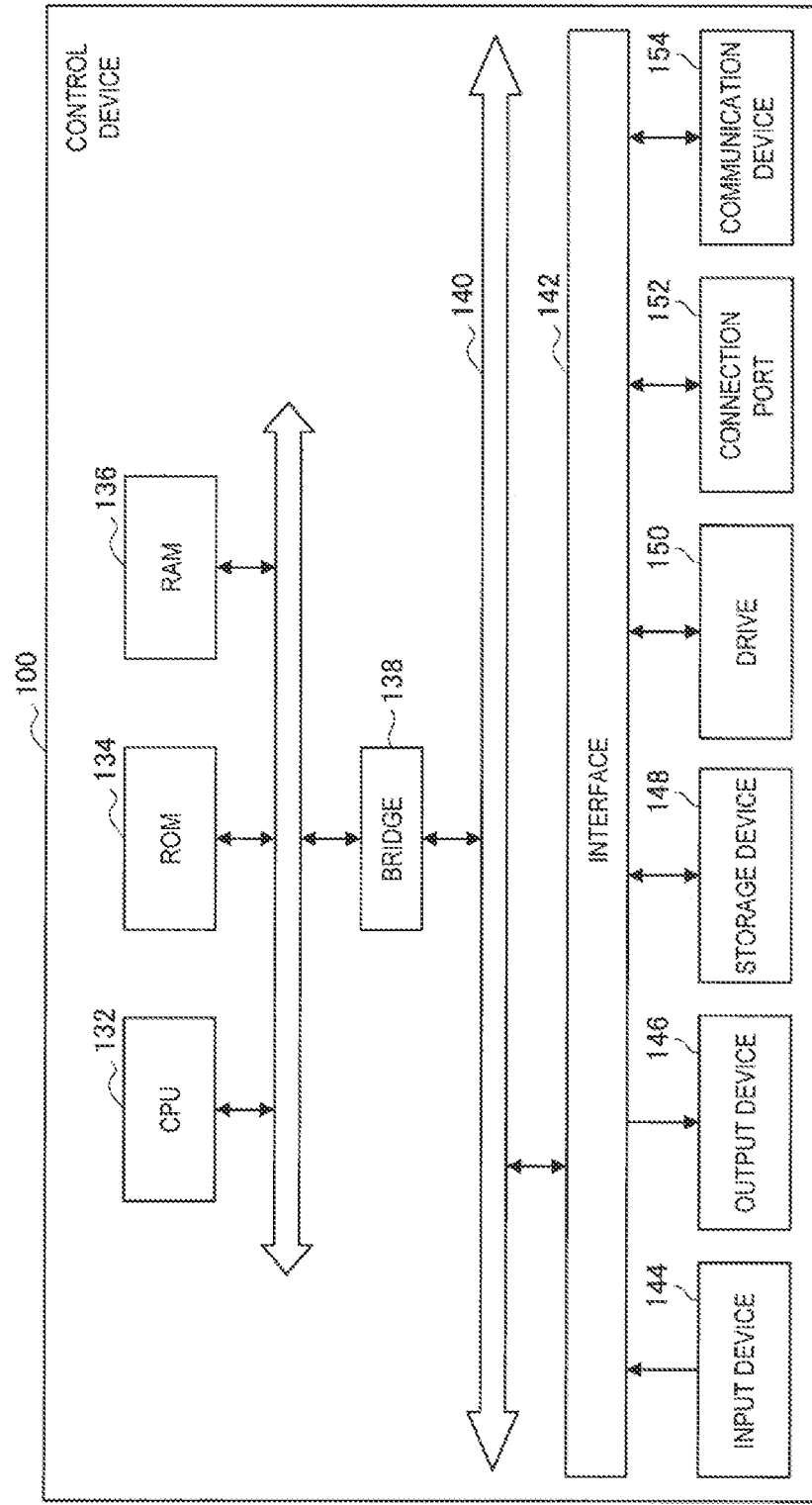

CONTROL METHOD, CONTROL DEVICE, AND PROGRAM

CROSS REFERENCE TO RELATED APPLICATIONS

This application is a continuation application of U.S. patent application Ser. No. 16/952,785, filed Nov. 19, 2020, with is a continuation application of U.S. patent application Ser. No. 15/532,351, filed Jun. 1, 2017, and issued as U.S. Pat. No. 10,958,804 Mar. 23, 2021, which is a 371 Nationalization of PCT/JP2015/005537, filed Nov. 4, 2015 and claims priority of Japanese Priority Patent Application JP 2014-261005 filed Dec. 24, 2014, the entire contents of which are incorporated herein by reference.

TECHNICAL FIELD

The present disclosure relates to a control method, a control device, and a program.

BACKGROUND ART

Recently, products applying communication technology to imaging devices are becoming commonly available. The operation of such an imaging device may be controlled through communication from an external information processing device or the like.

For example, Patent Literature 1 discloses a technique related to a system that controls the operation of multiple imaging devices through communication using a remote control, and displays images obtained from each of the multiple imaging devices on a display unit provided on the remote control.

Also, Patent Literature 2 discloses a technique related to a system in which a monitor and multiple imaging devices are connected through communication, and in which images transmitted from each of the multiple imaging devices are displayed on the monitor.

CITATION LIST

Patent Literature

[PTL 1]
JP 2001-326845A
[PTL 2]
JP 2012-119846A

SUMMARY

Technical Problem

However, with the technique disclosed in Patent Literature 1, the displayed image is switched as a result of the user selecting one from among the multiple imaging devices, and control being switched to the selected imaging device. For this reason, it is time-consuming for the user to perceive all images related to the multiple imaging devices.

On the other hand, with the technique disclosed in Patent Literature 2, a list of images to be acquired is displayed on the monitor, but images are transmitted and received via a pre-established network. For this reason, flexibility of communication format is impaired in some cases.

Accordingly, an embodiment of the present disclosure proposes a new and improved control method, control device, and program capable of enabling a user to easily perceive the images corresponding to each of multiple connected imaging devices, while also retaining flexibility in the format of communication with the imaging devices.

Solution to Problem

According to an embodiment of the present disclosure, there is provided a control method including: wirelessly communicating with a plurality of imaging devices; and displaying identifiers corresponding respectively to the plurality of imaging devices, on the basis of the communication According to another embodiment of the present disclosure, there is provided a control device including: a communication unit that wirelessly communicates with each of a plurality of imaging devices; and a controller that displays a list of identifiers corresponding respectively to the plurality of imaging devices, on the basis of the communication.

According to still another embodiment of the present disclosure, there is provided a program causing a computing device to: switch between a multiple-unit control mode and a single-unit control mode, when in the multiple-unit control mode: display identifiers corresponding respectively to a plurality of imaging devices, and in response to a given user input, control a given operation of each of the plurality of imaging device via wireless communication connections; and when in the single-unit control mode: display an identifier corresponding to a selected one of the plurality of imaging devices, and in response to the given user input, control the given operation of the selected one of the plurality of imaging devices and not the others of the plurality of imaging devices.

Advantageous Effects of Invention

According to one or more of embodiments of the present disclosure as described above, there is provided a control method, control device, and program capable of enabling a user to easily perceive the images corresponding to each of multiple connected imaging devices, while also retaining flexibility in the format of communication with the imaging devices. Note that the above advantageous effects are not strictly limiting, and that any advantageous effect indicated in the present disclosure or another advantageous effect that may be reasoned from the present disclosure may also be exhibited in addition to, or instead of, the above advantageous effects.

BRIEF DESCRIPTION OF DRAWINGS

FIG. 1 is a diagram for explaining an overview of a control device according to an embodiment of the present disclosure.

FIG. 2 is a block diagram illustrating a schematic functional configuration of a control device and an imaging device according to a first embodiment of the present disclosure.

FIG. 3 is a flowchart that conceptually illustrates a summary of overall processing on a control device according to an embodiment.

FIG. 4 is a diagram for explaining a process of configuring a communication connection with an imaging device on a control device according to an embodiment.

FIG. 5 is a diagram for explaining a process of changing a communication mode on a control device according to an embodiment.

FIG. 6 is a diagram illustrating screen transitions related to a process of activating a control app on a control device according to an embodiment.

FIG. 7 is a diagram for explaining an operation of configuring a communication mode on an imaging device according to an embodiment.

FIG. 8 is a diagram for explaining a process of connecting to an imaging device on a control device according to an embodiment.

FIG. 9 is a diagram illustrating an example of an imaging device list screen displayed on a control device according to an embodiment.

FIG. 10 is a diagram illustrating an example of a single-view screen displayed on a control device according to an embodiment.

FIG. 11 is a diagram illustrating an example of a multi-view screen displayed on a control device according to an embodiment.

FIG. 12A is a diagram illustrating an example of a display format of one or two display sets on a control device according to an embodiment.

FIG. 12B is a diagram illustrating an example of a display format of one or two display sets on a control device according to an embodiment.

FIG. 12C is a diagram illustrating an example of a display format of one or two display sets on a control device according to an embodiment.

FIG. 13A is a diagram illustrating an example of a display format of three or four display sets on a control device according to an embodiment.

FIG. 13B is a diagram illustrating an example of a display format of three or four display sets on a control device according to an embodiment.

FIG. 13C is a diagram illustrating an example of a display format of three or four display sets on a control device according to an embodiment.

FIG. 14A is a diagram illustrating an example of a display format of five or six display sets on a control device according to an embodiment.

FIG. 14B is a diagram illustrating an example of a display format of five or six display sets on a control device according to an embodiment.

FIG. 14C is a diagram illustrating an example of a display format of five or six display sets on a control device according to an embodiment.

FIG. 15A is a diagram illustrating an example of a display format of seven to nine display sets on a control device according to an embodiment.

FIG. 15B is a diagram illustrating an example of a display format of ten to twelve display sets on a control device according to an embodiment.

FIG. 16 is a diagram illustrating an example of a process of switching a single-view screen by going through a multi-view screen on a control device according to an embodiment.

FIG. 17 is a diagram illustrating an example of a process of switching a single-view screen by going through an imaging device list screen on a control device according to an embodiment.

FIG. 18 is a diagram for explaining a shooting process on a single-view screen displayed by a control device according to an embodiment.

FIG. 19 is a diagram for explaining a shooting process on a multi-view screen displayed by a control device according to an embodiment.

FIG. 20 is a diagram for explaining a process of deciding the content of an instruction related to image recording to an imaging device on a control device according to an embodiment.

FIG. 21 is a diagram illustrating an example of configuration information for image preview and saving according to a first modification of an embodiment.

FIG. 22 is a diagram for explaining an example of an operation of transmitting a settings instruction to an imaging device on a single-view screen of a control device according to a second modification of an embodiment.

FIG. 23 is a diagram for explaining an example of an operation of transmitting a settings instruction to an imaging device on a multi-view screen of a control device according to a second modification of an embodiment.

FIG. 24A is a diagram for explaining an example of a display indicating that a performed operation is unsupported on a control device according to a third modification of an embodiment.

FIG. 24B is a diagram for explaining an example of a display indicating that a performed operation is unsupported on a control device according to a third modification of an embodiment.

FIG. 24C is a diagram for explaining an example of a display indicating that a performed operation is unsupported on a control device according to a third modification of an embodiment.

FIG. 24D is a diagram for explaining an example of a display indicating that a performed operation is unsupported on a control device according to a third modification of an embodiment.

FIG. 25 is a flowchart that conceptually illustrates a summary of overall processing by a control device according to a second embodiment of the present disclosure.

FIG. 26A is a diagram for explaining a display control process when a new communication connection with an imaging device is made on a control device according to an embodiment.

FIG. 26B is a diagram for explaining a display control process when a new communication connection with an imaging device is made on a control device according to an embodiment.

FIG. 26C is a diagram for explaining a display control process when a new communication connection with an imaging device is made on a control device according to an embodiment.

FIG. 26D is a diagram for explaining a display control process when a new communication connection with an imaging device is made on a control device according to an embodiment.

FIG. 27A is a diagram for explaining a display control process when communication with an imaging device is disconnected on a control device according to an embodiment.

FIG. 27B is a diagram for explaining a display control process when communication with an imaging device is disconnected on a control device according to an embodiment.

FIG. 27C is a diagram for explaining a display control process when communication with an imaging device is disconnected on a control device according to an embodiment.

FIG. 28 is a diagram for explaining a display control process when communication with an imaging device is disconnected on a control device according to an embodiment.

FIG. 29 is a diagram illustrating an example of a display related to an ongoing error on a single-view screen of a control device according to a modification of an embodiment.

FIG. 30 is a diagram illustrating an example of a display related to an ongoing error on a multi-view screen of a control device according to a modification of an embodiment.

FIG. 31A is a diagram illustrating an example of a display related to an isolated error on a single-view screen of a control device according to a modification of an embodiment.

FIG. 31B is a diagram illustrating an example of a display related to an isolated error on a single-view screen of a control device according to a modification of an embodiment.

FIG. 32 is a diagram illustrating an example of a display related to an isolated error on a multi-view screen of a control device according to a modification of an embodiment.

FIG. 33 is an explanatory diagram illustrating a hardware configuration of a control device according to an embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.
1. Overview of control device according to embodiment of present disclosure
2. First embodiment (operational control based on user operation)
3. Second embodiment (operational control based on status change in imaging device)
4. Hardware configuration of control device according to embodiment of present disclosure
5. Conclusion

1. OVERVIEW OF CONTROL DEVICE ACCORDING TO EMBODIMENT OF PRESENT DISCLOSURE

First, an overview of a control device according to an embodiment of the present disclosure will be described with reference to FIG. 1. FIG. 1 is a diagram for explaining an overview of a control device according to an embodiment of the present disclosure.

The control device 100 is a portable mobile communication terminal carried by a user, and includes a function like an access point (AP) that receives a connection from another device via wireless communication. The control device 100 is also equipped with a display unit that displays images. For this reason, the control device 100 is capable of acquiring images from each of multiple imaging devices 200 via wireless communication, and displaying the acquired images on the display unit.

For example, as illustrated in FIG. 1, the control device 100 is connected via wireless communication to each of imaging devices 200A to 200C, and causes the display unit to display images acquired from the imaging device 200A, for example. Note that the chain-line arrows illustrated in FIG. 1 indicate the transmission of connection requests, images, and the like from each of the imaging devices 200A to 200C.

At this point, a device which is connected to multiple imaging devices and which displays images obtained from each of the multiple imaging devices generally switches the displayed image by switching the connected imaging device 200. For this reason, it is time-consuming for the user to perceive all images related to the multiple imaging devices 200.

On the other hand, there exists a device that displays on a monitor or the like a list of images acquired from each of multiple imaging devices 200, but with such a device, images are generally transmitted and received via a pre-established network, such as wired communication, for example. For this reason, flexibility with respect to changing the communication format is impaired in some cases. For example, there may be a cost and time associated with changing the connected imaging device or changing the communication pathway.

Accordingly, the control device 100 according to an embodiment of the present disclosure is connected to multiple imaging devices via wireless communication, and communicates with the multiple imaging devices. Additionally, the control device 100 specifies each of the images corresponding to each of the multiple imaging devices by the communication, and lists the specified images.

For example, the control device 100 receives images via wireless communication from each of the imaging devices 200A to 200C as illustrated in FIG. 1, and displays each of the received images in a list on the display unit.

For this reason, the control device 100 is connected via wireless communication to each of the multiple imaging devices 200, and each of the images acquired from each of the multiple imaging devices 200 is perceivably displayed at a glance.

Consequently, it is possible for the user to easily perceive the images corresponding to each of the multiple connected imaging devices 200, while also retaining flexibility in the format of communication with the imaging devices 200. Note that although FIG. 1 illustrates a smartphone as an example of the control device 100, the control device 100 may also be mobile communication terminal such as a tablet, digital camera, portable game console, or personal digital assistant (PDA). Also, for the sake of convenience, the control device 100 according to the first and second embodiments will be distinguished by appending a number corresponding to the embodiment, such as the control device 100-1 and the control device 100-2.

2. FIRST EMBODIMENT (OPERATIONAL CONTROL BASED ON USER OPERATION)

The above thus summarizes a control device 100 according to an embodiment of the present disclosure. Next, a control device 100-1 according to the first embodiment of the present disclosure will be described. The control device 100-1 lists the images specified by communication with each of the imaging devices 200, and conducts centralized operational control based on user operations with respect to each of the imaging devices 200 corresponding to each of the listed images.

<2-1. Device Configuration>

First, a configuration of the control device 100-1 according to the first embodiment of the present disclosure will be described with reference to FIG. 2. FIG. 2 is a block diagram illustrating a schematic functional configuration of the control device 100-1 and the imaging device 200 according to the first embodiment of the present disclosure.

(Functional Configuration of Imaging Device)

As illustrated in FIG. 2, the imaging device 200 is equipped with an operation detector 202, a controller 204, storage 206, a communication unit 208, and an imaging unit 210.

The operation detector 202 converts a user operation with respect to the imaging device 200 into input. Specifically, the operation detector 202 generates input information according to an operation by the user, and provides the generated input information to the controller 204. For example, the operation detector 202 detects a user operation on a button-type or touchpad-type input device provided separately on the imaging device 200, or on a touch panel-type input device integrated with a display unit.

The controller 204 controls the overall operation of the imaging device 200. Specifically, the controller 204 controls communication by the communication unit 208, controls the status of the imaging device 200, and issues an imaging instruction to the imaging unit 210.

For example, when the input information provided from the operation detector 202 indicates a connection request to connect to the control device 100-1, the controller 204 causes the communication unit 208 to establish a communication connection with the control device 100-1. Also, the controller 204 causes the communication unit 208 to transmit images obtained by imaging of the imaging unit 210 to the control device 100-1. Also, when information indicating the specification of a shooting mode is received from the control device 100-1, the controller 204 changes the shooting mode of the imaging device 200 to the specified shooting mode. Also, when information indicating to start or stop recording is received from the control device 100-1, the controller 204 instructs the imaging unit 210 to start or stop operating.

The storage 206 stores images obtained by imaging of the imaging unit 210. Specifically, when an image is obtained by imaging of the imaging unit 210, the storage 206 stores the image on the basis of an instruction from the controller 204. Note that an image transmitted to the control device 100-1 by the communication unit 208 may be a copy of an image stored in the storage 206 of the imaging device 200.

The communication unit 208 wirelessly communicates with the control device 100-1. Specifically, the communication unit 208, on the basis of an instruction from the controller 204, establishes a communication connection by requesting the control device 100-1 for a connection using wireless communication. For example, the communication unit 208 receives operation instruction information from the control device 100-1, and transmits data such as images to the control device 100-1. Note that the communication unit 208 may wirelessly communicate with the control device 100-1 using a standard such as Wi-Fi (registered trademark), Bluetooth (registered trademark), or ZigBee (registered trademark).

The imaging unit 210 conducts imaging according to a shooting mode. Specifically, on the basis of an instruction and a shooting mode from the controller 204, the imaging unit 210 captures images consecutively to record a moving image, or captures a single image to record a still image. The shooting mode includes modes for recording a moving image such as video shooting, interval shooting, loop recording, audio recording, and continuous still image shooting (hereinafter also called still image (continuous)), and also includes a mode for recording a still image such as a single still image (hereinafter also called still image (normal)). For example, the imaging unit 210 may be equipped with an imaging optical system such as a photographic lens that condenses light and a zoom lens, as well as a signal conversion sensor such as a charge-coupled device (CCD) or a complementary metal-oxide-semiconductor (CMOS).

(Functional Configuration of Control Device)

In addition, as illustrated in FIG. 2, the control device 100-1 is equipped with a communication unit 102, a controller 104, storage 106, a display unit 108, and an operation detector 110. Note that part of the controller 104 may function as an application related to operational control of the imaging device 200 (hereinafter also called the control app).

The communication unit 102 wirelessly communicates with the imaging device 200. Specifically, the communication unit 102 establishes a communication connection with the imaging device 200 by conducting a process according to the communication mode of the control app. For example, the communication mode may have two modes: a multi-connection mode for communicating with multiple imaging devices 200, and a single-connection mode for communicating with a single imaging device 200.

When the communication mode is the multi-connection mode, the communication unit 102, acting as an AP, stands by until there is a connection request from the imaging device 200, and establishes a communication connection with the imaging device 200 only when a connection request is received. Additionally, a communication connection may be established with one or multiple imaging devices 200. For this reason, the communication unit 102 may establish a communication connection with each of five imaging devices 200, for example.

When the communication mode is the single-connection mode, the communication unit 102 transmits a communication connection to one imaging device 200, and if a connection is allowed by the imaging device 200, a communication connection with the imaging device 200 is established. For example, the communication unit 102 may use a short-range communication unit, which is separately provided in the control device 100-1 and which conducts short-range communication using near field communication (NFC) or the like, to conduct communication for the purpose of a communication connection by the communication unit 102, and transmit a connection request after the communication unit 208 of the imaging device 200 is activated. Note that the communication unit 102 may also transmit a connection request to the imaging device 200 on the basis of some other event occurring, such as a connection instruction operation performed by the user with respect to the communication unit 102, for example.

The controller 104 controls the overall operation of the control device 100-1. Specifically, the controller 104 controls communication by the communication unit 102 and controls the display on the display unit 108. More specifically, the controller 104, on the basis of communication by the communication unit 102, specifies respective images corresponding to multiple imaging devices 200, and causes the display unit 108 to list the specified images. For example, the controller 104 provides the display unit 108 with respective images received from each of the multiple imaging devices 200 by the communication unit 102, and the display unit 108 lists the respective images in accordance with a display mode. For example, the display mode may have two modes: a multi-view mode in which images corresponding to the imaging device 200 are listed, and a single-view mode in which one image from among respective images corresponding to the imaging device 200 is displayed individually. Note that the displayed content in each display mode will be later discussed in detail.

Furthermore, the controller 104 conducts operational control based on the occurrence of an event related to the imaging devices 200 while in the list display state. Specifically, the controller 104 conducts operational control based on a user operation performed while in the list display state with respect to each of the imaging devices 200 corresponding to each of the listed images. For example, the controller 104 controls the transmission of an operational instruction to the imaging devices 200 on the basis of the user operation.

The storage 106 stores images. Specifically, the storage 106 stores images which are acquired from the imaging device 200 and displayed on the display unit 108.

The display unit 108 displays images on the basis of an instruction from the controller 104. Specifically, the display unit 108 displays images received from the imaging device 200 by the communication unit 102 and images acquired from the storage 106, in accordance with a display mode. For example, the display unit 108 may be a display device such as a liquid crystal display panel or an organic electroluminescence (EL) panel.

The operation detector 110 converts a user operation with respect to the control device 100-1 into input. Specifically, the operation detector 110 generates input information according to an operation by the user, and provides the generated input information to the controller 104. For example, the operation detector 110 detects a user operation on a button-type or touchpad-type input device provided separately on the control device 100-1, or on a touch panel-type input device integrated with the display unit 108.

<2-2. Device Processing>

Next, processing by the control device 100-1 according to the present embodiment will be described.

(Overall Process Flow)

First, the overall processing by the control device 100-1 will be summarized with reference to FIG. 3. FIG. 3 is a flowchart that conceptually illustrates a summary of overall processing by the control device 100-1 according to the present embodiment.

First, the control device 100-1 stands by until an application activation operation is performed (step S302). Specifically, the controller 104 determines whether or not input information provided from the operation detector 110 indicates an activation operation of the control app.

When the application activation operation is performed, the control device 100-1 determines whether or not the communication mode is the multi-connection mode (step S304). Specifically, when it is determined that the input information indicates an activation operation of the control app, the controller 104 determines whether or not a setting causing the communication configuration of the control device 100-1 to act as an AP, such as a tethering setting, for example, is turned on.

If the communication mode is determined to be the multi-connection mode, the control device 100-1 activates the application in multi-connection mode (step S306). Specifically, when the tethering setting of the control device 100-1 is determined to be on, the controller 104 conducts a process of activating the control app in multi-connection mode.

Next, the control device 100-1 displays images received from the connected imaging device 200 (step S308). Specifically, if an imaging device 200 is connected, the controller 104 causes the display unit 108 to display images received from that imaging device 200 by the communication unit 102, in accordance with the display mode.

Next, the control device 100-1 stands by until a user operation is performed on a displayed image (step S310). Specifically, the controller 104 determines whether or not input information provided from the operation detector 110 indicates a user operation on a displayed image.

If a user operation is performed on a displayed image, the control device 100-1 determines whether or not the display mode is multi-view mode (step S312). Specifically, if the input information is determined to indicate an operational instruction operation for the imaging device, the controller 104 determines whether or not the display mode is multi-view mode.

If the display mode is determined to be multi-view mode, the control device 100-1 issues an operational instruction to each of the imaging devices 200 corresponding to the displayed images (step S314). Specifically, when the display mode is determined to be multi-view mode, the controller 104 transmits an instruction for operation corresponding to the user operation via the communication unit 102 to each of the imaging devices 200 corresponding to each of the displayed images.

Meanwhile, if the display mode is determined not to be multi-view mode, or in other words determined to be single-view mode, the control device 100-1 transmits an operational instruction only to the imaging device 200 corresponding to the displayed image (step S316). Specifically, when the display mode is determined to be single-view mode, the controller 104 transmits an instruction for operation corresponding to the user operation via the communication unit 102 only to the imaging device 200 corresponding to the image being displayed on the display unit 108.

Next, the control device 100-1 determines whether or not an end operation has been performed (step S318), and upon determining that an end operation has been performed, the process ends.

In step S304, if the communication mode is determined not to be multi-connection mode, or in other words determined to be single-connection mode, the control device 100-1 operates in single-connection mode (step S320). Note that since the processing by the control device 100-1 in single-connection mode is substantially the same as the processing by a control device of the past, description will be omitted herein.

Next, each process by the control device 100-1 according to the present embodiment will be described in detail. Note that description will be reduced or omitted for processes that are substantially the same as the processes discussed above.

(Communication Mode Configuration Process)

First, a communication mode configuration process, which is conducted as a preliminary process to the processes described in the above overall processing flow, will be described with reference to FIG. 4. FIG. 4 is a diagram for explaining a process of configuring a communication connection with the imaging device 200 by the control device 100-1 according to the present embodiment.

First, the control device 100-1 activates the control app in single-connection mode on the basis of a user operation, and makes a communication connection with the imaging device 200. Specifically, when a control app activation operation is performed, and a setting causing the communication configuration of the control device 100-1 to act as an AP is not configured, the controller 104 activates the control app in single-connection mode. Subsequently, the controller 104 causes the communication unit 102 to make a communication connection with the imaging device 200. Note that a communication connection with the imaging device 200 may also be made before activating the control app.

Next, the control device 100-1 launches a multi-connection settings screen on a displayed single-connection mode operating screen. Specifically, after the control app is activated, the controller 104 causes the display unit 108 to display a single-connection mode operating screen. Subsequently, if an operation to transition to the settings screen of the imaging device 200 is performed on the single-connection mode operating screen, the controller 104 causes the display unit 108 to display the settings screen of the imaging device 200. Next, if an operation to transition to a multi-connection settings screen is performed on the settings screen of the imaging device 200, the controller 104 causes the display unit 108 to display the multi-connection settings screen.

For example, the controller 104 causes the display unit 108 to display a single-connection mode operating screen like the one illustrated in the diagram to the left on the upper row in FIG. 4 as a result of a screen transition caused by a user operation, or as a default screen after activation of the control app. Additionally, on the single-connection mode operating screen, if a tap operation is performed on a graphical user interface (GUI) element related to the settings of the imaging device 200 like the one illustrated to the left on the upper row in FIG. 4, such as the icon 20, for example, the controller 104 causes the display unit 108 to display a settings screen 50 of the imaging device 200 like the one illustrated in the middle diagram on the upper row in FIG. 4. Next, on the settings screen 50 of the imaging device 200, if an operation is performed to select multi-connection settings from a list of configuration operations as illustrated in the middle diagram on the upper row in FIG. 4, the controller 104 causes the display unit 108 to display a multi-connection settings screen 52 like the one illustrated in the diagram to the right on the upper row in FIG. 4. Note that the multi-connection settings screen 52 may display configuration information for a multi-connection already registered in advance, such as a Service Set Identifier (SSID) and an authentication method.

Next, the control device 100-1, on the basis of a user operation on the multi-connection settings screen, configures settings related to a multi-connection with respect to the connected imaging devices 200. Specifically, if an operation for configuring settings on the multi-connection settings screen is performed, and multi-connection settings already have been registered, the controller 104 causes the display unit 108 to display a confirmation screen regarding whether or not to register new settings. Subsequently, if an operation for registering new settings is performed on the confirmation screen, the controller 104 causes the display unit 108 to display an input screen for inputting multi-connection settings information. Next, if an operation confirming input on the input screen is performed, the controller 104 causes the display unit 108 to display a notification screen indicating the completion of multi-connection settings. In addition, the controller 104 also causes the storage 106 to store the configured settings input on the input screen. Note that for subsequent sessions, the configured settings stored in the storage 106 may be used when making a communication connection.

For example, on the multi-connection settings screen 52, if a tap operation is performed on the "Configure" display as illustrated in the diagram to the right on the upper row in FIG. 4, and if multi-connection settings already have been registered, the controller 104 causes the display unit 108 to display a confirmation screen 54 regarding whether or not to register new settings like the one illustrated in the diagram to the left on the lower row in FIG. 4. Subsequently, if a tap operation is performed on the "Configure" displays on the confirmation screen 54, the controller 104 causes the display unit 108 to display a multi-connection settings information input screen 56 like the one illustrated in the middle diagram on the lower row in FIG. 4. For example, the input screen 56 may display elements such as input forms for inputting an SSID and a password (PW), as well as a pull-down list for selecting an authentication method. Subsequently, if a tap operation is performed on the "Configure" display on the input screen 56, the controller 104 causes the display unit 108 to display a notification screen 58 indicating the completion of multi-connection settings.

Next, the control device 100-1, on the basis of a user operation, changes the communication mode to multi-connection mode, and activates the control app. For example, after changing to a setting causing the communication configuration of the control device 100-1 to act as an AP on the basis of an operating system (OS) configuration operation by the user, the controller 104 activates the control app on the basis of a control app activation operation subsequently performed by the user.

Note that the control device 100-1 may also change the communication mode after activating the control app. A process of changing the communication mode after activating the control app will be described with reference to FIG. 5. FIG. 5 is a diagram for explaining a process of changing a communication mode on the control device 100-1 according to the present embodiment.

First, the control device 100-1 activates the control app in multi-connection mode, and launches a control app settings screen on the displayed screen. Specifically, when a control app activation operation is performed, and a setting causing the communication configuration of the control device 100-1 to act as an AP is configured, the controller 104 activates the control app in multi-connection mode. Subsequently, on the screen displayed in multi-connection mode, if an operation to transition to the control app settings screen is performed, the controller 104 causes the display unit 108 to display the control app settings screen.

For example, after the control app is activated in multi-connection mode, if a tap operation is performed on a control app settings icon 22 on a standby screen which indicates that the control device 100-1 is waiting for a connection from the imaging device 200 as illustrated in the diagram to the left in FIG. 5, the controller 104 causes the display unit 108 to display a control app settings screen like the one illustrated in the middle diagram in FIG. 5.

Next, the control device 100-1 conducts a change of communication mode on the control app settings screen. Specifically, if an operation selecting the configuration mode setting is performed on the control app settings screen, the controller 104 causes the display unit 108 to display a confirmation screen for changing the communication mode setting. If an operation indicating a change of the communication mode setting is performed on the confirmation screen, the controller 104 causes the display unit 108 to display a screen for setting the communication configuration of the control device 100-1.

For example, on the control app settings screen, if a tap operation is performed on the "Communication mode" display as illustrated in the diagram in the middle of FIG. 5, the controller 104 causes the display unit 108 to display a confirmation screen 60 for changing the communication mode setting like the one illustrated in the diagram to the right in FIG. 5. For example, the confirmation screen 60 for changing the communication mode setting may display the current communication mode, a procedure for changing the setting, and the like. Subsequently, if a tap operation is performed on the "Go to settings screen" display on the confirmation screen 60, the controller 104 causes the display unit 108 to display a screen for setting the communication configuration of the control device 100-1.

(Application Activation Process)

Next, a process of activating the control app will be described with reference to FIG. 6. FIG. 6 is a diagram illustrating screen transitions related to a process of activating the control app on the control device 100-1 according to the present embodiment.

If a control app activation operation is performed, the control device 100-1 controls the screen transition during activation of the control app according to the communication mode. Specifically, if a control app activation operation is performed, first, the controller 104 causes the display unit 108 to display a screen indicating that the control app is being activated. Next, if the communication mode is multi-connection mode, the controller 104 causes the display unit 108 to display a confirmation screen for changing the communication mode setting. Subsequently, if an operation for not changing the communication mode setting is performed on the confirmation screen, the controller 104 causes the display unit 108 to display a standby screen indicating that the control device 100-1 is waiting for a connection from the imaging device 200.

For example, if a tap operation is performed on an icon like the one illustrated in the diagram to the left in FIG. 6, the controller 104 causes the display unit 108 to display a screen on which the icon of the control app is displayed, as illustrated in the diagram in the middle on the upper row in FIG. 6. Next, if the communication mode is multi-connection mode, the controller 104 causes the display unit 108 to display a confirmation screen 60 for changing the communication mode setting like the one illustrated on the lower row in FIG. 6. Subsequently, if a tap operation is performed on the "Go to settings screen" display on the confirmation screen 60, the controller 104 causes the display unit 108 to display a standby screen indicating that the control device 100-1 is waiting for a connection from the imaging device 200 as illustrated in the diagram to the right on the upper row in FIG. 6. For example, the standby screen may display a communication mode icon 26 indicating multi-connection mode.

(Connection Process of Imaging Device)

Next, a process conducted when the imaging device 200 is connected after the control app is activated will be described with reference to FIGS. 7 and 8. FIG. 7 is a diagram for explaining an operation of configuring a communication mode on the imaging device 200 according to the present embodiment, while FIG. 8 is a diagram for explaining a connection process of the imaging device 200 on the control device 100-1 according to the present embodiment.

First, the imaging device 200 changes the communication mode to multi-connection mode on the basis of a user operation. Specifically, if an operation for changing the communication mode setting is performed, the controller 204 changes the communication mode of the imaging device 200 to the mode indicated by the operation for changing the setting. Additionally, if the changed communicated mode is multi-connection mode, the controller 204 causes the communication unit 208 to connect to the control device 100-1.

For example, if the settings of the imaging device 200 are selected, the controller 204 causes a message indicating that the settings of the imaging device 200 have been selected to be displayed on a display unit separately provided in the imaging device 200, as illustrated in the top diagram in FIG. 7. If a communication connection setting is additionally selected, the controller 204 causes the communication method to be displayed on the display unit, as illustrated in the upper-middle diagram in FIG. 7. Next, if communication mode is selected, the controller 204 causes the display unit to display the selected communication mode, as illustrated in the lower-middle diagram in FIG. 7. Note that if a connection with the control device 100-1 is being attempted or if a connection has been made, the controller 204 may emphasize the display of the communication mode displayed on the display unit, such as with a blinking display, for example.

Meanwhile, the control device 100-1 stands by until the imaging device 200 is connected. Specifically, when no imaging devices 200 are connected, the controller 104 causes the display of a screen indicating that the control device 100-1 is waiting for a connection from the imaging device 200.

Subsequently, if the imaging device 200 is connected, the control device 100-1 displays a screen corresponding to the connected imaging device 200. Specifically, if the imaging device 200 is connected, the controller 104 causes the display 108 to display a list screen displaying a list of connected imaging devices 200. In addition, after the connection process of the imaging device 200 is completed, the controller 104 causes the display 108 to display an operating screen for the imaging device 200.

For example, when the imaging device 200 is connected, the controller 104 causes the display 108 to display a list screen on which respective information indicating connected imaging devices 200 is arranged vertically and displayed, as illustrated in the middle diagram in FIG. 8. Furthermore, when a connecting imaging device 200 exists, the controller 104 overlays onto the list screen a screen 62 indicating that the imaging device 200 is currently conducting the connection process, as illustrated in the middle diagram in FIG. 8. Subsequently, after the connection process of the imaging device 200 is completed, the controller 104 causes the display 108 to display a single-view screen on which is displayed an image corresponding to the imaging device 200 that was connected first, for example.

Note that instead of the imaging device 200 that was connected first, the controller 104 may also select an imaging device 200 specified on the basis of information related to the imaging device 200, such as the type, attributes, connection count, or connection time of the imaging device 200, for example. Also, when multiple imaging devices 200 are connected, or when multiple imaging devices 200 have already been connected, a multi-view screen may be displayed on the display 108 instead of a single-view screen.

Next, screens displayed by the control device 100-1 will be described with reference to FIGS. 9 to 11. The display screens include a list screen on which a list of connected imaging devices 200 are displayed, and operating screens for operating connected imaging devices 200. The operating screens include a multi-view screen and a single-view screen corresponding to the display mode. FIG. 9 is a diagram illustrating an example of an imaging device 200 list screen displayed on the control device 100-1 according to the present embodiment. Also, FIG. 10 is a diagram illustrating an example of a single-view screen displayed on the control device 100-1 according to the present embodiment, and FIG.

11 is a diagram illustrating an example of a multi-view screen displayed on the control device 100-1 according to the present embodiment.

(Imaging Device List Screen)

On the imaging device 200 list screen, information indicating connected imaging devices 200 is displayed in list format. The information indicating a connected imaging devices 200 is referred to in the appended claims as an "identifier". Additionally, as the information indicating the imaging devices 200 ("identifiers"), an image indicating the type of imaging device 200 and information for identifying each imaging device 200 are displayed. For example, on the imaging device 200 list screen, as illustrated in FIG. 9, respective information indicating each of multiple connected imaging devices 200 ("identifiers") is arranged on individual lines and displayed. Note that the information indicating the imaging devices 200 may be sorted by order of connection. Furthermore, as the information indicating the imaging devices 200 ("identifiers"), a type icon 28 indicating the type of imaging device 200 and a character string indicating a name of the imaging device 200, such as a friendly name, for example, are displayed adjacent to each other. Note that the information indicating the imaging devices 200 ("identifiers") may also include an identification number discussed later. In addition, also displayed on the list screen are an image related to an operation for transitioning to the control app settings screen, such as the control app settings icon 22, for example, and an image indicating the currently configured communication mode, such as the communication mode icon 26, for example.

Note that the information related to the type and name of the imaging devices 200 may be acquired via communication from the connected imaging devices 200. Also, the types of imaging device 200 may be, for example, a compact digital camera, a single-lens reflex camera (A-mount), a single-lens reflex camera (E-mount), a Handycam, a lens-style camera, and a snap camera. Also, the information indicating an imaging device 200 ("identifiers") may also be displayed in multiple columns and/or multiple rows. Also, the information indicating an imaging device 200 ("identifiers") may also include an image acquired from the imaging device 200. For example, a reduced-scale image may be arranged and displayed beside the other information. In addition, any combination of the above-described information indicating an imaging device 200 ("identifiers") may be included in the displayed list screen. Thus, for example, the identifiers in the list may include, among others: a symbol corresponding to the imaging device 200 (e.g., type icon 28), a name of the imaging device 200, a number corresponding to the imaging device 200 (e.g., an identification number), an image corresponding to the imaging device 200 (e.g., a reduced scale image acquired by the imaging device), or any combination of these.

(Single-View Screen)

On the single-view screen, information about one imaging device 200 from among multiple connected imaging devices 200 is displayed. Specifically, on the single-view screen, an image corresponding to the imaging device 200 and an image indicating the status of the imaging device 200 are displayed. For example, on the single-view screen, as illustrated in FIG. 10, an image 30 acquired from the imaging device 200 and a shooting mode icon 32 indicating the shooting mode of the imaging device 200 are displayed. For example, the image 30 may be an image obtained by imaging of the imaging device 200 and received from the imaging device 200 at a designated time interval, such as an electric eye (EE) image, for example.

Also displayed on the single-view screen is an image indicating the imaging device 200 from among the multiple connected imaging devices 200 from which an image is being displayed. Specifically, on the single-view screen, a number assigned to each imaging device 200 in order of connection (hereinafter also called the identification number) is displayed. Note that instead of numerals, the identification number may also be other characters or signs having an order, such as Japanese kana characters or letters of the alphabet. For example, on the single-view screen, as illustrated in FIG. 10, the identification number "1" assigned to the imaging device 200 is displayed adjacent to the shooting mode icon 32. Note that the number of connected imaging devices 200 is displayed adjacent to the identification number. For example, the display "⅕" as illustrated in FIG. 10 indicates that there are five connected imaging devices 200, and "1" is the identification number of the imaging device 200 corresponding to the displayed image.

Also, on the single-view screen, images related to operating the imaging device 200 are displayed. For example, on the single-view screen, as illustrated in FIG. 10, an icon 20 related to the settings of the imaging device 200, a shooting mode setting icon 34 related to the shooting mode setting, and a recording operation icon 36 related to an operation for instructing the imaging device 200 to record are displayed.

Note that all or part of the information indicating the imaging device 200 may also be displayed on the single-view screen. For example, the friendly name of the imaging device 200 corresponding to the image displayed on the single-view screen may also be displayed.

(Multi-View Screen)

On the multi-view screen, information about each connected imaging device 200 is displayed. Specifically, on the multi-view screen, images corresponding to each of the connected imaging devices 200 are displayed. Furthermore, the controller 104 causes the display 108 to display, in association with each of the images, objects indicating the correspondence relationship between each of the listed images and each of the imaging devices 200. Specifically, the controller 104 causes the display 108 to display information indicating each of the imaging devices 200 and images indicating the status of each of the imaging devices 200.

For example, on the multi-view screen, as illustrated in FIG. 11, for each connected imaging device 200, an image 30 acquired from the imaging device 200, information indicating the imaging device 200, and the shooting mode icon 32 of the imaging device 200 are collected as a single set (hereinafter also called a display set), and these display sets are arranged and displayed. Herein, there exist many variations in the display format of the display sets, such as the size, number, and arrangement, for example. Accordingly, the display format of the display sets will be described with reference to FIGS. 12A to 15B. FIGS. 12A to 15B are diagrams that each illustrate an example of the display format of display sets on the control device 100-1 according to the present embodiment. Note that FIGS. 12A to 15B illustrate examples that partially differ from the compositional layout of display sets discussed above. For example, elements such as the identification number and friendly name may be arranged below the image 30.

The controller 104 decides the display area of the display sets on the basis of the number of display sets to display. Specifically, the controller 104 decides the number of display sets to display on the basis of factors such as the number of connected imaging devices 200 or display set display configuration information, and decides the display area of the display sets on the basis of the decided number to display, as well as the available area in which to display the display sets and the orientation of the screen.

For example, when the number of display sets to display is one or two, the controller 104 decides, as the display area for one display set, a rectangle whose length on one edge is half the length in the long-edge direction of the display area 40 of the multi-view screen, and whose length on an edge orthogonal to the one edge is half the length in the short-edge direction of the display area 40 of the multi-view screen, as illustrated in FIG. 12A. Also, the controller 104 specifies the screen orientation, and when the specified screen orientation is a reference direction of the screen, such as the horizontal direction, for example, decides the placement of the display areas so that two of the display areas are lined up in the horizontal direction. Subsequently, the display 108 displays the display sets in the assigned display areas. Note that the placement of display sets may be conducted by following the order indicated by the identification numbers, or conducted randomly.

Note that in FIG. 12B, the aspect ratio of the screen is different from the screen illustrated in FIG. 12A. For example, whereas the screen in FIG. 12A has an aspect ratio of 3:2, the screen in FIG. 12B has an aspect ratio of 16:9. For this reason, the aspect ratio of the display area for each of the display sets is also different.

Also, in FIG. 12C, the orientation of the screen is different from the screens illustrated in FIGS. 12A and 12B. For example, in FIG. 12C, the reference direction of the screen is the vertical direction. For this reason, the display areas of the display sets are arranged in the vertical direction. At this point, if there is free space in the horizontal direction of the display areas of the display sets, the display areas of the display sets may also be extended in the horizontal direction. For example, the display areas of the display sets may be extended to an aspect ratio of 16:9.

Next, an example in which the number of display sets to display is three or four will be described with reference to FIGS. 13A to 13C. For example, when the number of display sets to display is three or four, the controller 104 conducts a process similar to the case of displaying two display sets, and thereby decides, as the display area for one display set, a rectangle obtained by dividing the display area 40 of the multi-view screen into four sections, as illustrated in FIGS. 13A to 13C.

Next, an example in which the number of display sets to display is five or six will be described with reference to FIGS. 14A to 14C. For example, when the number of display sets to display is five or six, the controller 104 conducts a process similar to the case of displaying one to four display sets, and thereby decides, as the display area for one display set, a rectangle obtained by dividing the display area 40 of the multi-view screen into six sections, as illustrated in FIGS. 14A to 14C.

Note that when the number of display sets to be displayed is less than the decided number to display, a display area of a display set in which a display set is not displayed may also exist. For example, when the number to display is six, but the number of display sets to be displayed is five (for example, there are five connected imaging devices 200), a display set is not displayed in one of the six display areas of display sets, as illustrated in FIG. 14B. Note that the number of display sets that are not displayed may also be two or more.

Next, an example in which the number of display sets to display is 7 to 9 and 10 to 12 will be described with reference to FIGS. 15A and 15B. For example, when the number of display sets to display is 7 to 9, the controller 104 conducts a process similar to the case of displaying one to six display sets, and thereby decides, as the display area for one display set, a rectangle obtained by dividing the display area 40 of the multi-view screen into 9 sections, as illustrated in FIG. 15A. Also, when the number of display sets to display is 10 to 12, the controller 104 decides, as the display area for one display set, a rectangle obtained by dividing the display area 40 of the multi-view screen into 12 sections, as illustrated in FIG. 15B.

Note that not all display sets related to all connected imaging devices 200 may be displayed. For example, when there are five connected imaging devices 200, the controller 104 selects the display format that divides the multi-view screen into four sections as illustrated in FIGS. 13A to 13C, and selects four out of the five connected imaging devices 200, on the basis of a user operation. Subsequently, the controller 104 causes the display 108 to display the display sets related to the selected imaging devices 200.

Note that although the above description of the multi-view screen describes an example in which the image corresponding to an imaging device 200 is the image 30 received from an imaging device 200 at a designated time interval, when an image is not received from an imaging device 200, the controller 104 may also cause the display 108 to display an image indicating that an image has not been received or is being received, instead of the image 30. For example, when the image 30 is not received from an imaging device 200, the controller 104 may acquire from the storage 106 an image 38 indicating that an image is being acquired, as illustrated in FIG. 11, and cause the display 108 to display the acquired image 38. Note that when an image is later received from the imaging device 200, the controller 104 switches the displayed image from the image 38 to the received image 30.

Also, on the multi-view screen, images related to operating the imaging device 200 are displayed. For example, on the multi-view screen, as illustrated in FIG. 11, the shooting mode setting icon 34 and a recording operation icon 36 related to an operation for instructing the imaging device 200 to record are displayed.

(Process of Switching Display Screen)

Next, a process of switching the screen displayed by the control device 100-1 will be described with reference to FIGS. 16 and 17. FIG. 16 is a diagram illustrating an example of a process of switching the single-view screen by going through the multi-view screen on the control device 100-1 according to the present embodiment, while FIG. 17 is a diagram illustrating an example of a process of switching the single-view screen by going through the imaging device 200 list screen on the control device 100-1 according to the present embodiment.

First, a process of switching the single-view screen by going through the multi-view screen will be described with reference to FIG. 16.

If an operation for transitioning to the multi-view screen is performed on the single-view screen, the controller 104 causes the display 108 to transition the display screen from the single-view screen to the multi-view screen. For example, on the single-view screen, if a tap operation is performed on the identification number and the number of connected imaging devices 200 displayed adjacent to the shooting mode icon 32 as illustrated in the diagram to the left in FIG. 16, the controller 104 causes the display 108 to display a multi-view screen like the one illustrated in the middle-left diagram in FIG. 16.

Next, if an operation selecting one of the display sets displayed on the multi-view screen is performed, the controller 104 causes the display 108 to transition the display screen from the multi-view screen to a single-view screen for the imaging device 200 corresponding to the selected display set. For example, on the multi-view screen, if a tap operation is performed on one of the multiple display sets being displayed, such as the display set with the identification number 2, for example, the controller 104 causes the display 108 to display a single-view screen for the imaging device 200 having the identification number 2, as illustrated in the diagram to the right in FIG. 16. Note that during the time after the tap operation is performed and before the screen transitions to the single-view screen, the controller 104 causes the display 108 to display an image 64 indicating that a screen transition is being processed.

Next, a process of switching the single-view screen by going through the imaging device 200 list screen will be described with reference to FIG. 17.

When an operation for transitioning to the imaging device 200 list screen is performed on the single-view screen, the controller 104 causes the display 108 to transition the display screen from the single-view screen to the imaging device 200 list screen. For example, on the single-view screen, if a tap operation is performed on the Back operation icon 42 for giving an instruction to go back a screen as illustrated in the diagram to the left in FIG. 17, the controller 104 causes the display 108 to display an imaging device 200 list screen like the one illustrated in the middle-left diagram in FIG. 17.

Next, if an operation selecting one of the pieces of information indicating an imaging device 200 displayed on the imaging device 200 list screen is performed, the controller 104 causes the display 108 to transition the display screen from the imaging device 200 list screen to a single-view screen for the imaging device 200 corresponding to the selected information indicating an imaging device 200. For example, on the imaging device 200 list screen, if a tap operation is performed on one of the multiple pieces of information indicating an imaging device 200 being displayed, such as the second piece of information from the top, for example, the controller 104 causes the display 108 to display a single-view screen for the imaging device 200 corresponding to the tapped information, as illustrated in the diagram to the right in FIG. 17. Note that during the time after the tap operation is performed and before the screen transitions to the single-view screen, the controller 104 causes the display 108 to display an image 64 indicating that a screen transition is being processed.

Note that a screen transition may also be conducted between the imaging device 200 list screen and the multi-view screen. For example, similarly to the single-view screen, if a tap operation is performed on the Back operation icon 42 on the multi-view screen, the controller 104 causes the display 108 to display the imaging device 200 list screen. Also, on the imaging device 200 list screen, an icon for giving an instruction to transition to the multi-view screen is additionally placed, and if a tap operation is performed on the icon, the controller 104 causes the display 108 to display the multi-view screen.

(Shooting Process)

Next, the control of the transmission of an operational instruction to the imaging device 200 based on a user operation by the control device 100-1 will be described with reference to FIGS. 18 and 19. For example, the controller 104 transmits an image recording instruction, or in other words a shooting instruction, to the imaging device 200 on the basis of a user operation. FIG. 18 is a diagram for explaining a shooting process on the single-view screen displayed by the control device 100-1 according to the present embodiment, and FIG. 19 is a diagram for explaining a shooting process on the multi-view screen displayed by the control device 100-1 according to the present embodiment.

First, a shooting process on the single-view screen will be described with reference to FIG. 18.

If an operation for image recording is performed on the single-view screen, the controller 104 transmits an instruction related to image recording only to the imaging device 200 corresponding to the image being displayed. For example, on the single-view screen, if a tap operation is performed on the recording operation icon 36, the controller 104 transmits an instruction related to image recording via communication only to the imaging device 200A corresponding to the image being displayed on the single-view screen from among the connected imaging devices 200A to 200D, as illustrated in FIG. 18. For example, the instruction related to image recording may be an instruction to start or stop recording a moving image, or to record a still image. Note that in FIG. 18, the short-dashed lines indicate that the control device 100-1 and the imaging devices 200 are connected, while the long-dashed line indicates an operational instruction communicated from the control device 100-1 to an imaging device 200.

Next, a shooting process on the multi-view screen will be described with reference to FIG. 19.

If an operation for image recording is performed on the multi-view screen, the controller 104 transmits an instruction related to image recording to each of the imaging devices 200 corresponding to the display sets being displayed. For example, on the multi-view screen, if a tap operation is performed on the recording operation icon 36, the controller 104 transmits an instruction related to image recording via communication to each of the imaging devices 200A to 200D corresponding to the display sets being displayed on the multi-view screen from among the connected imaging devices 200A to 200D, as illustrated in FIG. 19. The controller 104 may also transmit operational instructions to all connected imaging devices 200.

Also, the controller 104 may cause the display 108 to display an indication that the imaging devices 200 are in a recording state. Specifically, the controller 104 adds an object indicating a recording state to the display sets corresponding to the imaging devices 200 in a recording state. For example, when an imaging device 200 starts image recording in accordance with an image recording start instruction, the imaging device 200 transmits information such as the status of the imaging device 200 or an indication that image recording has started to the control device 100-1. The controller 104 receives this information, and causes the display 108 to display an icon 44 indicating recording in the display set corresponding to the imaging device 200 that transmitted the information, such as overlaid onto the shooting mode icon 32, for example. Alternatively, a shooting mode icon 32 indicating recording may be displayed.

Note that the controller 104 may also transmit an operational instruction only to some of the imaging devices 200 corresponding to the display sets displayed on the multi-view screen. For example, the controller 104 may transmit an operational instruction, or in other words an instruction related to image recording, only to the imaging device 200 corresponding to a selected display set on the multi-view screen.

Furthermore, the controller 104 decides the content of the operational instruction on the basis of the operational state of each of the imaging devices 200 corresponding to the displayed display sets. Specifically, the controller 104 decides an instruction related to image recording for each of the imaging devices 200 on the basis of an image recording state for each of the imaging devices 200. Furthermore, a process of deciding the content of such an operational instruction will be described in detail with reference to FIG. 20. FIG. 20 is a diagram for explaining a process of deciding the content of an instruction related to image recording to the imaging device 200 on the control device 100-1 according to the present embodiment.

If an operation for image recording is performed on the multi-view screen, the controller 104 determines which predetermined state corresponds to the operational states related to recording of each of the imaging devices 200 corresponding to the display sets being displayed. For example, on the multi-view screen, if a tap operation is performed on the recording operation icon 36, the controller 104 acquires, from each of the imaging devices 200 via communication, the image recording state of each of the imaging devices 200 corresponding to the display sets being displayed. Subsequently, the controller 104 determines which designated state corresponds to the acquired image recording states, such as a state in which all imaging devices 200 have stopped recorded, a state in which multiple imaging devices 200 are executing recording, and a state in which all imaging devices 200 are executing recording, as illustrated in the left column of the table T1 in FIG. 20, for example. Note that the image recording states of the imaging devices 200 may also be acquired via communication in advance and stored in the storage 106. In this case, the controller 104 acquires the image recording states from the storage 106.

The controller 104 decides the content of the operational instruction on the basis of the determined states and the shooting mode of the imaging devices 200. Specifically, for each of the imaging devices 200 to which to transmit an instruction related to image recording, the controller 104 decides the content with which to instruct each imaging device 200 on the basis of the shooting mode and the determined state for each. For example, if the shooting mode is a moving-image type of shooting mode for a certain imaging device 200, for example, the controller 104 selects from among instruction content as illustrated in the middle column of the table T1 illustrated in FIG. 20. Also, if the shooting mode is a still-image type of mode, the controller 104 selects from among instruction content as illustrated in the right column of the table T1 illustrated in FIG. 20. The controller 104 conducts the above selection process for each of the imaging devices 200 to be given an operational instruction, and transmits an instruction related to image recording to each imaging device 200 in accordance with the selected instruction content.

In this way, according to the first embodiment of the present disclosure, the control device 100-1 is connected to multiple imaging devices 200 via wireless communication, and communicates with each of the multiple imaging devices 200. Additionally, the control device 100-1 specifies each of the images corresponding to each of the multiple imaging devices 200 on the basis of the communication, and lists the specified images. For this reason, dynamic connections are enabled between the control device 100-1 and each of the multiple imaging devices 200, and each of the images acquired from each of the multiple imaging devices 200 is perceivably displayed at a glance. Consequently, it is possible for the user to easily perceive the images corresponding to each of the multiple connected imaging devices 200, while also retaining flexibility in the format of communication with the imaging devices 200.

Also, the control device 100-1 additionally conducts operational control with respect to imaging devices 200 corresponding to the listed images, on the basis of the occurrence of an event related to the imaging devices 200 in the list display state. For this reason, by conducting operational control related to imaging devices 200 perceived in a list by the user, the user more easily perceives the imaging devices 200 whose operation is to be controlled, making it possible to improve usability.

In addition, the above event includes user operations directed at the imaging devices 200, and the control device 100-1 conducts operational control based on a user operation performed while in the list display state for each of the imaging devices 200 corresponding to each of the listed images. For this reason, the user does not have to perform operations individually on each of the imaging devices 200 to be operated, thereby reducing the user workload, and making it possible to improve usability.

Also, the above operational control based on a user operation includes control of an operational instruction transmitted to the imaging devices 200. For this reason, the transmission of an operational instruction to the imaging devices 200 is controlled all at once, making it possible to reduce the possibility of inconsistent operational timings or the like of the imaging devices 200.

In addition, the above operational instruction includes an instruction related to image recording with respect to the imaging devices 200, and the control device 100-1 decides the instruction content on the basis of the operational state of each of the imaging devices 200 corresponding to the displayed images. For this reason, by aligning the operation of each of the imaging devices 200, it becomes possible to realize control of a group of imaging devices 200 according to the user's intentions.

In addition, the control device 100-1 displays, in association with each of the images, objects indicating the correspondence relationship between each of the listed images and each of the imaging devices 200. In this way, by displaying an identification number and a friendly name or the like in correspondence with an EE image, for example, the user more easily recognizes the imaging device 200 corresponding to the EE image, making it possible to minimize operating mistakes caused by the user mistaking the correspondence relationship between an imaging device 200 and an EE image.

In addition, the control device 100-1 individually displays one from among the images, and switches the display between the list display of the images and the individual display. For this reason, when the user wants to focus only on one imaging device 200 among the imaging devices 200 corresponding to each of the listed images, the display may be switched to an individual display of the relevant imaging device 200, thereby making it possible to improve usability.

In addition, the control device 100-1 conducts operational control based on a user operation directed at an imaging device 200 in the individual display state, only for the imaging device 200 corresponding to the individually displayed image. For this reason, operational control is conducted only for the imaging device 200 that the user wants to operate, thereby making it possible to improve usability further.

<2-3. Modifications>

The foregoing thus describes a first embodiment of the present disclosure. However, the present embodiment is not limited to the foregoing example. Hereinafter, first to third modifications of the present embodiment will be described.

(First Modification)

As a first modification of the present embodiment, the control device 100-1 may also notify the user of an operational result of the imaging device 200 conducted on the basis of an instruction related to image recording. Specifically, the communication unit 102 receives an image obtained by a recording operation of the imaging device 200 conducted on the basis of an instruction related to image recording, and the controller 104 causes the display 108 to display the received image.

For example, on the basis of an instruction by the controller 104, the communication unit 102 transmits a recording instruction to an imaging device 200 whose shooting mode is still image mode, and receives an image obtained by the imaging of that imaging device 200. The controller 104 causes the display 108 to display the received image as a confirmation display, or in other words, a preview. Furthermore, the controller 104 causes the display 108 to display an image prompting the user to select whether or not to save the image, and if an operation selecting to save is performed, causes the storage 106 to store the image.

Furthermore, the controller 104 may also determine whether or not to present a preview on the basis of configuration information related to image preview and saving. Configuration information for preview will be described in detail with reference to FIG. 21. FIG. 21 is a diagram illustrating an example of configuration information for image preview and saving according to a first modification of the present embodiment.

First, when an image is received from the imaging device 200, the controller 104 acquires configuration information for preview and saving. For example, configuration information indicating whether or not to conduct preview and saving is stored in the storage 106, and when an image is received from the imaging device 200, the controller 104 acquires the configuration information from the storage 106.

Next, the controller 104 determines whether or not to preview the received image, on the basis of the shooting mode of the imaging device 200 and the acquired configuration information. For example, the controller 104 decides whether or not to present a preview (display) according to whether the configuration information for preview (display) and saving is on or off, and whether the shooting mode is still image (normal) or still image (continuous), as illustrated by the table T2 in FIG. 21. For example, when the shooting mode is still image (normal), the controller 104 presents a preview if the preview (display) setting is on, and when the shooting image is still image (continuous), the controller 104 presents a preview if the preview (display) or saving setting is on. This is because when the shooting mode is still image (continuous), multiple received images exist, and thus the user is made to select which of the multiple images to save, or select to save all. Note that the controller 104 may also change the determination result according to whether the screen is the single-view screen or the multi-view screen. Specifically, for the single-view screen, the controller 104 makes a determination as above, and for the multi-view screen, the controller 104 does not preview the image received from the imaging device 200. For example, the controller 104 ordinarily does not present a preview (display) on the multi-view screen, irrespective of the content of the configuration information for preview (display) and saving or the shooting mode, as illustrated by the table T2 in FIG. 21.

In this way, according to the first modification of the present embodiment, the control device 100-1 presents a confirmation display to the user for an image obtained by a recording operation of the imaging device 200 based on an instruction related to image recording.

In addition, in the list display state, the control device 100-1 does not present a confirmation display to the user for the result of recording by the imaging device 200 conducted on the basis of an instruction related to image recording. At this point, in some cases images may be received as recording results from multiple imaging devices 200 in response to an instruction related to image recording on the multi-view screen, and thus if a preview is presented for each of the received images, the display screen may become complicated. However, according to the process of the present modification, a preview is not prevented on the multi-view screen, thereby making it possible to minimize decreases in the visibility of the display screen.

Note that although the above describes an example in which a preview is presented when the shooting mode is a mode related to still images, but a preview may also be presented when the shooting mode is a mode related to moving images.

Additionally, when images related to recording are received from multiple imaging devices 200 on the multi-view screen, the controller 104 may also treat each of the multiple imaging devices 200 as one group, and cause the storage 106 to save each of the received images in units of groups. For example, if images are received from multiple imaging devices 200, the controller 104 treats each of the imaging devices 200 as one group, and causes the storage 106 to store the received images so that each of the received images is saved in a common directory or the like, for example. In this case, organization of the images received from contemporaneously connected imaging devices 200 becomes easy, making it possible to improve usability.

(Second Modification)

As a second modification of the present embodiment, the control device 100-1 may also transmit another operational instruction different from an instruction related to image recording, such as an instruction related to the settings of the imaging device 200, for example. Specifically, the control device 100-1 transmits a settings-related instruction to the imaging device 200 on the basis of a user operation conducted in the individual display state or the list display state. First, an operation of transmitting a settings instruction to the imaging device 200 while in the individual display state will be described with reference to FIG. 22. FIG. 22 is a diagram for explaining an example of an operation of transmitting a settings instruction to the imaging device 200 on the single-view screen of the control device 100-1 according to a second modification of the present embodiment.

If an operation related to the settings of the imaging device 200 is performed on the single-view screen, the control device 100-1 transmits a settings-related instruction only to the imaging device 200 corresponding to the displayed image. For example, on the single-view screen, if a tap operation is performed on the icon 20 related to the settings of the imaging device 200 or the shooting mode setting icon 34, the controller 104 causes the display 108 to display a shooting mode selection screen 66, as illustrated in FIG. 22. Subsequently, if a shooting mode is selected on the shooting mode selection screen 66, the controller 104 transmits an instruction related to the shooting mode setting via communication only to the imaging device 200A corresponding to the image being displayed on the screen from among the connected imaging devices 200A to 200D, as illustrated in FIG. 22.

Next, an operation of transmitting a settings instruction to the imaging device 200 while in the list display state will be described with reference to FIG. 23. FIG. 23 is a diagram for explaining an example of an operation of transmitting a settings instruction to the imaging device 200 on the multi-view screen of the control device 100-1 according to the second modification of the present embodiment.

If an operation related to the settings of the imaging device 200 is performed on the multi-view screen, the control device 100-1 transmits a settings-related instruction to each of the imaging devices 200 corresponding to each of the displayed images. For example, on the multi-view screen, if a tap operation is performed on the shooting mode setting icon 34, the controller 104 causes the display 108 to display the shooting mode selection screen 66, as illustrated in FIG. 23. Subsequently, if a shooting mode is selected on the shooting mode selection screen 66, the controller 104 transmits an instruction related to the shooting mode setting via communication to each of the imaging devices 200A to 200D corresponding to the display sets being displayed on the multi-view screen from among the connected imaging devices 200A to 200D.

At this point, the controller 104 decides the instruction content on the basis of settings shared in common among the imaging devices 200 corresponding to the displayed images. For example, the controller 104 picks out selectable shooting modes shared in common among the imaging devices 200A to 200D corresponding to the displayed display sets, and causes the relevant shooting modes to be displayed on the shooting mode selection screen 66. Subsequently, the controller 104 transmits an instruction via communication to each of the imaging devices 200 so as to change the shooting mode to the shooting mode selected by the user on the shooting mode selection screen 66.

Note that although the above describes an example in which the content of the setting to transmit to the imaging devices 200 on the multi-view screen is a shooting mode setting, the content of the setting to transmit to the imaging devices 200 may also be another setting, such as a communication mode setting.

In this way, according to the second modification of the present embodiment, the control device 100-1 transmits a settings-related instruction to the imaging device 200 on the basis of a user operation conducted in the individual display state or the list display state.

Also, if an operation related to the settings of the imaging device 200 is performed on the multi-view screen, the control device 100-1 transmits a settings-related instruction to each of the imaging devices 200 corresponding to each of the displayed images. For this reason, individual operations on each of the imaging devices 200 may be omitted, making it possible to improve usability.

Also, the control device 100-1 decides the instruction content on the basis of settings shared in common among the imaging devices 200 corresponding to the displayed images. For this reason, by not transmitting a settings-related instruction to an imaging device 200 that does not support the selected setting, it becomes possible to minimize errors on the relevant imaging device 200 and also to minimize the user mistakenly thinking that the relevant setting is available on the relevant imaging device.

(Third Modification)

As a third modification of the present embodiment, the control device 100-1 may also notify the user when an operation that is not supported in the currently set communication mode is performed. Specifically, when the communication mode is multi-connection mode, and an operation that is not supported in multi-connection mode is performed, the controller 104 causes the display 108 to display an image notifying the user that the operation is unsupported. Furthermore, a process will be described for the case in which an operation that is not supported in the currently set communication mode is performed, with reference to FIGS. 24A to 24D. FIGS. 24A to 24D are each a diagram for explaining an example of a display indicating that a performed operation is unsupported on the control device 100-1 according to the third modification of the present embodiment.

For example, in multi-connection mode, if an operation for making a single connection is performed, such as a touch operation on the control device 100-1 with respect to an imaging device 200 in conjunction with NFC communication, for example, the controller 104 causes the display 108 to display an image notifying the user that the current communication mode is multi-connection mode. The display 108 displays an image 68 as illustrated in FIGS. 24A to 24D, for example. Note that although FIGS. 24A to 24D illustrate examples in which the same image 68 is displayed on each display screen, different screens may be displayed for each. In addition, the image 68 may also be an image that disappears after a designated time elapses, such as a Toast image, for example.

In this way, according to the third modification of the present embodiment, the user may be notified when an operation that is not supported in the currently set communication mode is performed. For this reason, the user does not repeatedly perform an unsupported operation without knowing that the operation is not supported in the currently set communication mode, making it possible to improve usability.

3. SECOND EMBODIMENT (OPERATIONAL CONTROL BASED ON STATUS CHANGE IN IMAGING DEVICE)

The foregoing thus described a control device 100-1 according to the first embodiment of the present disclosure. Next, a control device 100-2 according to a second embodiment of the present disclosure will be described. The control device 100-2 controls, on the basis of a status change of each of the imaging devices 200 corresponding to each of the listed images, a display indicating the status changes.

<3-1. Device Configuration>

The configuration of the control device 100-2 according to the second embodiment of the present disclosure is substantially the same as the configuration according to the first embodiment, but the function of the controller 104 is partially different. Note that description will be reduced or omitted for functions which are substantially the same as the first embodiment.

(Functional Configuration of Control Device)

The controller 104 controls, on the basis of a status change of each the connected imaging devices 200, a display indicating the status changes. Specifically, the controller 104 controls a display indicating the communication status of each of the imaging devices 200. Furthermore, the controller 104 controls the display differently according to the configured display mode.

If the display mode is single-view mode, the controller 104 controls the display to indicate the status change of the imaging device 200 corresponding to the individually displayed image. In addition, the controller 104 controls the display to indicate status changes of imaging devices 200 other than the imaging device 200 corresponding to the individually displayed image. Specifically, the controller 104 controls the display to indicate a change in communication status on the basis of a change in the communication status of the imaging device 200 corresponding to the individually displayed image, and also controls the display to indicate a change in communication status on the basis of the changes in the communication statuses of imaging devices 200 other than the above imaging device 200. For example, when communication with the imaging device 200 corresponding to the individually displayed image is disconnected, the controller 104 switches the display mode to the multi-view mode. Also, when there is change in the presence or absence of a communication connection with a imaging device 200 other than the imaging device 200 related to the individually displayed image, the controller 104 causes the display 108 to display an image indicating that the presence or absence of that communication connection has changed.

If the display mode is multi-view mode, the controller 104 controls the display to indicate status changes on the basis of the status change of each of the imaging devices 200 corresponding to each of the listed images. Specifically, the controller 104 controls, on the basis of a change in communication status of an imaging device 200, a display indicating the change in communication status. For example, the controller 104 controls the display of the image corresponding to the imaging device 200 related to a change in the presence or absence of a communication connection.

<3-2. Device Operation>

Next, processing by the control device 100-2 according to the present embodiment will be described.

(Overall Process Flow)

First, the overall processing by the control device 100-2 will be summarized with reference to FIG. 25. FIG. 25 is a flowchart that conceptually illustrates a summary of overall processing by the control device 100-2 according to the present embodiment. Note that description will be reduced or omitted for processes which are substantially the same as processes in the first embodiment.

First, the communication unit 102 activates the application in multi-connection mode (step S402), and displays images received from the connected imaging devices 200 (step S404).

Next, the control device 100-2 determines whether or not the presence or absence of a communication connection with an imaging device 200 has changed (step S406). Specifically, the controller 104 determines whether or not communication with a connected imaging device 200 has been disconnected, or whether or not a communication connection has been made with a new imaging device 200.

In the case of determining that the presence or absence of a communication connection with an imaging device 200 has changed, the control device 100-2 determines whether or not the display mode is multi-view mode (step S408). Specifically, when a connection with an imaging device 200 is disconnected or newly made, the controller 104 determines whether or not the display mode is multi-view mode.

If the display mode is determined to be multi-view mode, the control device 100-2 executes display control to indicate the status changes of the imaging devices 200 corresponding to the displayed images (step S410). Specifically, the controller 104 executes display control of the images corresponding to the imaging devices 200 whose communication status has changed from among the imaging devices 200 corresponding to the listed images.

If the display mode is determined not to be multi-view mode, or in other words determined to be single-view mode, the control device 100-2 determines whether or not the imaging device 200 whose communication status has changed is the imaging device 200 corresponding to the displayed image (step S412). Specifically, the controller 104 determines whether or not a disconnected imaging device 200 is the imaging device 200 corresponding to the displayed image.

In the case of determining that an imaging device 200 whose presence or absence of a communication connection changed is the imaging device 200 corresponding to the displayed image, the control device 100-2 changes the display mode to multi-view mode (step S414). Specifically, in the case of determining that a disconnected imaging device 200 is the imaging device 200 corresponding to the displayed image, the controller 104 changes the display mode to multi-view mode, and causes the display 108 to transition the display screen to the multi-view screen.

In the case of determining that an imaging device 200 whose presence or absence of a communication connection changed is not the imaging device 200 corresponding to the displayed image, the control device 100-2 temporarily displays an image indicating the change in the presence or absence of a communication connection (step S416). Specifically, in the case of determining that a disconnected imaging device 200 is not the imaging device 200 corresponding to the displayed image or that a new communication connection has been made from an imaging device 200, the controller 104 causes the display 108 to display an image indicating the communication disconnection or the communication connection for a designated time.

Next, a display control process based on a status change in the communication connection of the imaging device 200 on the control device 100-2 will be described. First, a display control process when making a new communication connection with the imaging device 200 will be described with reference to FIGS. 26A to 26D. FIGS. 26A to 26D are diagrams for explaining a display control process when making a new communication connection with the imaging device 200 on the control device 100-2 according to the present embodiment.

(Display Control Process when New Communication Connection with Imaging Device 200 is Made)

First, when a new communication connection with the imaging device 200 is established, the controller 104 specifies the type of the display screen. For example, when a communication connection with the imaging device 200 is newly added, the controller 104 specifies whether the currently displayed screen is the standby screen indicating that the control device 100-2 is waiting for a connection from the imaging device 200, the imaging device 200 list screen, or a single-view screen or multi-view screen from among the operating screens.

Next, the controller 104 controls the display according to the specified type of the display screen. For example, if the display screen is the standby screen, the controller 104 causes the display 108 to transition the display screen to the imaging device 200 list screen and also display an image 70 indicating that a new communication connection with the imaging device 200 was made, as illustrated in the lower part of FIG. 26A. Meanwhile, if the display screen is the imaging device 200 list screen, the controller 104 causes the display 108 to additionally display on the list screen information indicating the newly connected imaging device 200 and also display the image 70 indicating that a new communication connection with the imaging device 200 was made, as illustrated in the lower part of FIG. 26B. Note that the image 70 may also be an image that disappears after a designated time elapses, such as a Toast image, for example.

Meanwhile, if the display screen is the single-view screen, the controller 104 causes the display 108 to update the display indicating the number of connected imaging devices 200 and also display the image 70 indicating that a new communication connection with the imaging device 200 was made, as illustrated in the lower part of FIG. 26C. Meanwhile, if the display screen is the multi-view screen, the controller 104 causes the display 108 to additionally display the display set corresponding to the newly connected imaging device 200 and also display the image 70 indicating that a new communication connection with the imaging device 200 was made, as illustrated in the lower part of FIG. 26D.

Next, a display control process when communication with the imaging device 200 is disconnected will be described with reference to FIGS. 27A to 27C and FIG. 28. FIGS. 27A to 27C and FIG. 28 are diagrams for explaining a display control process when communication with the imaging device 200 is disconnected on the control device 100-2 according to the present embodiment. Note that description will be reduced or omitted for processes that are substantially the same as the processes discussed above.

(Display Control Process when Communication with Imaging Device 200 is Disconnected)

First, when communication with the imaging device 200 is disconnected, the controller 104 specifies the type of the display screen.

Next, the controller 104 controls the display according to the specified type of display screen. For example, if the display screen is the imaging device 200 list screen, the controller 104 causes the display 108 to remove from the list screen information indicating the disconnected imaging device 200 and also display an image 72 indicating the disconnected imaging device 200 as well as indicating that the imaging device 200 was disconnected, as illustrated in the lower part of FIG. 27A. Note that the image 72 may also be an image that disappears after a designated time elapses, such as a Toast image, for example.

Also, if the display screen is the single-view screen, the controller 104 determines whether or not the disconnected imaging device 200 is the imaging device 200 corresponding to the display screen. Subsequently, in the case of determining that the disconnected imaging device 200 is not the imaging device 200 corresponding to the display screen, the controller 104 causes the display 108 to update the display indicating the number of connected imaging devices 200 and also display the image 72 indicating the disconnected imaging device 200 as well as indicating that the imaging device 200 was disconnected, as illustrated in the diagram to the left on the lower row of FIG. 27B. Also, in the case of determining that the disconnected imaging device 200 is the imaging device 200 corresponding to the display screen, the controller 104 causes the display 108 to transition the display screen to the multi-view screen and also display the image 72 indicating the disconnected imaging device 200 as well as indicating that the imaging device 200 was disconnected, as illustrated in the diagram to the right on the lower row of FIG. 27B. Note that on the multi-view screen after the transition, the display set corresponding to the disconnected imaging device 200 is not displayed.

Also, if the display screen is the multi-view screen, the controller 104 causes the display 108 to remove the display set corresponding to the disconnected imaging device 200 and also display the image 72 indicating the disconnected imaging device 200 as well as indicating that the imaging device 200 was disconnected, as illustrated in the lower part of FIG. 27C. Note that in addition to removing a display set, the display sets may also be changed. For example, the identification numbers may be moved up for the display sets related to identification numbers that came after the identification number of the removed display set.

Note that if no more connected imaging devices 200 exist, the controller 104 may also cause the display 108 to transition the display screen to a standby screen indicating that the control device 100-2 is waiting for a connection from an imaging device 200. For example, when an imaging device 200 is disconnected, the controller 104 determines whether or not at least one imaging device 200 is connected. In the case of determining that no imaging devices 200 are connected, the controller 104 causes the controller 104 to transition the display screen to the standby screen. For example, if the display screen is one from among the imaging device 200 list screen, the single-view screen, and the multi-view screen, the display screen is transitioned to the standby screen, as illustrated in FIG. 28.

In this way, according to the second embodiment of the present disclosure, the control device 100-2 controls the display to indicate a status change in each of the imaging devices 200 corresponding to each of the listed images. For this reason, the user may easily perceive status changes in the listed imaging devices 200, and become able to rapidly address such status changes.

In addition, the above status change of the imaging device 200 includes a change in the communication status of the imaging device 200. For this reason, by informing the user of a status change in communication with the imaging device 200 which is related to control of the imaging device 200, it becomes possible to minimize missed control opportunities and incorrect control of the imaging device 200 due to the user not knowing about the status change.

In addition, the control device 100-2 controls the display of an image related to the imaging device 200 for which the presence or absence of a communication connection has changed. For this reason, by informing the user of the change in the presence or absence of the communication connection, it becomes possible to further minimize missed control opportunities and incorrect control of the imaging device 200.

In addition, on the single-view screen, the control device 100-2 controls the display to indicate status changes of imaging devices 200 other than the imaging device 200 corresponding to the individually displayed image. For this reason, by informing the user of the status of other imaging devices 200 while the user is focusing on operating a single imaging device 200, it becomes possible to save the user from the burden of switching the display mode, or in other words the display screen, and thereby improve usability.

<3-3. Modifications>

The foregoing thus describes the second embodiment of the present disclosure. However, an embodiment is not limited to the foregoing example. Hereinafter, modifications of the present embodiment will be described.

As a modification of the present embodiment, the control device 100-2 may also control the display on the basis of a malfunction occurring in the imaging device 200. Specifically, the controller 104 causes the display 108 to display an object indicating an ongoing error that occurs in an ongoing manner as a first malfunction. Note that an ongoing error includes errors that occur continuously or intermittently, and may be a lack of media inserted into the imaging device 200 or a temperature increase in the imaging device 200, for example. In addition, a display control process based the occurrence of an ongoing error in the imaging device 200 will be described with reference to FIGS. 29 and 30. FIG. 29 is a diagram illustrating an example of a display related to an ongoing error on a single-view screen of the control device 100-2 according to a modification of the present embodiment, and FIG. 30 is a diagram illustrating an example of a display related to an ongoing error on a multi-view screen of the control device 100-2 according to a modification of the present embodiment.

(Display Control Based on Occurrence of Ongoing Error)

First, the controller 104 detects the occurrence of an error in the imaging device 200. For example, the controller 104 detects the occurrence of an error in the imaging device 200 on the basis of error information received from the imaging device 200 where the error occurred.

When the occurrence of an error in the imaging device 200 is detected, the controller 104 specifies the type of the detected error. For example, the controller 104 specifies the type of error on the basis of error type information or the like included in error information received from the imaging device 200.

Next, if specified error type is an ongoing error, the controller 104 presents a display indicating the occurrence of an ongoing error, according to the currently configured display mode.

For example, if the display mode is single-view mode, the controller 104 causes the display 108 to display an image 74 made up of an icon indicating the occurrence of an ongoing error and a text string explaining the content of the error, as illustrated in FIG. 29. Note that the image 74 is continually displayed while the ongoing error is occurring.

Meanwhile, if the display mode is multi-view mode, the controller 104 causes the display 108 to display an object indicating the occurrence of an ongoing error in association with the image corresponding to the imaging device 200 where the ongoing error occurred. For example, the controller 104 causes the display 108 to display an icon 76 indicating the occurrence of an ongoing error, overlaid onto the display set corresponding to the imaging device 200 where the ongoing error occurred, such as the image 30, for example, as illustrated in FIG. 30.

(Display Control Based on Occurrence of Isolated Error)

In addition, the controller 104 may also cause the display 108 to display an object indicating an isolated error that occurs in an isolated manner as a second malfunction. For example, an isolated error may be a failure of operation in the imaging device 200, the receiving of an instruction for unsupported operation, or the like. A display control process based the occurrence of an isolated error in the imaging device 200 will be described with reference to FIGS. 31A and 31B, and FIG. 32. FIGS. 31A and 31B are diagrams illustrating an example of a display related to an isolated error on a single-view screen of the control device 100-2 according to a modification of the present embodiment, and FIG. 32 is a diagram illustrating an example of a display related to an isolated error on a multi-view screen of the control device 100-2 according to a modification of the present embodiment. Note that description will be reduced or omitted for processes that are substantially the same as the processes for an ongoing error.

First, the controller 104 detects the occurrence of an error in the imaging device 200, and specifies the type of the detected error.

Next, if specified error type is an isolated error, the controller 104 presents a display indicating the occurrence of an isolated error, according to the currently configured display mode.

For example, if the display mode is single-view mode, the controller 104 determines whether or not the imaging device 200 where the isolated error occurred is the imaging device 200 related to the image displayed on the single-view screen. In the case of determining that the imaging device 200 where the error occurred is the imaging device 200 related to the displayed image, the controller 104 causes the display 108 to display a dialog 78 including an indication that an isolated error occurred in the imaging device 200 related to the displayed image, as well as a text string explaining the content of the error, as illustrated in FIG. 31A. Note that the dialog 78 is removed from the display screen if the user performs a confirmation operation. Meanwhile, in the case of determining that the imaging device 200 where the isolated error occurred is another imaging device 200 other than the imaging device 200 related to the displayed image, the controller 104 causes the display 108 to display an image 80 indicating that an isolated error occurred in the corresponding other imaging device 200, as illustrated in FIG. 31B. Note that the image 80 may also be an image that disappears after a designated time elapses, such as a Toast image, for example.

Meanwhile, if the display mode is multi-view mode, the controller 104 causes the display 108 to display an image 82 indicating that an isolated error occurred in the corresponding other imaging device 200, as illustrated in FIG. 32. Note that if an isolated error occurs in each of multiple imaging devices 200, the controller 104 may cause the display 108 to display and remove an image 82 for each imaging device 200 where an isolated error occurred in order of error occurrence, or arrange and display multiple images 82.

In this way, according to the modification of the present embodiment, the control device 100-2 controls the display to indicate the occurrence of a malfunction in each of the imaging devices 200 corresponding to each of the listed images. For this reason, by informing the user of a malfunction in an imaging device 200 related to the list display, the user becomes able to quickly switch the display screen to the single-view screen in order to individually operate the imaging device 200 where the malfunction occurred, and address the malfunction.

In addition, the control device 100-2 displays an object indicating the occurrence of an ongoing error. For this reason, by enabling the user to recognize an ongoing error more easily, it becomes possible to reduce the possibility of the occurrence of an ongoing error being overlooked.

In addition, the control device 100-2 displays an object indicating the occurrence of an ongoing error in association with the image corresponding to the imaging device 200 where the ongoing error occurred. For this reason, it is easier to perceive which imaging device 200 the ongoing error occurred in, enabling the user to address the ongoing error more rapidly.

In addition, the control device 100-2 displays an object which indicates the occurrence of an isolated error, and which disappears after a designated time elapses. For this reason, when isolated errors occur repeatedly, it is possible to prevent reduced visibility of the display screen as a result of displays related to the non-ongoing isolated errors remaining on the display screen.

4. HARDWARE CONFIGURATION OF CONTROL DEVICE ACCORDING TO EMBODIMENT OF THE PRESENT DISCLOSURE

The control device 100 according to embodiments of the present disclosure have been described above. The processes of the control device 100 described above are realized through cooperation of software and the hardware of the control device 100 to be described below.

FIG. 33 is an explanatory diagram illustrating a hardware configuration of the control device 100 according to an embodiment of the present disclosure. As illustrated in FIG. 33, the control device 100 includes a central processing unit (CPU) 132, a read-only memory (ROM) 134, a random access memory (RAM) 136, a bridge 138, a bus 140, an interface 142, an input device 144, an output device 146, a storage device 148, a drive 150, a connection port 152, and a communication device 154.

The CPU 132 functions as an arithmetic processing apparatus and realizes an operation of the control unit 102 in the control device 100 in cooperation with various programs. The CPU 132 may be a microprocessor. The ROM 134 stores programs, arithmetic parameters, and the like used by the CPU 132. The RAM 136 temporarily stores programs used in execution of the CPU 132 or parameters or the like properly changed in execution thereof. A part of the storage unit 106 in the control device 100 is realized by the ROM 134 and the RAM 136. The CPU 132, the ROM 134, and the RAM 136 are mutually connected by an internal bus configured by a CPU bus or the like.

The input device 144 is configured to include an input unit, such as a mouse, a keyboard, a touch panel, a button, a microphone, a switch, and a lever, used for the user to input information, and an input control circuit such as the operation detector 110 generating an input signal based on an input by the user and outputting the input signal to the CPU 132. The user of the control device 100 can input various kinds of data or can give an instruction of a processing operation to the control device 100 by manipulating the input device 144.

The output device 146 outputs information to, for example, a device such as a liquid crystal display (LCD) device, an organic light emitting diode (OLED) device, or a lamp. The output device 146 may output an audio of a speaker, a headphone, and the like.

The storage device 148 is a device that stores data. The storage device 148 may include a storage medium, a recording device recording data on a storage medium, a reading device reading data from a storage medium, or a deletion device deleting data recorded on a storage medium. The storage device 148 stores programs executed by the CPU 132 or various kinds of data.

The drive 150 is a reader/writer for a storage medium, and is internally housed inside, or externally attached to, the control device 100. The drive 150 reads out information recorded to a removable storage medium such as an inserted magnetic disk, optical disc, magneto-optical disc, or semiconductor memory, and outputs such information to the RAM 134. Additionally, the drive 150 may also write information to the removable storage medium.

The connection port 152 is, for example, a bus connected to an external information processing process or a peripheral device of the control device 100. The connection port 152 may be a Universal Serial Bus (USB).

The communication device 154 is an example of the communication unit 102 of the control device 100 and is, for example, a communication interface configured by a communication device connected to a network. The communication device 154 may be a communication device corresponding to a wireless local area network (LAN), or may be a communication device corresponding to Long Term Evolution (LTE).

5. CONCLUSION

As above, according to the first embodiment of the present disclosure, dynamic connections are enabled between the control device 100-1 and each of the multiple imaging devices 200, and each of the images acquired from each of the multiple imaging devices 200 is perceivably displayed at a glance. Consequently, it is possible for the user to easily perceive the images corresponding to each of the multiple connected imaging devices 200, while also retaining flexibility in the format of communication with the imaging devices 200. In addition, according to the second embodiment of the present disclosure, the user may easily perceive status changes in the listed imaging devices 200, and become able to rapidly address such status changes.

It should be understood by those skilled in the art that various modifications, combinations, sub-combinations and alterations may occur depending on design requirements and other factors insofar as they are within the scope of the appended claims or the equivalents thereof.

For example, the foregoing embodiments describe examples of screen transitions for each process, the present technology is not limited to such examples. For example, the controller 104 may also cause the display 108 to transition the display screen without going through any of the screens described in the foregoing embodiments, or by going through another screen. For example, the controller 104 may cause the display 108 to transition directly from the standby screen illustrated in the diagram to the left in FIG. 5 to the confirmation screen for changing the communication mode setting illustrated in the diagram to the right in FIG. 5, without going through the screen illustrated in the middle diagram in FIG. 5. In this case, a GUI element such as a button for changing the communication mode setting is made available on the standby screen.

Also, the second embodiment above describes an example in which, on the multi-view screen, the displayed content of the display sets is controlled on the basis of a status change in the communication connection. However, the display layout of the display sets may also be controlled. For example, if a communication connection is added or removed, the controller 104 may increase, decrease, or maintain the number of display sets to display, according to the number of connected imaging devices 200.

The effects described in the specification are just explanatory or exemplary effects, and are not limiting. That is, the technology according to an embodiment of the present disclosure can exhibit other effects that are apparent to a person skilled in the art from the descriptions in the specification, along with the above effects or instead of the above effects.

(1)

A control method including:

connecting with a plurality of imaging devices via wireless communication, and communicating with each of the plurality of imaging devices;

specifying each of images corresponding to each of the plurality of imaging devices, on the basis of the communication; and listing the specified images.

(2)

The control method according to (1), further including: conducting, on the basis of an occurrence of an event related to at least one of the imaging devices, operational control related to the imaging devices corresponding to the listed images.

(3)

The control method according to (2), wherein
the event includes a user operation directed at the imaging devices, and
the control method further includes conducting operational control based on the user operation performed in a list display state for each of the imaging devices corresponding to each of the listed images.

(4)

The control method according to (3), wherein
the operational control based on the user operation includes an operational instruction with respect to the imaging devices.

(5)

The control method according to (4), wherein
the operational instruction includes an instruction related to image recording with respect to the imaging devices, and
the control method further includes deciding instruction content on the basis of an operational state of each of the imaging devices corresponding to each displayed image.

(6)

The control method according to (5), further including: in the list display state, ending the image recording without presenting a confirmation display to a user regarding a result of recording by the imaging devices conducted on the basis of the instruction related to the image recording.

(7)

The control method according to (4), wherein
the operational instruction includes an instruction related to a setting with respect to the imaging devices, and
the control method further includes deciding instruction content on the basis of a setting shared in common among the imaging devices corresponding to displayed images.

(8)

The control method according to any one of (1) to (7), further including:
conducting, when a status change occurs in the imaging devices, display control to indicate the status change in each of the imaging devices corresponding to each of the listed images.

(9)

The control method according to (8), wherein
the status change in the imaging devices includes a change in a communication state of the imaging devices.

(10)

The control method according to (9), wherein
the change in the communication state of the imaging devices includes a change in a presence or absence of a communication connection with the imaging devices, and
the control method further includes controlling display of an image related to the imaging devices for which the presence or absence of a communication connection has changed.

(11)

The control method according to any one of (8) to (10), wherein
the status change in the imaging devices includes an occurrence of a malfunction in the imaging devices.

(12)

The control method according to (11), wherein
the malfunction includes a malfunction that occurs in an ongoing manner, and
the control method further includes displaying an object indicating the malfunction that occurs in an ongoing manner.

(13)

The control method according to (12), further including: displaying the object indicating the malfunction that occurs in an ongoing manner in association with the images corresponding to the imaging devices where the malfunction that occurs in an ongoing manner has occurred.

(14)

The control method according to any one of (11) to (13), wherein
the malfunction includes a malfunction that occurs in an isolated manner, and
the control method further includes displaying an object which indicates the malfunction that occurs in an isolated manner, and which disappears after a designated time elapses.

(15)

The control method according to any one of (1) to (14), further including:
displaying, in association with each of the listed images, an object indicating a correspondence relationship between each of the listed images and each of the imaging devices.

(16)

The control method according to any one of (1) to (15), further including:
individually displaying one from among the images; and switching display between list display of the images and individual display of the image.

(17)

The control method according to (16), further including: conducting operational control based on a user operation directed at the imaging devices in an individual display state, only for the imaging devices corresponding to the individually displayed image.

(18)

The control method according to (16) or (17), further including:
conducting, in an individual display state, display control to indicate a status change in the imaging devices other than the imaging devices corresponding to the individually displayed image.

(19)

A control device including:
a communication unit that connects with a plurality of imaging devices via wireless communication, and communicates with each of the plurality of imaging devices; and
a controller that specifies each of images corresponding to each of the plurality of imaging devices, on the basis of the communication, and lists the specified images.

(20)

A program causing a computer to realize:
a communication function that connects with a plurality of imaging devices via wireless communication, and communicates with each of the plurality of imaging devices; and
a control function that specifies each of images corresponding to each of the plurality of imaging devices, on the basis of the communication, and lists the specified images.

(21)

A control method comprising:
wirelessly communicating with a plurality of imaging devices; and
displaying identifiers corresponding respectively to the plurality of imaging devices, on the basis of the communication.

(22)
The control method according to (21), further comprising: controlling an operation of each of the plurality of imaging devices in response to an event related to at least one of the plurality of imaging devices.

(23)
The control method according to any one of (21) and (22), wherein
the event includes a user operation that is directed at the plurality of imaging devices while the identifiers are being displayed, and
the controlling an operation of each of the plurality of imaging devices in response to the user operation includes controlling a recording operation of each of the plurality of imaging devices.

(24)
The control method according to any one of (21) through (23), wherein
for those of the plurality of imaging devices in a moving-image shooting mode, the controlling of the recording operation in response to the user operation includes deciding whether to start or stop moving-image recording based on an operational state of each of the plurality of imaging devices.

(25)
The control method according to any one of (21) through (24), wherein
the controlling of the recording operation of at least one of the plurality of imaging devices in response to the user operation includes controlling the imaging device to stop moving-image recording without presenting a confirmation display to a user regarding a result of the recording.

(26)
The control method according to any one of (21) through (25), wherein
the identifiers includes a list of identifiers,
the event includes a user operation of selecting, while the list of identifiers is being displayed, an imaging device setting, and
the controlling an operation of each of the plurality of imaging devices in response to the user operation includes setting each of the plurality of imaging devices to the selected imaging device setting.

(27)
The control method according to any one of (21) through (26), further comprising:
in response to the user initiating a setting-change operation while the list of identifiers is being displayed, displaying a list of imaging device settings as selection options, where the list of imaging device settings excludes imaging device settings that are not shared in common by each of the plurality of imaging devices,
wherein the imaging device setting selected by the user operation is selected from the displayed list of imaging device settings.

(28)
The control method according to any one of (21) through (27),
wherein the selected image device setting is one of a moving-image shooting mode and a still image shooting mode.

(29)
The control method according to any one of (21) through (28), further comprising: changing the display of corresponding identifier to indicate a status change in at least one of the plurality of imaging devices.

(30)
The control method according to any one of (21) through (29), wherein
the status change in the at least one of the plurality of imaging devices includes a change in a communication state of the at least one of the plurality of imaging devices.

(31)
The control method according to any one of (21) through (30), wherein
the change in the communication state of the at least one of the plurality of imaging devices includes a change in a presence or absence of a communication connection with the at least one of the plurality of imaging devices.

(32)
The control method according to any one of (21) through (31), wherein
the status change in the at least one of the plurality of imaging devices includes an occurrence of a malfunction in the at least one of the plurality of imaging devices.

(33)
The control method according to any one of (21) through (32), wherein
the malfunction includes an ongoing malfunction, and
the control method further includes displaying an object indicating the ongoing malfunction.

(34)
The control method according to any one of (21) through (33), further comprising:
displaying the object indicating the ongoing malfunction in association with the identifier corresponding to the at least one of the plurality of imaging devices experiencing the ongoing malfunction.

(35)
The control method according to any one of (21) through (34), wherein
the malfunction includes an isolated malfunction and
the control method further includes displaying an object which indicates the isolated malfunction, and which disappears after a designated time elapses.

(36)
The control method according to any one of (21) through (35),
wherein each of the identifiers includes an image for the corresponding imaging device and an object indicating a correspondence relationship between the image and the corresponding imaging device.

(37)
The control method according to any one of (21) through (36),
wherein, for each of the plurality of imaging devices, the identifiers include at least one of: an image corresponding to the imaging device, a name of the imaging device, a symbol corresponding to the imaging device, and a number corresponding to the imaging device.

(38)
The control method according to any one of (21) through (37),
wherein for each of the plurality of imaging devices, the identifiers include an image captured by the imaging device and wirelessly communicated by the imaging device.

(39)
The control method according to any one of (21) through (38), further comprising:
switching between displaying the identifiers simultaneously and displaying an image corresponding to a given one of the plurality of imaging devices individually.

(40)

The control method according to any one of (21) through (39), further comprising:

while displaying the image corresponding to the given one of the plurality of imaging devices individually, controlling an operation of the given one of the plurality of imaging devices based on a user operation and not controlling an operation of the other ones of the plurality of imaging devices based on the user operation.

(41)

The control method according to any one of (21) through (40), further comprising:

while displaying the image corresponding to the given one of the plurality of imaging devices individually, changing the display to indicate a status change in one of the plurality of imaging devices other than the given one of the plurality of imaging devices.

(42)

A control device comprising:

a communication unit that wirelessly communicates with each of a plurality of imaging devices; and a controller that displays a list of identifiers corresponding respectively to the plurality of imaging devices, on the basis of the communication.

(43)

A non-transitory computer readable medium having program code stored thereon that is configured to, when executed by a computing device, cause the computing device to:

switch between a multiple-unit control mode and a single-unit control mode, when in the multiple-unit control mode:

display identifiers corresponding respectively to a plurality of imaging devices, and in response to a given user input, control a given operation of each of the plurality of imaging device via wireless communication connections; and when in the single-unit control mode:

display an identifier corresponding to a selected one of the plurality of imaging devices, and in response to the given user input, control the given operation of the selected one of the plurality of imaging devices and not the others of the plurality of imaging devices.

(44)

The non-transitory computer readable medium of (43), wherein the given user input is a selection of an image recording control button, and the given operation is an image recording operation.

(45)

The non-transitory computer readable medium of any one of (43) through (44), wherein the given user input is a selection of an imaging device setting, and the given operation is setting the respective imaging device to the selected imaging device setting.

(46)

The non-transitory computer readable medium of any one of (43) through (45), wherein wherein, for each of the plurality of imaging devices, the identifiers include at least one of: an image corresponding to the imaging device, a name of the imaging device, a symbol corresponding to the imaging device, and a number corresponding to the imaging device.

(47)

The non-transitory computer readable medium of any one of (43) through (46), wherein the program code is configured to cause the computing device to switch from the multiple-unit control mode to the single-unit control mode in response to a user selection of one of the displayed identifiers.

(48)

The non-transitory computer readable medium of any one of (43) through (47), wherein the program code is configured to cause the computing device to establish the wireless communication connections with the plurality of imaging devices.

REFERENCE SIGNS LIST

100 control device
102 communication unit
104 controller
106 storage
108 display
110 operation detector
200 imaging device
202 operation detector
204 controller
206 storage
208 communication unit
210 imaging unit

The invention claimed is:

1. A non-transitory computer-readable medium having program code stored thereon that is configured to, when executed by a computing device, cause the computing device to perform a set of operations comprising:

controlling a display device to display a plurality of identifiers that correspond to a plurality of imaging devices with a one-to-one correspondence;

controlling the display device to display one or more operational instructions in response to a display instruction to display the one or more operational instructions while the plurality of identifiers are displayed by the display device, the one or more operational instructions are shared in common and equally applicable to all of the plurality of imaging devices;

receiving a user operation that selects one operational instruction from the one or more operational instructions while the one or more operational instructions are displayed by the display device; and controlling a communication interface to transmit the one operational instruction that is selected to the plurality of imaging devices, wherein the one operational instruction that is selected is an instruction that instructs the plurality of imaging devices to set the plurality of imaging devices to one image shooting mode from a plurality of image shooting modes.

2. The non-transitory computer-readable medium according to claim 1, wherein the set of operations further includes controlling the communication interface to transmit the one operational instruction to the plurality of imaging devices in response to receiving a second user operation.

3. The non-transitory computer-readable medium according to claim 1, wherein the one operational instruction that is selected is one of a moving-image shooting mode setting instruction or a still image shooting mode setting instruction.

4. The non-transitory computer-readable medium according to claim 1, wherein the one operational instruction that is selected is a communication setting selected from a plurality of communication settings.

5. The non-transitory computer-readable medium according to claim 1, wherein the one operational instruction that is selected is an image recording instruction that instructs the plurality of imaging devices to initiate image recording, and wherein the image recording instruction instructs each of the plurality of imaging devices to initiate still image shooting when the one image shooting mode is a still image shooting mode.

6. The non-transitory computer-readable medium according to claim 1, wherein controlling the display device to display the plurality of identifiers that correspond to the plurality of imaging devices further includes controlling the display device to display images associated with the plurality of identifiers that correspond to the plurality of imaging devices in a multi-view screen.

7. The non-transitory computer-readable medium according to claim 6, wherein the images are live streams from the plurality of imaging devices.

8. The non-transitory computer-readable medium according to claim 1, wherein controlling the display device to display the plurality of identifiers that correspond to the plurality of imaging devices further includes controlling the display device to display one image associated with one of the plurality of identifiers that corresponds to one of the plurality of imaging devices in a single-view screen.

9. The non-transitory computer-readable medium according to claim 8, wherein the image is a live stream from the one of the plurality of imaging devices.

10. The non-transitory computer-readable medium according to claim 1, wherein the one operational instruction that is selected is an image recording instruction that instructs the plurality of imaging devices to initiate image recording, and wherein the image recording instruction instructs each of the plurality of imaging devices to initiate moving-image shooting when the one image shooting mode is a moving-image shooting mode.

11. A computing device comprising:
a display device;
a communication interface;
a memory; and
an electronic processor communicatively coupled to the memory and the communication interface, the electronic processor configured to
control the display device to display a plurality of identifiers that correspond to a plurality of imaging devices with a one-to-one correspondence,
control the display device to display one or more operational instructions in response to a display instruction to display the one or more operational instructions while the plurality of identifiers are displayed by the display device, the one or more operational instructions are shared in common and equally applicable to all of the plurality of imaging devices,
receive a user operation that selects one operational instruction from the one or more operational instructions while the one or more operational instructions are displayed by the display device, and
control the communication interface to transmit the one operational instruction that is selected to the plurality of imaging devices,
wherein the one operational instruction that is selected is an instruction that instructs the plurality of imaging devices to set the plurality of imaging devices to one image shooting mode from a plurality of image shooting modes.

12. The computing device according to claim 11, wherein the electronic processor is further configured to control the communication interface to transmit the one operational instruction to the plurality of imaging devices in response to receiving a second user operation.

13. The computing device according to claim 11, wherein the one operational instruction that is selected is one of a moving-image shooting mode setting instruction or a still image shooting mode setting instruction.

14. The computing device according to claim 11, wherein the one operational instruction that is selected is a communication setting selected from a plurality of communication settings that are stored in the memory.

15. The computing device according to claim 11, wherein the one operational instruction that is selected is an image recording instruction that instructs the plurality of imaging devices to initiate image recording, and wherein the image recording instruction instructs each of the plurality of imaging devices to initiate still image shooting when the one image shooting mode is an still image shooting mode.

16. The computing device according to claim 11, wherein the one operational instruction that is selected is an image recording instruction that instructs the plurality of imaging devices to initiate image recording, and wherein the image recording instruction instructs each of the plurality of imaging devices to initiate moving-image shooting when the one image shooting mode is a moving-image shooting mode.

17. A system comprising:
a display device;
a plurality of imaging devices; and
a computing device including a communication interface, a memory, and an electronic processor communicatively coupled to the memory and the communication interface, the electronic processor configured to
control the display device to display a plurality of identifiers that correspond to the plurality of imaging devices with a one-to-one correspondence,
control the display device to display one or more operational instructions in response to a display instruction to display the one or more operational instructions while the plurality of identifiers are displayed by the display device, the one or more operational instructions are shared in common and equally applicable to all of the plurality of imaging devices,
receive a user operation that selects one operational instruction from the one or more operational instructions while the one or more operational instructions are displayed by the display device, and
control the communication interface to transmit the one operational instruction that is selected to the plurality of imaging devices based on the user operation,
wherein the one operational instruction that is selected is an instruction that instructs the plurality of imaging devices to set the plurality of imaging devices to one image shooting mode from a plurality of image shooting modes.

18. The system according to claim 17, wherein the electronic processor is further configured to control the communication interface to transmit the one operational instruction to the plurality of imaging devices in response to receiving a second user operation.

19. The system according to claim 17, wherein the one operational instruction that is selected is an image recording instruction that instructs the plurality of imaging devices to initiate image recording, and wherein the image recording instruction instructs each of the plurality of imaging devices to initiate still image shooting when the one image shooting mode is an still image shooting mode.

20. The system according to claim 17, wherein the one operational instruction that is selected is an image recording instruction that instructs the plurality of imaging devices to initiate image recording, and wherein the image recording instruction instructs each of the plurality of imaging devices to initiate moving-image shooting when the one image shooting mode is a moving-image shooting mode.

\* \* \* \* \*